US008340496B2

(12) United States Patent
Iwase et al.

(10) Patent No.: US 8,340,496 B2
(45) Date of Patent: Dec. 25, 2012

(54) PLAYBACK APPARATUS, PLAYBACK METHOD, PROGRAM, PROGRAM STORAGE MEDIUM, DATA STRUCTURE, AND RECORDING-MEDIUM MANUFACTURING METHOD

(75) Inventors: Ayako Iwase, Kanagawa (JP); Motoki Kato, Kanagawa (JP); Shinobu Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 1248 days.

(21) Appl. No.: 11/791,585

(22) PCT Filed: Aug. 17, 2006

(86) PCT No.: PCT/JP2006/316177
§ 371 (c)(1),
(2), (4) Date: Mar. 24, 2008

(87) PCT Pub. No.: WO2007/023728
PCT Pub. Date: Mar. 1, 2007

(65) Prior Publication Data
US 2008/0267588 A1    Oct. 30, 2008

(30) Foreign Application Priority Data

Aug. 25, 2005  (JP) ................................. 2005-244612
Sep. 12, 2005  (JP) ................................. 2005-264041
Oct. 26, 2005  (JP) ................................. 2005-311477

(51) Int. Cl.
*H04N 5/87* (2006.01)
(52) U.S. Cl. ...................................................... 386/239
(58) Field of Classification Search ................... 386/125
See application file for complete search history.

(56) References Cited

U.S. PATENT DOCUMENTS 5,963,215 A    10/1999  Rosenzweig
6,515,677 B1 *  2/2003  Lee et al. .................... 345/634
6,897,882 B1    5/2005  Kim
2002/0140861 A1  10/2002  Janevski
2004/0105012 A1 *  6/2004  Lee .............................. 348/220.1
2004/0189828 A1 *  9/2004  DeWees et al. ............. 348/239
2004/0201608 A1  10/2004  Ma et al.
2006/0200842 A1 *  9/2006  Chapman et al. ............ 725/34
2007/0018447 A1 *  1/2007  Van Gestel .................. 283/72

(Continued)

FOREIGN PATENT DOCUMENTS
EP            1 521 463          4/2005
(Continued)

*Primary Examiner* — Jason Gee
(74) *Attorney, Agent, or Firm* — Robert J. Depke; Rockey, Depke & Lyons, LLC

(57) ABSTRACT

The present invention relates to a playback apparatus and a playback method which allow setting of picture-in-picture display, a program, a program storage medium, a data structure, and a recording-medium manufacturing method. Pip_ metadata states information required for the picture-in-picture display. Pip_horizotal_position indicates, on the frame of a primary video, an X coordinate at the upper left corner of a sub display screen on which a secondary video is displayed. Pip_vertical_position indicates, on the frame of the primary video, a Y coordinate at the upper left corner of the sub display screen on which the secondary video is displayed. Pip_scale states information indicating the size of the sub display screen on which the secondary video is displayed. For example, pip_scale states the size ratio of the secondary video to the primary video, the scale ratio of the secondary video to its original image, or information indicating how many pixels is included in the sub display screen in each of the vertical direction and horizontal direction. The present invention is applicable to playback apparatuses.

7 Claims, 44 Drawing Sheets

U.S. PATENT DOCUMENTS

2007/0274676 A1 * 11/2007 Diomelli et al. ................ 386/66

FOREIGN PATENT DOCUMENTS

| JP | 2000-022928 | 1/2000 |
| JP | 2004-362719 | 12/2001 |
| JP | 2002-238031 | 8/2002 |
| JP | 2003-244613 | 8/2003 |
| JP | 2005-20242 | 1/2005 |
| WO | WO 2004/034398 | 4/2004 |
| WO | WO 2004/109467 | 12/2004 |
| WO | WO 2005/074270 | 8/2005 |

* cited by examiner

FIG. 7

| Syntax | No. of bits | Mnemonic |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     PlayListExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     PlayListExtensionData() | | |
|     for(i=0; i<N4; i++) { | | |
|         padding_word | 16 | bslbf |
|     } | | |
| } | | |

FIG. 8

| Syntax | No. of bits | Mnemonic |
|---|---|---|
| PlayListExtensionData() { | | |
|   length | 32 | uimsbf |
|   if(length !=0) { | | |
|     data_block_start_address | 32 | uimsbf |
|     reserved_for_word_align | 24 | |
|     number_of_PL_ext_data_entries | 8 | uimsbf |
|     for(i=0; i<number_of_PLext_data_entries; i++) { | | |
|       ID1 | 16 | uimsbf |
|       ID2 | 16 | uimsbf |
|       PL_ext_data_start_address | 32 | uimsbf |
|       PL_ext_data_length | 32 | uimsbf |
|     } | | |
|     for(i=0; i<L1; i++) { | | |
|       padding_word | 16 | bslbf |
|       padding_word | 16 | bslbf |
|     } | | |
|     data_block() | 32+ 8*(length- data_block_start) | |
|   } | | |
| } | | |

FIG. 9

| Syntax | No. of bits | Mnemonic |
|---|---|---|
| pip_metadata() { | | |
|   length | 32 | uimsbf |
|   number_of_pip_metadata_entries | | |
|   for (i=0;i<number_of_pip_metadata_entries;i++) { | | |
|     pip_metadata_type | 8 | bslbf |
|     reserved_for_future_use | 8 | bslbf |
|     ref_to_PlayItem/SubPath_id | 16 | uimsbf |
|     pip_metadata_time_stamp | 32 | uimsbf |
|     ref_to_secondary_video_stream_id | 8 | uimsbf |
|     reserved_for_future_use | 8 | bslbf |
|     pip_composition_metadata() { | | |
|       pip_horizontal_position | 16 | |
|       pip_vertical_position | 16 | |
|       pip_scale | 8 | |
|       reserved_for_future_use | 8 | bslbf |
|     } | | |
|   } | | |
| } | | |

FIG. 10

| value | Meaning | Note |
|---|---|---|
| 0x00 | reserved | |
| 0x01 | Synchronous PIP metadata | ● 2ndary video referenced by ref_to_secondary_video_stream_id is presented at time indicated by pip_metadata_time_stamp with PlayItem referenced by ref_to_PlayItem_id using information in pip_composition_metadata(). |
| 0x02 | Asynchronous PIP metadata | ● 2ndary video referenced by ref_to_secondary_video_stream_id is presented at time indicated by pip_metadata_time_stamp with SubPlayItem referenced by ref_to_SubPlayItem using information in pip_composition_metadata(). |
| others | reserved | |

FIG. 11

| Syntax | No. of bits | Mnemonic |
|---|---|---|
| pip_metadata() { | | |
|   length | 32 | uimsbf |
|   number_of_pip_entries | | |
|   for(i=0;i<number_of_pip_entries;i++) { | | |
|     Synchronous_PIP_metadata_flag | | |
|     ref_to_PlayItem/SubPath_id | 16 | uimsbf |
|     ref_to_secondary_video_stream_id | 8 | uimsbf |
|     reserved_for_future_use | 8 | bslbf |
|     number_of_pip_metadata_entries | | |
|     for(j=0;j<number_of_pip_metadata_entries;j++) { | | |
|       pip_metadata_type | 8 | bslbf |
|       reserved_for_future_use | 8 | bslbf |
|       pip_metadata_time_stamp | 32 | uimsbf |
|       pip_composition_metadata() { | | |
|         pip_horizontal_position | 16 | |
|         pip_vertical_position | 16 | |
|         pip_scale | 8 | |
|         reserved_for_future_use | 8 | bslbf |
|       } | | |
|     } | | |
|   } | | |
| } | | |

FIG. 12

| Syntax | No. of bit | Mnemonic |
|---|---|---|
| pip_metadata() { | | |
|     length | 32 | uimsbf |
|     number_of_metadata_block_entries | 16 | uimsbf |
|     for (k=0; k<number_of_metadata_block_entries; k++) { | | |
|         metadata_block_header[k] () { | | |
|             ref_to_PlayItem_id[k] | 16 | uimsbf |
|             ref_to_secondary_video_stream_id[k] | 8 | uimsbf |
|             reserved_for_future_use | 8 | bslbf |
|             pip_timeline_type[k] | 4 | uimsbf |
|             flags() { | | |
|                 is_luma_key | 1 | bslbf |
|                 reserved | 1 | bslbf |
|             } | | |
|             reserved_for_word_align | 10 | bslbf |
|             if (is_luma_key==1b) { | | |
|                 lower_limit_luma_key | 8 | uimsbf |
|                 upper_limit_luma_key | 8 | uimsbf |
|             }else{ | | |
|                 reserved_for_future_use | 16 | bslbf |
|             } | | |
|             reserved_for_future_use | 16 | |
|             metadata_block_data_start_address[k] | 32 | uimsbf |
|         } | | |
|     } | | |
|     for (i=0; i<X; i++) { | | |
|         padding_word | | |
|     } | | |
|     for (k=0; k<number_of_metadata_block_entries; k++) { | | |
|         metadata_block_data[k] () { | | |
|             number_of_pip_metadata_entries[k] | 16 | bslbf |
|             for (i=0; i<number_of_pip_metadata_entries; i++) { | | |
|                 pip_metadata_time_stamp[i] | 32 | uimsbf |
|                 pip_composition_metadata() { | | |
|                     pip_horizontal_position[i] | 12 | uimsbf |
|                     pip_vertical_position[i] | 12 | uimsbf |
|                     pip_scale[i] | 4 | uimsbf |
|                     reserved_for_future_use | 4 | bslbf |
|                 } | | |
|             } | | |
|         } | | |
|         for (i=0; i<Y[k]; i++) { | | |
|             padding_word | 16 | bslbf |
|         } | | |
|     } | | |
| } | | |

FIG. 13

| pip_scale | Meaning |
|---|---|
| 0 | reserved |
| 1 | no scaling (x1) |
| 2 | half scaling (x1/2) |
| 3 | quarter scaling (x1/4) |
| 4 | 1.5 scaling (x1.5) |
| 5 | Full screen scaling |
| others | reserved |

FIG. 14

| pip_timeline_type[k] | Meaning |
|---|---|
| 0 | reserved |
| 1 | Synchronized type of Picture-in-Picture presentation path and the pip_metadata_time_stamp entries refers to the timeline of PlayItem referred to by the ref_to_PlayItem_id[k]. The SubPath indicated by the ref_to_secondary_video_stream_id[k] shall have SubPath_type set to 5 or 7. |
| 2 | Asynchronous type of Picture-in-Picture presentation path and the pip_metadata_time_stamp entries refers to a timeline of SubPath. The SubPath indicated by the ref_to_secondary_video_stream_id[k] shall have SubPath_type set to 6. |
| 3 | Asynchronous type of Picture-in-Picture presentation path and the pip_metadata_time_stamp entries refers to the timeline of PlayItem referred to by the ref_to_PlayItem_id[k]. The SubPath indicated by the ref_to_secondary_video_stream_id[k] shall have SubPath_type set to 6. |
| others | reserved |

FIG. 18

PlayList-Syntax

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 19

SubPath-Syntax

| Syntax | No. of bits | Mnemonic |
|---|---|---|
| SubPath() { | | |
|   length | 32 | uimsbf |
|   reserved_for_future_use | 8 | bslbf |
|   SubPath_type | 8 | uimsbf |
|   reserved_for_future_use | 15 | uimsbf |
|   is_repeat_SubPath | 1 | bslbf |
|   reserved_for_future_use | 8 | bslbf |
|   number_of_SubPlayItems | 8 | uimsbf |
|   for(i=0;i< number_of_SubPlayItems;i++) { | | |
|     SubPlayItem(i) | | |
|   } | | |
| } | | |

FIG. 20

SubPath_type

| SubPath_type | Meaning |
|---|---|
| 0 | reserved |
| 1 | reserved |
| 2 | Out-of-mux and primary audio presentation path of the Browsable slideshow (The audio presentation path using the SubPath is not synchronized with the main path using PlayItems in the PlayList.) |
| 3 | Out-of-mux and interactive graphics menu (The interactive graphics menu using the SubPath is not synchronized with the main path using PlayItems in the PlayList.) |
| 4 | Out-of-mux and text subtitle presentation path (The text subtitle presentation path using the SubPath is synchronized with the main path using PlayItems in the PlayList.) |
| 5 | Out-of-mux and AV synchronized type of one or more elementary streams path (Primary audio/PG/IG/Secondary audio path.)<br><br>Out-of-mux and AV synchronized type of Picture-in-Picture presentation path which contains one or more elementary stream paths.<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of Picture-in-Picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of Picture-in-Picture presentation path which contains one or more elementary stream paths.<br><br>(The elementary streams used by the path is multiplexed in the same Clip used by PlayItem. The path using the SubPath is synchronized with the main path using PlayItems in the PlayList.) |
| 8-255 | reserved |

FIG. 21

SubPlayItem(i)-Syntax

| Syntax | No. of bits | Mnemonic |
|---|---|---|
| SubPlayItem(i) { | | |
| length | 16 | uimsbf |
| Clip_Information_file_name[0]        //subclip_entry_id=0 | 8*5 | bslbf |
| Clip_codec_identifier[0] | 8*4 | bslbf |
| reserved_for_future_use | 31 | bslbf |
| is_multi_Clip_entries | 1 | bslbf |
| ref_to_STC_id[0] | 8 | uimsbf |
| SubPlayItem_IN_time | 32 | uimsbf |
| SubPlayItem_OUT_time | 32 | uimsbf |
| sync_PlayItem_id | 16 | bslbf |
| sync_start_PTS_of_PlayItem | 32 | uimsbf |
| if(is_multi_Clip_entries==1b) { | | |
| reserved_for_future_use | 8 | bslbf |
| num_of_Clip_entries | 8 | uimsbf |
| for (subclip_entry_id=1;//Note:Entries after subclip_entry_id=0 subclip_entry_id<num_of_Clip_entries;subclip_entry_id ++) { | | |
| Clip_Information_file_name[subclip_entry_id] | 8*5 | bslbf |
| Clip_codec_identifier[subclip_entry_id] | 8*4 | bslbf |
| ref_to_STC_id[subclip_entry_id] | 8 | uimsbf |
| reserved_for_future_use | 8 | bslbf |
| } | | |
| } | | |
| } | | |

FIG. 22

PlayItem-Syntax

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 23

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; | | |
|         video_stream_id < number_of_video_stream_entries; | | |
|         video_stream_id++) { | | |
|         stream_entry() | | |
|         stream_attribute() | | |
|     } | | |
|     for (audio_stream_id=0; | | |
|         audio_stream_id < number_of_audio_stream_entries; | | |
|         audio_stream_id++) { | | |
|         stream_entry() | | |
|         stream_attributes() | | |
|     } | | |
|     for (audio_stream_id2=0; | | |
|         audio_stream_id2 < number_of_audio_stream2_entries; | | |
|         audio_stream_id2++) { | | |
|         number_of_combinations | | |
|         for (i=0; i < number_of_combinations; i++) { | | |
|             audio_stream_id | | |
|         } | | |
|         stream_entry() | | |
|         stream_attributes() | | |
|     } | | |
|     for (PG_textST_stream_id=0; | | |
|         PG_textST_stream_id < number_of_PG_textST_stream_entries; | | |
|         PG_txtST_stream_id++) { | | |
|         stream_entry() | | |
|         stream_attribute() | | |
|     } | | |
|     for (IG_stream_id=0; | | |
|         IG_stream_id < number_of_IG_stream_entries; | | |
|         IG_stream_id++) { | | |
|         stream_entry() | | |
|         stream_attribute() | | |
|     } | | |
| } | | |

FIG. 24

Stream_entry()

| Syntax | No. of bits | Mnemonic |
|---|---|---|
| stream_entry(id) { | | |
|   length | 8 | uimsbf |
|   type | 8 | uimsbf |
|   if(type==1) { | | |
|     ref_to_stream_PID_of_mainClip | 16 | uimsbf |
|     reserved_for_future_use | 48 | Bslbf |
|   }else if(type==2) { | | |
|     ref_to_SubPath_id | 8 | Uimsbf |
|     ref_to_subClip_entry_id | 8 | Uimsbf |
|     ref_to_stream_PID_of_subClip | 16 | |
|     reserved_for_future_use | 32 | bslbf |
|   } | | |
| } | | |

FIG. 25 stream_attribute()

| Syntax | No. of bits | Mnemonic |
|---|---|---|
| stream_attribute() { | | |
|     length | 8 | uimsbf |
|     stream_coding_type | 8 | bslbf |
|     if (stream_coding_type==0x02) { | | |
|         video_format | 4 | bslbf |
|         frame_rate | 4 | bslbf |
|         aspect_ratio | 4 | bslbf |
|         reserved_for_future_use | 4 | bslbf |
|     } else if (stream_coding_type==0x80 \|\| <br>         stream_coding_type==0x81 \|\| <br>         stream_coding_type==0x82) { | | |
|         audio_presentation_type | 4 | bslbf |
|         sampling_frequency | 4 | bslbf |
|         audio_language_code | 8*2 | bslbf |
|         reserved_for_future_use | 8 | bslbf |
|     } else if (stream_coding_type==0x90) { <br>         // Presentation graphics stream | | |
|         PG_language_code | 8*2 | bslbf |
|     } else if (stream_coding_type==0x91) { <br>         // Interactive graphics stream | | |
|         IG_language_code | 8*2 | bslbf |
|     } else if (stream_coding_type==0x92) { <br>         // Text subtitle stream | | |
|         character_code | 8 | bslbf |
|         textST_language_code | 8*2 | bslbf |
|     } | | |
| } | | |

FIG. 26 stream_coding_type

| stream_coding_type | Meaning |
|---|---|
| 0x02 | MPEG-2 video stream |
| 0x80 | HDMV LPCM audio |
| 0x81 | Dolby AC-3 audio |
| 0x82 | dts audio |
| 0x90 | Presentation graphics stream |
| 0x91 | Interactive graphics stream |
| 0x92 | Text subtitle stream |
| other values | reserved |

FIG. 27 video_format

| video_format | Meaning | Video standard |
|---|---|---|
| 0 | reserved | |
| 1 | 480i | ITU-R BT.601-4 |
| 2 | 576i | ITU-R BT.601-4 |
| 3 | 480p | SMPTE 293M |
| 4 | 1080i | SMPTE 274M |
| 5 | 720p | SMPTE 296M |
| 6 | 1080p | SMPTE 274M |
| 7 - 14 | reserved | |

FIG. 28 frame_rate

| frame_rate | Meaning [Hz] |
|---|---|
| 0 | reserved |
| 1 | 24 000/1001 (23.976...) |
| 2 | 24 |
| 3 | 25 |
| 4 | 30 000/1001 (29.97...) |
| 5 | reserved |
| 6 | 50 |
| 7 | 60 000/1001 (59.94...) |
| 8-15 | reserved |

FIG. 29 aspect_ratio

| aspect_ratio | Meaning |
|---|---|
| 0 | reserved |
| 1 | reserved |
| 2 | 4:3 display aspect ratio |
| 3 | 16:9 display aspect ratio |
| 4-15 | reserved |

FIG. 30 audio_presentation_type

| audio_presentation_type | Meaning |
|---|---|
| 0 | reserved |
| 1 | single mono channel |
| 2 | dual mono channel |
| 3 | stereo (2-channel) |
| 4 | reserved |
| 5 | reserved |
| 6 | multi-channel |
| 7-15 | reserved |

FIG. 31 sampling_frequency

| sampling_frequency | Meaning |
|---|---|
| 0 | reserved |
| 1 | 48 kHz |
| 2 | reserved |
| 3 | reserved |
| 4 | 96 kHz |
| 5 -15 | reserved |

FIG. 32

Character code

| Character code value | Character set | Character Encoding scheme |
|---|---|---|
| 0x00 | reserved | |
| 0x01 | Unicode V1.1 (ISO 10646-1) | UTF8 |
| 0x02 | Unicode V1.1 (ISO 10646-1) | UTF16 big endian |
| 0x03 | Shift JIS (Japanese) | |
| 0x04 | KSC 5601-1987 including KSC 5653 for Roman character (Korean) | |
| 0x05 | GB18030-2000 (Chinese) | |
| 0x06 | GB2312 (Chinese) | |
| 0x07 | BIG5 (Chinese) | |
| Others | Reserved | |

FIG. 33

STN_table()

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     number_of_video_stream2_entries | 8 | uimsbf |
|     reserved_for_future_use | 48 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         number_of_combinations | | |
|         for (i=0; i < number_of_combinations; i++) { | | |
|             audio_stream_id | | |
|         } | | |
|         stream_entry() | | |
|         stream_attributes() | | |

FIG. 34

| Syntax | No. of bits | Mnemonic |
|---|---|---|
| } | | |
|   for (PG_textST_stream_id=0; | | |
|       PG_textST_stream_id < number_of_PG_textST_stream_entries; | | |
|       PG_txtST_stream_id++) { | | |
|     stream_entry() | | |
|     stream_attribute() | | |
|   } | | |
|   for (IG_stream_id=0; | | |
|       IG_stream_id < number_of_IG_stream_entries; | | |
|       IG_stream_id++) { | | |
|     stream_entry() | | |
|     stream_attribute() | | |
|   } | | |
|   for (video_stream_id2=0; | | |
|       video_stream_id2 < num_of_video_stream2_entries; | | |
|       video_stream_id2++) { | | |
|     number_of_Audio_combinations_for_video2 | 8 | |
|     for(i=0; i<number_of_Audio_combinations_for_video2; i++) { | | |
|       audio_stream_id | 8 | |
|       audio_stream_id2 | 8 | |
|     } | | |
|     number_of_Subtitle_combinations_for_video2 | 8 | |
|     for(i=0; i<number_of_Subtitle_combinations_for_video2; i++) { | | |
|       PG_textST_stream_id | 8 | |
|     } | | |
|     stream_entry() | | |
|     stream_attributes() | | |
|   } | | |
| } | | |

FIG. 44
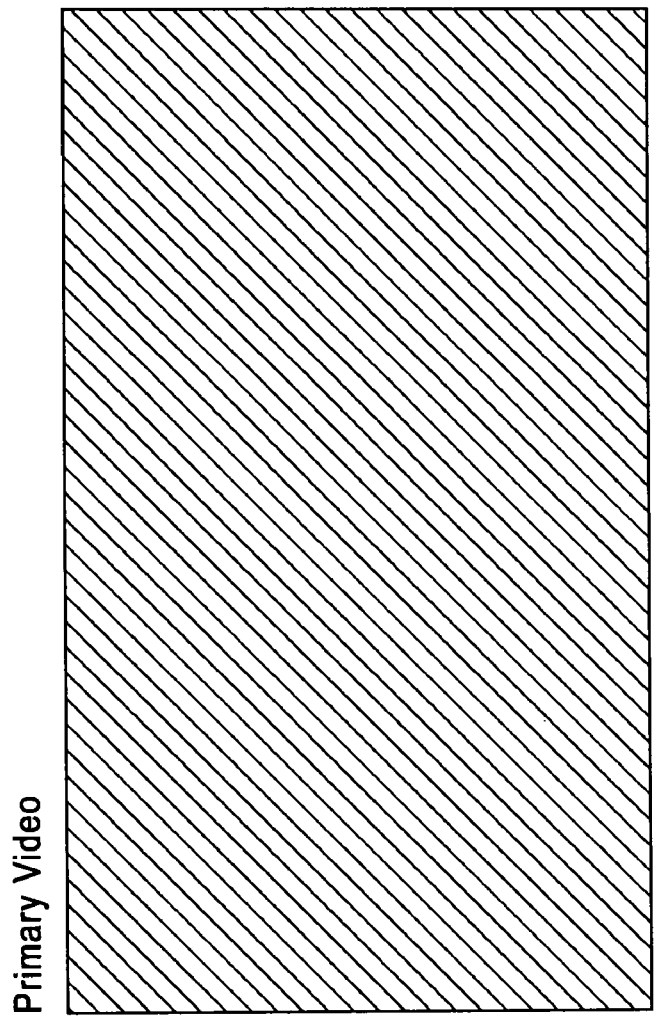
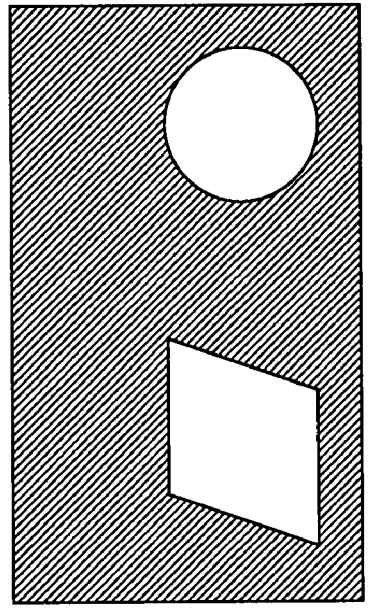

PLAYBACK APPARATUS, PLAYBACK METHOD, PROGRAM, PROGRAM STORAGE MEDIUM, DATA STRUCTURE, AND RECORDING-MEDIUM MANUFACTURING METHOD

This application is a 371 U.S. National Stage filing of PCT/JP2006/316177, filed Aug. 17, 2006, which claims priority to Japanese Patent Application Number JP2005-244612 filed Aug. 25, 2005, Japanese Patent Application Number JP2005-264041 filed Sep. 12, 2005 and Japanese Patent Application Number JP2005-311477 filed Oct. 26, 2005, all of which are incorporated herein by reference.

TECHNICAL FIELD

The present invention relates to playback apparatuses, playback methods, programs, program storage media, data structures, and recording-medium manufacturing methods. In particular, the present invention relates to a playback apparatus, a playback method, a program, a program storage medium, a data structure, and a recording-medium manufacturing method which are preferably used to play back stream data.

BACKGROUND ART

In order to listen to/view different contents simultaneously, there is a technology in which uncompressed image data are combined after video data of multiple contents are decoded, the combined data is then subjected to D/A conversion, the converted data is output to a video output terminal for display on an external display apparatus (e.g., Patent Document 1).
[Patent Document 1] Japanese Unexamined Patent Application Publication No. 2005-20242

DISCLOSURE OF INVENTION

Problems to be Solved by the Invention

There is a demand for combining multiple video data for output, not only when video data of multiple contents are combined for display, as described above, but also when one content contains multiple video data.

When multiple video data are combined for output, it is difficult for a content producer, content distributor, or the like, rather than depending on a playback apparatus, to set a method for displaying a display screen that serves as a sub screen relative to a main display screen, for example, for each content or each predetermined playback portion of a content.

In view of such situations, the present invention has been made to make it possible to specify a method for displaying a display screen that serves as a sub screen relative to a main display screen.

Means for Solving the Problems

A playback apparatus according to a first aspect of the present invention includes obtaining means for obtaining playback control information that includes first information including a main playback path indicating a position on a timeline of a main stream file containing at least one stream and second information including a sub playback path of a sub stream file that is different from the main stream file, and reading means for reading the main stream file and the sub stream file which are to be played back, based on the playback control information obtained by the obtaining means. The playback apparatus further includes video combining means for combining video of the main stream file and video of the sub stream file, the main stream file and the sub stream file being read by the reading means, based on the playback control information obtained by the obtaining means. The playback control information includes information related to display states of the video of the sub stream file, the video of the sub stream file being to be combined with the video of the main stream file. The video combining means combines the video of the main stream file and the video of the sub stream file, based on the display-state-related information included in the playback control information.

The display-state-related information can include information related to a display position of the video of the sub stream file, the video of the sub stream file being to be combined with the video of the main stream file.

The display-state-related information can include information related to a display size of the video of the sub stream file, the video of the sub stream file being to be combined with the video of the main stream file.

The display-state-related information can include information related to display color of the video of the sub stream file, the video of the sub stream file being to be combined with the video of the main stream file.

The display-state related information can include information related to a post-combination rotation angle of the video of the sub stream file relative to original video, the video of the sub stream file being to be combined with the video of the main stream file.

The display-state-related information can include information related to processing for combining the video of the main stream file and the video of the sub stream file. The processing is executed based on information indicating a brightness of the video of the sub stream file, the video of the sub stream file being to be combined with the video of the main stream file.

The information indicating the brightness of the video of the sub stream file can be at least one threshold for information indicating a brightness for transparency processing, and the transparency processing can be performed on a video portion where the brightness of the video of the sub stream file is greater than or equal to the threshold or less than or equal to the threshold.

The playback apparatus can further include operation inputting means for receiving an operation input of a user. The playback control information obtained by the obtaining means can state information indicating whether the sub stream file is played back always simultaneously with the main stream file or the sub stream file is played back simultaneously with the main stream file only when an instruction is issued from the user. When the playback control information states information indicating that the sub stream file is played back simultaneously with the main stream file only when an instruction is issued from the user, the video combining means can combine, only upon receiving an instruction for playing back the sub stream file from the user, the video of the main stream file and the video of the sub stream file, based on the user operation input received by the operation inputting means.

The playback apparatus can further include audio combining means for combining audio to be played back in association with the main stream file and audio to be played back in association with the sub stream file. The audio combining means can combine the audio to be played back in association with the main stream file and the audio to be played back in association with the sub stream file, when the video combining means combines the video of the main stream file and the video of the sub stream file.

The playback control information can include information indicating that the display-state-related information is included.

A playback method and a program according to the first aspect of the present invention includes a step of reading playback control information that includes first information including a main playback path indicating a position on a timeline of a main stream file containing at least one stream and second information including a sub playback path of a sub stream file that is different from the main stream file. The playback method further includes a step of reading the main stream file and the sub stream file which are to be played back, based on the read playback control information, and a step of combining video of the read main stream file and video of the read sub stream file, based on information that is included in the playback control information and that is related to display states of the video of the sub stream file, the video of the sub stream file being to be combined with the video of the main stream file.

In the first aspect of the present invention, playback control information is read. The playback control information includes first information including a main playback path indicating a position on a timeline of the main stream file containing at least one stream and second information including a sub playback path of the sub stream file that is different from the main stream file. Based on the read playback control information, the main stream file and the sub stream file which are to be played back are read. Video of the read main stream file and video of the read sub stream file are combined, based on information that is included in the playback control information and that is related to display states of the video of the sub stream file, the video of the sub stream file being to be combined with the video of the main stream file.

A data structure according to a second aspect of the present invention is directed to a data structure that includes playback control information, which serves as information for controlling playback of a main stream file containing at least one stream. The playback control information includes first information including a main playback path indicating a position on a timeline of the main stream file, second information including a sub playback path of a sub stream file that is different from the main stream file, and information related to display states of video of the sub stream file, the video of the sub stream file being to be combined with video of the main stream file.

A recording-medium manufacturing method according to a second aspect of the present invention is directed to a manufacturing method for a recording medium on which data that can be played back by a playback apparatus is recorded. The recording method includes a step of generating data having a data structure including playback control information, which serves as information for controlling playback of a main stream file containing at least one stream, and a step of recording the generated data to the recording medium. The playback control information includes first information including a main playback path indicating a position on a timeline of the main stream file, second information including a sub playback path of a sub stream file that is different from the main stream file, and information related to display states of video of the sub stream file, the video of the sub stream file being to be combined with video of the main stream file.

In the recording-medium manufacturing according to the second aspect of the present invention, data having a data structure including playback control information, which serves as information for controlling playback of a main stream file containing at least one stream, is generated, and the generated data is recorded to the recording medium. The playback control information includes first information including a main playback path indicating a position on a timeline of the main stream file, second information including a sub playback path of a sub stream file that is different from the main stream file, and information related to display states of video of the sub stream file, the video of the sub stream file being to be combined with video of the main stream file.

The term "network" refers to a system in which at least two apparatuses are connected so as to allow one apparatus to transmit information to another apparatus. The apparatuses that perform communication through the network may be independent from each other or may be internal blocks included in one apparatus.

Needless to say, the communication may include wireless communication and wired communication. Thus, the communication may be a communication that uses a combination of wireless communication and wired communication. That is, wireless communication may be performed in one section and wired communication may be performed in another section. In addition, a communication from a first apparatus to a second apparatus may be performed using wireless communication and a communication from the second apparatus to the first apparatus may be performed using wireless communication.

A recording apparatus may be an independent apparatus or may be a block of for performing recording processing of a recording/playback apparatus.

Advantages

As described above, according to the first aspect of the present invention, video of a main stream file and video of a sub stream file can be combined. In particular, video of a main stream file and video of a sub stream file can be combined based on the information that is included in the playback control information and that is related to the display states of the video of the sub stream file. Thus, for example, a content producer or content distributor can appropriately define the size and the display position of a sub display screen during picture-in-picture display, without depending on the specifications of the playback apparatus.

According to the second aspect of the present invention, it is possible to provide data having a data structure that includes the playback control information, which serves as information for controlling the playback of a main stream file containing at least one stream. In particular, it is possible to provide data having a data structure in which the playback control information includes first information including a main playback path indicating a position on a timeline of a main stream file, second information including a sub playback path of a sub stream file that is different from the main stream file, and information related to display states of video of the sub stream file, the video of the sub stream file being to be combined with video of the main stream file. Thus, for example, a content producer or content distributor can appropriately define the size and the display position of the sub display screen during picture-in-picture display, without depending on the specifications of the playback apparatus.

BRIEF DESCRIPTION OF THE DRAWINGS

FIG. 7 shows the data structure of a PlayList file that is stored in a PLAYLIST directory and that is given an extension ".mpls"

FIG. 8 shows the syntax of a PlayListExtensionData( ).

FIG. 9 illustrates a first example of the syntax of pip_metadata stated in data_block.

FIG. 10 illustrates the value and the meaning of pip_metadata_type shown in FIG. 9.

FIG. 11 illustrates a second example of the syntax of pip_metadata stated in data_block.

FIG. 12 illustrates a third example of the syntax of pip_metadata stated in data_block.

FIG. 13 illustrates the value and the meaning of pip_scale shown in FIG. 12.

FIG. 14 illustrates the value and the meaning of pip_timeline_type shown in FIG. 12.

FIG. 18 shows the syntax of PlayList( ).

FIG. 19 shows the syntax of SubPath( ).

FIG. 20 illustrates SubPath_type.

FIG. 21 shows the syntax of SubPlayItem(i).

FIG. 22 shows the syntax of PlayItem( ).

FIG. 23 shows the syntax of STN_table( ).

FIG. 24 shows the syntax of stream_entry( ).

FIG. 25 shows the syntax of stream_attribute( ).

FIG. 26 illustrates stream coding_type.

FIG. 27 illustrates video_format.

FIG. 28 illustrates frame_rate.

FIG. 29 illustrates aspect_ratio.

FIG. 30 illustrates audio_presentation_type.

FIG. 31 illustrates sampling_frequency.

FIG. 32 illustrates Character code.

FIG. 33 shows the syntax of STN_table( ).

FIG. 34 shows the syntax of STN_table( ).

FIG. 44 is a view illustrating luma_keying combination.

REFERENCE NUMERALS

1 main display screen, 2 sub display screen, 20 playback apparatus, 31 storage drive, 32 switch, 33 AV decoder unit, 34 controller, 51 to 54, buffers, 55 and 56, PID filters, 57 to 59 switches, 71 background decoder, 72-1 first video decoder, 72-2 second video decoder, 73 presentation-graphics decoder, 74 interactive-graphics decoder, 75 audio decoder, 76 text-St composition, 77 switch, 91 background-plane generator, 92 video-plane generator, 93 presentation-graphics-plane generator, 94 interactive-graphics-plane generator, 95 buffer, 96 video-data processor, 97 mixing processor, 101 mixing

BEST MODE FOR CARRYING OUT THE INVENTION

An embodiment of the present invention will be described below with reference to the drawings.

Figure 1:
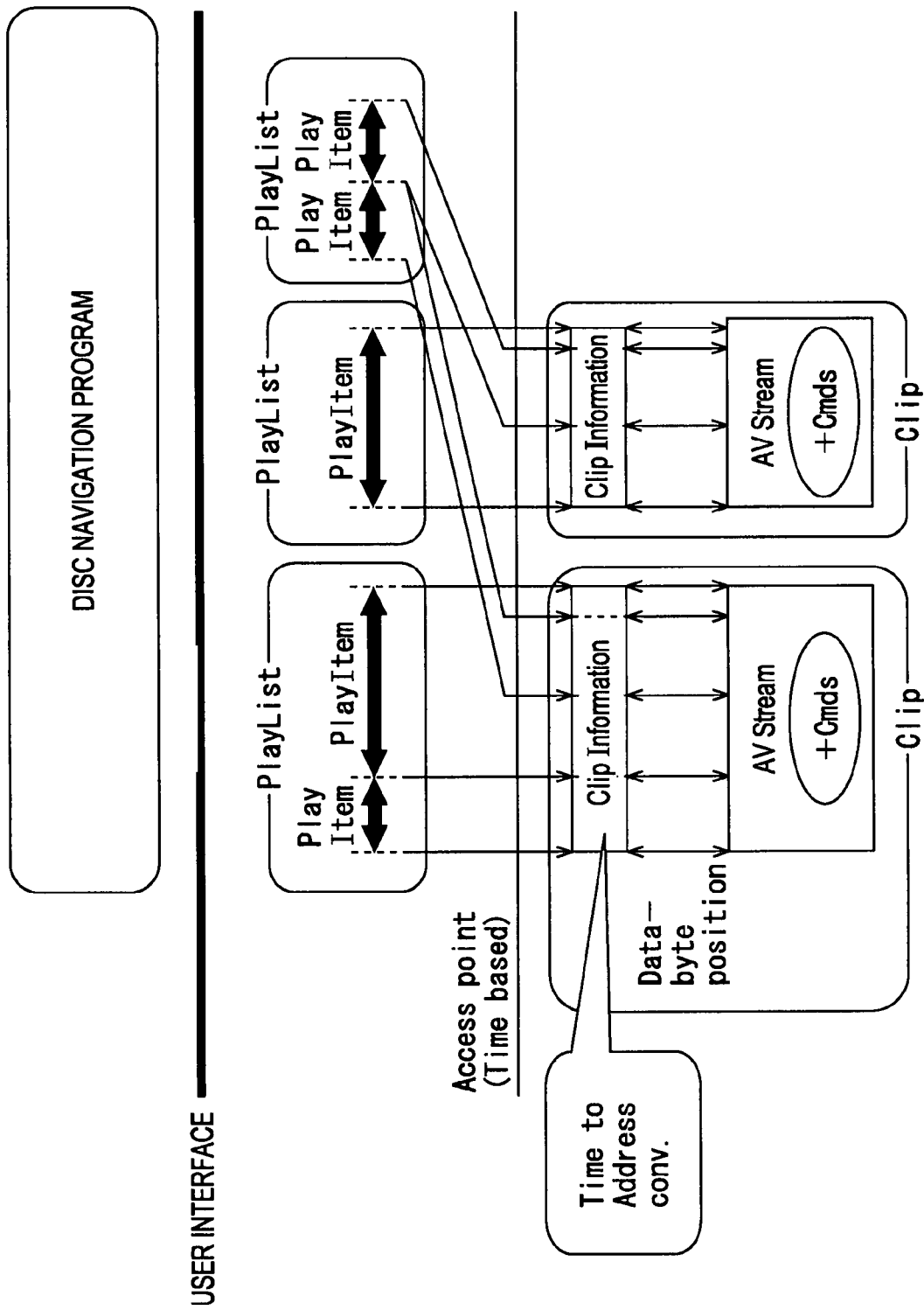
FIG. 1 is a diagram showing an example of an application format of a recording medium to be loaded into a playback apparatus according to a present invention.

FIG. 1 is a diagram showing an example of an application format of a recording medium to be loaded into a playback apparatus 20 (described below with reference to FIG. 35) according to the present invention. The recording medium may be not only an optical disc described below, but also be a magnetic disk or a semiconductor memory.

The application format has two layers for PlayLists (playlists) and Clips (clips) for controlling AV (audio visual) streams. In this case, a pair of one AV stream and clip information, which is information accompanying the AV stream, will be regarded as one object and will be collectively referred to as a "Clip". Hereinafter, an AV stream may also be referred to as an "AV stream file". The clip information may also be referred to as a "clip information file".

In general, files used for a computer and so on are processed as byte strings, and content of an AV stream file is expanded on a timeline and an access point in a Clip is specified by, mainly, a timestamp in a PlayList. That is, the "PlayList" and "Clip" are layers for controlling an AV stream.

When an access point in a Clip is indicated by a timestamp in a PlayList, the clip information file is used to find the information of an address at which decoding in the AV stream file is started, based on the timestamp.

The PlayList is a collection of AV stream playback segments. One playback segment in an AV stream is called a "PlayItem", which is expressed by a pair of an IN-point (playback start point) and an OUT-point (playback end point) of a playback segment on the timeline. Thus, the PlayList includes one or multiple PlayItems, as shown in FIG. 1.

In FIG. 1, a first PlayList from the left includes two PlayItems, which respectively refer to a first half portion and a last half portion of an AV stream contained in a Clip at the left side. A second PlayList from the left includes one PlayItem, which refers to an entire AV stream contained in a Clip at the right side. Further, a third PlayList from the left includes two PlayItems, which respectively refer to a portion of the AV stream contained in the Clip at the left side and a portion of the AV stream contained in the Clip at the right side.

For example, when a disc navigation program shown in FIG. 1 specifies the left-side PlayItem contained in the first PlayList from the left as information indicating a playback position at this point of time, the first half portion that is referred to by the PlayItem and that is contained in the AV stream contained in the left-side Clip is played back. In this manner, the PlayList is used as playback control information for controlling the playback of an AV stream file.

The disc navigation program has a function for controlling the PlayList playback sequence and PlayList interactive playback. The disc navigation program also has, for example, a function for displaying a menu screen through which a user issues an instruction for executing various types of playback. The disc navigation program is written in a programming language, such as Java (registered trademark), and is prepared on a recording medium.

In the present embodiment, in a PlayList, a playback path that is made of an array of one or more PlayItems (continuous PlayItems) is referred to as a main path (Main Path). In a PlayList, a playback path that is parallel (concurrent) with the main path and that is made of an array of one or more sub paths (which may be discontinuous or continuous SubPlayItems) is referred to as a sub path (Sub Path). That is, in the application format of the recording medium to be loaded into the playback apparatus 20 (described below with reference to FIG. 35), a PlayList contains a sub path or paths (Sub Path(s)) to be played back in association with (in accordance with) the main path.

Figure 2:
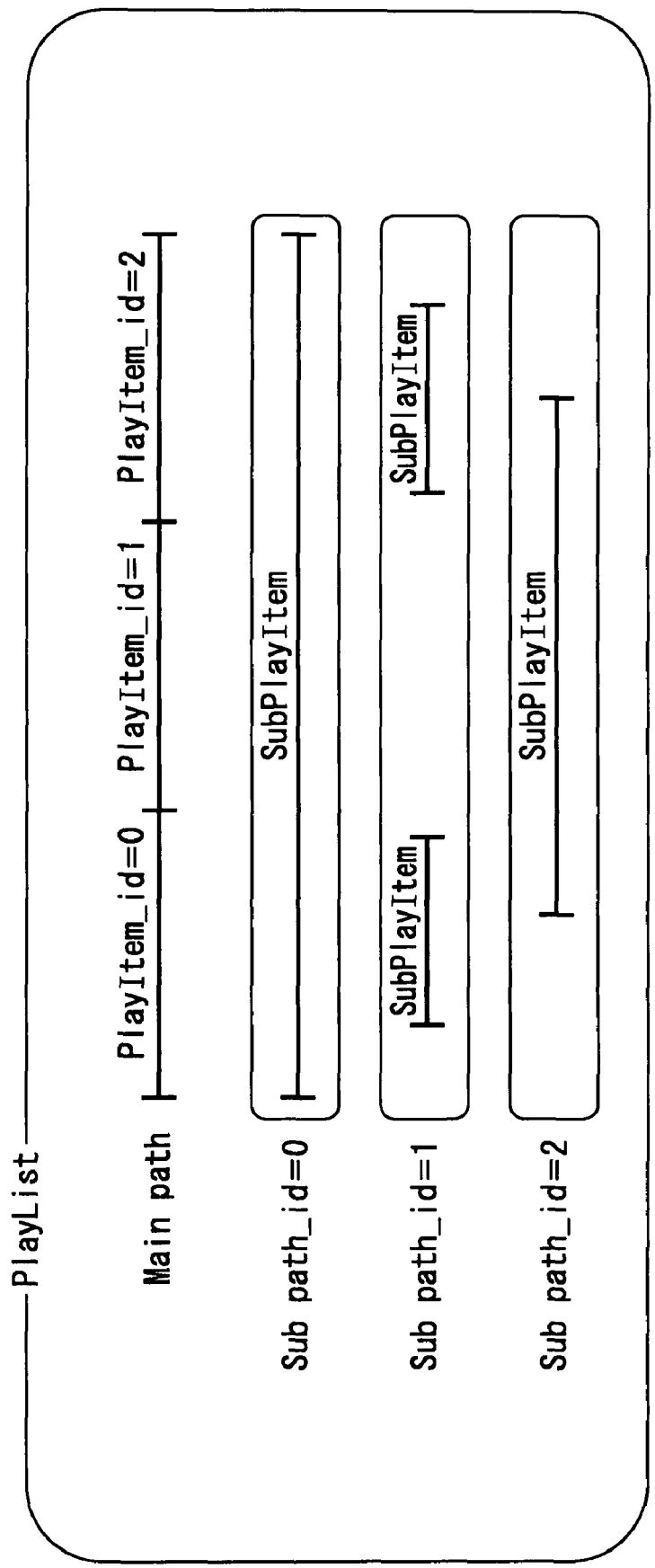
FIG. 2 is a diagram illustrating the structures of a main path and sub paths.

FIG. 2 is a diagram illustrating the structures of a main path and sub paths. A PlayList can have one main path and one or more sub paths. One main path is composed of an array of one or more PlayItems and one sub path is composed of one or more SubPlayItems.

In the case of the example shown in FIG. 2, the PlayList has one main path, composed of an array of three PlayItems, and three sub paths. The PlayItems included in the main path are given IDs (identifications) sequentially from the first PlayList. Specifically, the main path is composed of PlayItems with PlayItem_id=0, PlayItem_id=1, and PlayItem_id=2. The sub paths are also given corresponding IDs, namely, Subpath_id=0, Subpath_id=1, and Subpath_id=2, sequentially from the first sub path. The sub path with Subpath_id=0 contains one SubPlayItem, the sub path with Subpath_id=1 contains two SubPlayItems, and the sub path with Subpath_id=2 contains one SubPlayItem.

A stream that is referred to by the SubPlayItem contained in the sub path with Subpath_id=0 is assumed to be, for example, Japanese-dubbed audio for a movie, and may be played back instead of an audio stream of an AV stream file referred to by the main path. A stream that is referred to by a SubPlayItem contained in the sub path with Subpath_id=1 is assumed to be, for example, a movie director's cut, and may be a movie director's comment that is contained in a predetermined portion of the AV stream file referred to by the main path.

A clip AV stream file that is referred to by one PlayItem contains at least video stream data (main image data). The clip AV stream file may or may not contain one or more audio streams to be played back at the same time as (in synchronization with) the video stream (main image data) contained in the clip AV stream file. Further, the clip AV stream file may or may not contain one or more bitmap caption streams to be played back at the same time as the video stream contained in the clip AV stream file. Also, the clip AV stream file may or may not contain one or more interactive graphics streams to be played back at the same time as the video stream contained in a clip AV stream file. The video stream contained in the clip AV stream file is multiplexed with the audio stream, the bitmap caption stream file, or the interactive graphics stream which is to be played back at the same time as the video stream. That is, video stream data, zero or more audio streams, zero or more pieces of bitmap caption stream data, and zero or more pieces of interactive graphics stream data which are to be played back in conjunction with the video stream data are multiplexed with a clip AV stream file referred to by one PlayItem.

That is, a clip AV stream file that is referred to by one PlayItem contains multiple types of streams, such as video stream, audio stream, bitmap caption stream file, and interactive graphics stream.

One SubPlayItem refers to audio stream data or caption data of a stream (another stream) that is different from a clip AV stream file referred to by a PlayItem.

When a PlayList having only a main path is to be played back, the audio-switching or caption-switching operation performed by the user allows audio or captions to be selected from only an audio stream and a sub picture stream which are multiplexed with a Clip referred to by the main path. In contrast, when a PlayList having a main path and a sub path is to be played back, an audio stream and a sub picture stream of a Clip which are referred to by SubPlayItems can also be referred to in addition to an audio stream and a sub picture stream which are multiplexed with a clip AV stream file referred to by the main path.

In this manner, since the configuration in which multiple sub paths are contained in one PlayList and SubPlayItems are referred to by the corresponding sub paths is employed, it is possible to achieve an AV stream with high expandability and high freedom. That is, in this configuration, a SubPlayItem can be subsequently added to a clip AV stream referred to by a main path.

Figure 3:
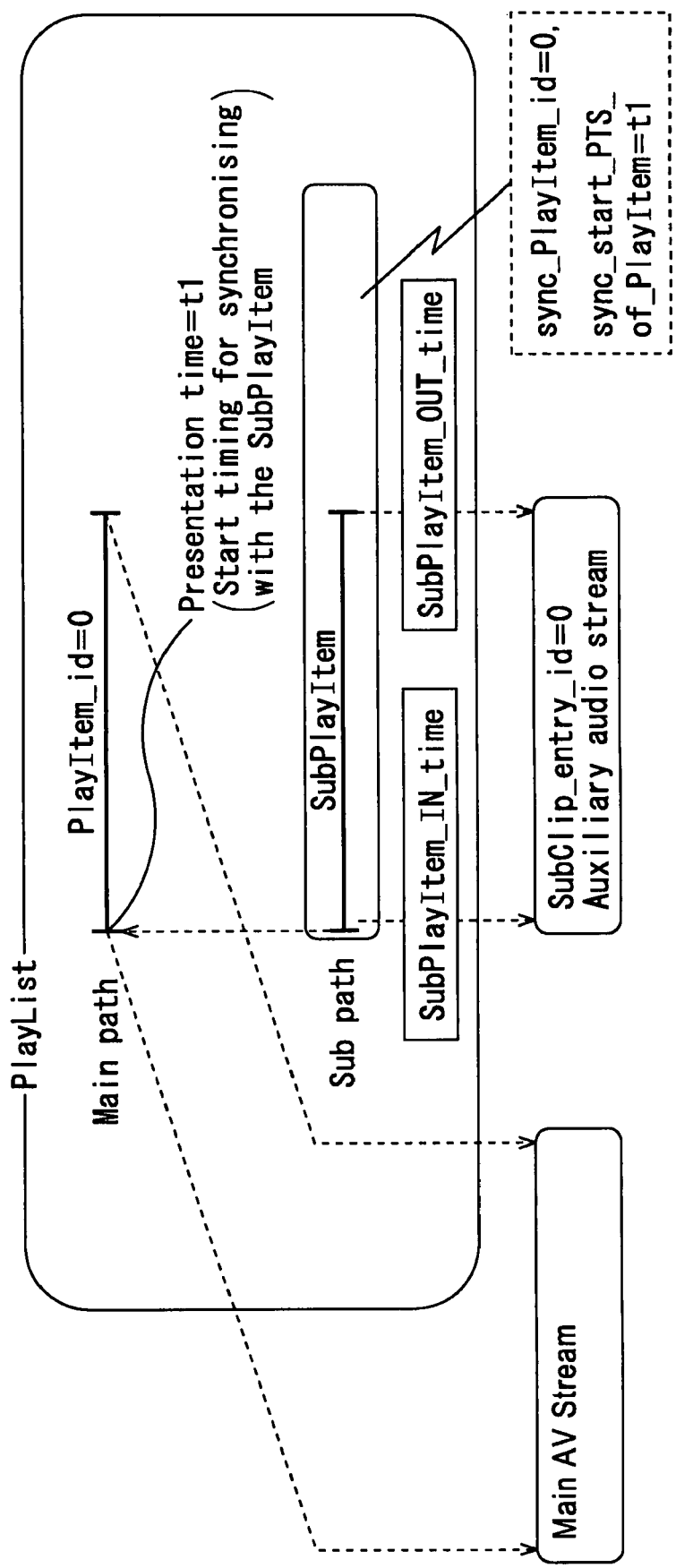
FIG. 3 is a diagram illustrating an example of a main path and a sub path.

FIG. 3 is a diagram illustrating an example of a main path and a sub path. In FIG. 3, a playback path of audio to be played back at the same time as (i.e., in AV synchronization with) the main path is expressed using a sub path.

A PlayList shown in FIG. 3 contains one PlayItem with PlayItem_id=0 as the main path and one SubPlayItem as the sub path. One PlayItem( ) with PlayItem_id=0 refers to a main AV stream shown in FIG. 3. The SubPlayItem( ) contains the following data. First, the SubPlayItem( ) contains Clip_Information_file_name for specifying a Clip that is referred to by the Sub Path (sub path) in the PlayList. In the case of the example shown in FIG. 3, the SubPlayItem refers to an auxiliary audio stream (an audio stream) with SubClip_entry_id=0. The SubPlayItem( ) contains SubPlayItem_IN_time and SubPlayItem_OUT_time for specifying a Sub-Path playback segment in a Clip (the auxiliary audio stream in this case). The SubPlayItem( ) further contains sync_PlayItem_id and sync_start_PTS_of_PlayItem for specifying time at which the playback of the sub path is to be started on the timeline (playback timeline) of the main path. In the case of the example shown in FIG. 3, sync_PlayItem_id is 0 and sync_start_PTS_of_PlayItem is t1. This makes it possible to specify time t1 at which the playback of the sub path is to be started on the timeline (playback timeline) of PlayItem_id=0 of the main path. That is, in the case of the example shown in FIG. 3, it is shown that the playback start time t1 of the main path and the start time t1 of the sub path are the same.

In this case, the audio clip AV stream referred to by the sub path must not contain STC discontinuous points (systemtime-based discontinuous points). A clip audio sample clock used for the sub path is locked to an audio sample clock for the main path.

In other words, the SubPlayItem( ) contains information specifying a Clip referred to by the sub path, information specifying a playback segment of the sub path, and information specifying time at which the playback of the sub path is to be started on the timeline of the main path. The clip AV stream used by the sub path does not contain an STC. Thus, based on the information contained in the SubPlayItem( ) (i.e., the information specifying the Clip referred to by the sub path, the information specifying the playback segment of the sub path, and the information specifying time at which the playback of the sub path is to be started on the timeline of the main path), playback can be performed by referring the audio stream of a clip AV stream that is different from the clip AV stream (main AV stream) referred to by the main path.

In this manner, the PlayItem and the SubPlayItem control the corresponding clip AV stream files, and in this case, the clip AV stream file (the main AV stream) controlled by the PlayItem and the clip AV stream file controlled by the SubPlayItem are different from each other.

As in the example shown in FIG. 3, a caption-stream playback path to be played back at the same time as the main path can also be expressed using a sub path.

Figure 4:
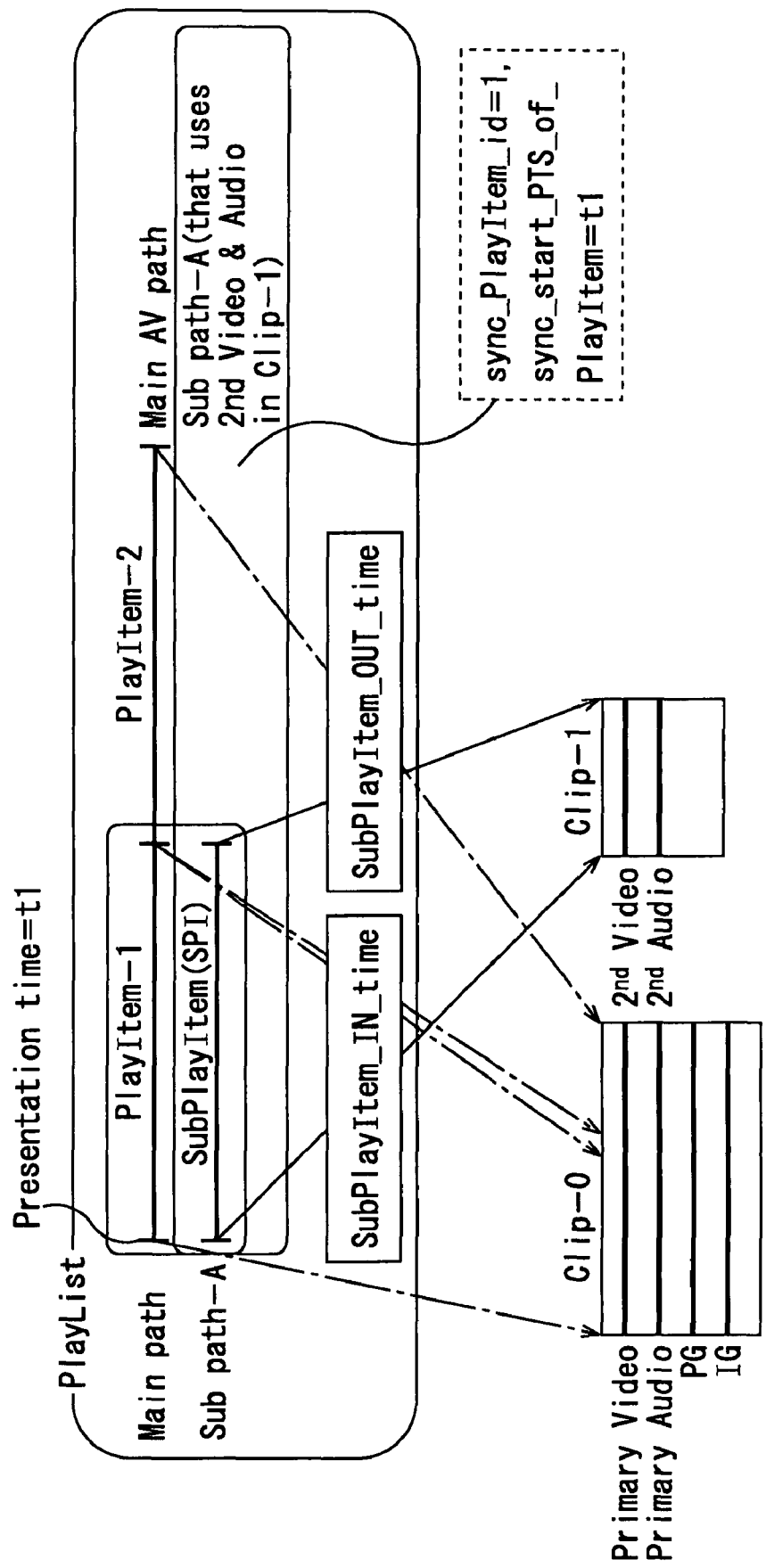
FIG. 4 is a diagram illustrating another example of a main path and a sub path.

FIG. 4 is a diagram illustrating another example of a main path and a sub path. In FIG. 4, a video-and-audio playback path to be played back at the same time as (i.e., in AV synchronization with) the main path is expressed using a sub path.

A stream file that is referred to by PlayIem-1 of the main path corresponds to first-half portions of a primary (primary) video stream and a primary audio stream of Clip-0 and first-half portions of a PG (presentation graphics) stream and an IG (interactive graphics) stream, and a main AV stream file that is referred to by PlayItem-2 corresponds to last-half portions of the primary (primary) video stream and the primary audio stream of Clip-0 and last-half portions of the PG stream and the IG stream.

A stream file that is referred to by a SubPlayItem of the sub path corresponds to a secondary (2nd) video stream and a secondary audio stream of Clip-1.

Such a configuration is used, for example, when the primary (primary) video stream, the primary audio stream, the PG stream, and the IG stream which are referred to by the main path constitute single-movie content (AV content), the secondary video stream and the secondary audio stream which are referred to by the sub path constitute a bonus track containing a director's comment on the movie, and the video and audio streams referred to by the sub path are mixed with (superimposed on) the video and audio streams referred to by the main path.

In some cases, a secondary stream is not synchronized with a primary stream (i.e., the playlist is not set so that they are always simultaneously played back). Even in such a case, the above-described configuration is also used, when the user inputs an instruction for combining and displaying a bonus track to the playback apparatus (player) while viewing a movie and then the video and audio of the primary stream referred to by a main path and the video and audio of the secondary stream referred to by a sub path are mixed and played back.

In FIG. 4, the main path has two PlayItems with PlayItem_ids=0 and 1 and the sub path (Subpath_id=0) has one SubPlayItem. The SubPlayItem (described below with reference to FIG. 21) to be called up by the sub path (described below with reference to FIG. 19) contains SubPlayItem_IN_time and SubPlayItem_out_time for specifying a playback segment of the sub path.

Figure 5:
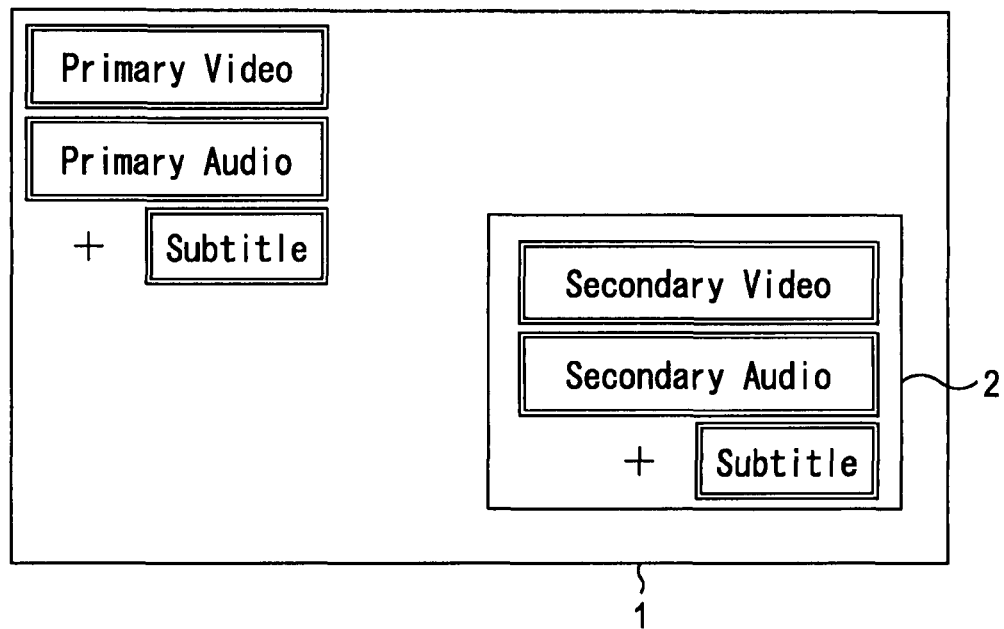
FIG. 5 is a diagram illustrating a main display screen and a sub display screen.

When the secondary video and the secondary audio are superimposed on the primary video and the primary audio described with reference to FIG. 4 and are played back and output, the audios are combined and output and the secondary video of the videos is superimposed and displayed as a sub display screen 2 having a predetermined size at a predetermined position on a main display screen 1 on which the primary video is displayed, as shown in FIG. 5.

In FIG. 4, what is referred to by the main path is the primary stream and what is referred to by the sub path is the secondary stream. However, each of the primary stream and the secondary stream may be referred to by the main path or the sub path. For example, both of the primary stream and the secondary stream may be referred to by the main path and the both of the primary stream and the secondary stream may be referred to by the sub path.

Thus, such a configuration can be used, as shown in FIG. 5, when a primary video stream is displayed on a main screen and a secondary stream is displayed on an auxiliary screen within the main screen, that is, when the so-called PinP (picture-in-picture: Picture-in-Picture) display is performed.

Figure 6:
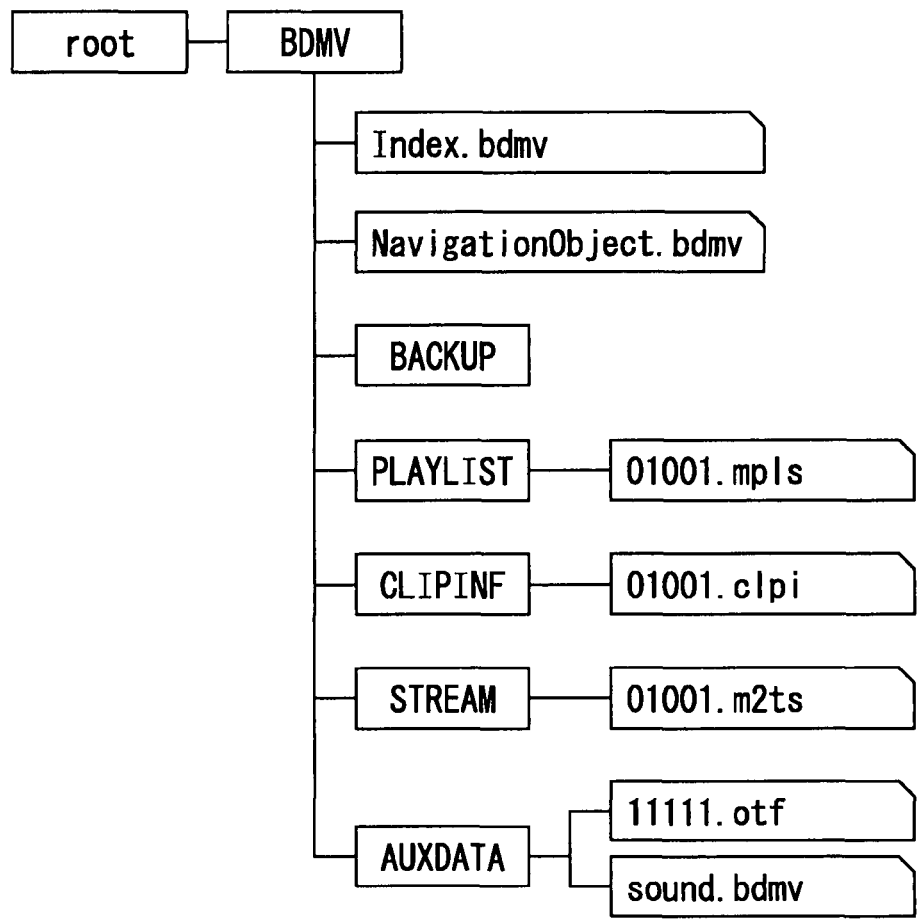
FIG. 6 is a diagram showing an example of the file system of data files that can be played back.

FIG. 6 is a diagram showing an example of the file system of data files that can be played back by the playback apparatus 20 (described below with reference to FIG. 35). FIG. 6 shows one example of a case in which data files that can be played back by the playback apparatus 20 are supplied through a recording medium such as an optical disc. This file system has a directory structure. It is preferable that the data files that are played back by the playback apparatus 20 have a file system as shown in FIG. 6, for example, when the data files that can be played back by the playback apparatus 20 are recorded on a recording medium other than an optical disc and supplied therefrom or are recorded in an internal recording medium and played back.

In this file system, a directory given a name "BDMV" is provided below a "root", and contains a file given a name "Index.bdmv" and a file given a name "NavigationObject.bdmv". These files will hereinafter be referred to as an "index file" and a "navigation object file", respectively, as needed. Each file will be represented using a form in which a "file" is added to a "file name", or each directory will be represented using a form in which a "directory" is added to a "directory name", as appropriate.

The index file is a file in which the above-noted index table is described and contains information regarding a menu for playing back data files that can be played back by the playback apparatus 20. The playback apparatus 20 causes a display device to display a playback menu screen, based on the index file. Examples of the playback menu screen includes an item for playing back all content contained in data files that can be played back by the playback apparatus 20, an item for playing back only a specific chapter, an item for repeated playback, and an item for displaying an initial menu. Navigation objects that are to be executed when each item is selected can be included in the index table in the index file. When the user selects one of the items on the playback menu screen, the playback apparatus 20 executes commands for the navigation objects set in the index table in the index file.

The navigation object file contains the navigation objects. The navigation objects include commands for controlling the playback of a PlayList contained in the data files that can be played back by the playback apparatus 20. For example, selecting and executing one of the navigation objects contained in the file system allows content to be played back.

The BDMV directory further has a directory given a name "BACKUP" (i.e., a BACKUP directory), a directory given a name "PLAYLIST" (i.e., a PLAYLIST directory), a directory given a name "CLIPINF" (i.e., a CLIPINF directory), a directory given a name "STREAM" (i.e., a STREAM directory), and a directory given a name "AUXDATA" (i.e., an AUXDATA directory).

Files and data for backing up files and data which can be played back by the playback apparatus 20 are recorded in the BACKUP directory.

PlayList files are stored in the PLAYLIST directory. As shown in the figure, each PlayList file is given a name having a 5-digit-number file name to which an extension ".mpls" is added. The PlayList file is described below with reference to FIG. 7.

Clip information files are stored in the CLIPINF directory. As shown in the figure, each clip information file is given a name having a 5-digit-number file name to which an extension ".clpi" is added.

clip AV stream files and sub stream files are stored in the STREAM directory. As shown in the figure, each stream file is given a name having a 5-digit-number file name to which an extension ".m2ts" is added.

The AUXDATA directory does not contain any clip AV stream file and sub stream file and contains files, such as data that are referred to by the clip AV stream files and sub stream files and data used separately from the clip AV stream files and sub stream files. In the example shown in FIG. 6, the AUXDATA directory contains a caption-font file given a name "11111.otf" and sound-effect sound data and so on given a name "sound.bdmv".

When data files that can be played back by the playback apparatus 20 are distributed via an optical disc, author_id and disc_id are recorded in physical pits as secure electrical data that cannot be overwritten by users and so on. Author_id is an identifier that is assigned to, for example, a content producer, such as a production company or movie distribution company, or a corresponding title author to identify the title author, which is the supplier of the recording medium. Disc_id is an identifier that is assigned to identify the type of optical disc produced by the title author indicted by author_id.

It is also preferable that a directory structure similar to that shown in FIG. 6 be provided so that author_ID and an ID corresponding to author_ID are assigned so as to be distinguishable from each other, when data files that can be played back by the playback apparatus 20 are recorded on a removable recording medium other than an optical disc, are recorded on a recording medium inside the playback apparatus, or are stored in an internal storage unit. Regardless of whether or not author_ID and an ID corresponding to author_ID are assigned, the data file that can be played back by the playback apparatus 20 contains a file given a name "Index.bdmv" and a file given a name "NavigationObject.bdmv", as in the case described with reference to FIG. 6. Further, the data file contains a necessary file group or groups of a file group given the name "BACKUP", a file group given the name "PLAYLIST", a file group given the name "CLIPINF", a file group given the name "STREAM", and a file group given the name "AUXDATA", as needed.

Next, a description will be given of a data structure (syntax) of each file described with reference to FIG. 6. This data structure realizes specific structures of the main and sub paths described above with reference to FIGS. 2 to 4.

FIG. 7 shows the data structure of a PlayList file having the extension ".mpls", the PlayList file being stored in the PLAYLIST directory.

A type_indicator filed states information indicating the type of this file and must be encoded into "MPLS" in accordance with ISO 646.

A version_number field indicates four characters showing the version number of xxxx.mpls, and version_number must be encoded in accordance with ISO "0089".

PlayList_start_address indicates the first address of a PlayList( ) in terms of the relative number of bytes from the beginning of the PlayList file.

PlayListMark_start_address indicates the first address of a PlayListMark( ) in terms of the relative number of bytes from the beginning of the PlayList file.

PlayListExtensionData start_address indicates the first address of PlayListExtensionData( ) in terms of the relative number of bytes from the beginning of the PlayList file.

AppInfoPlayList( ) contains parameters regarding playback control of the PlayList.

PlayList( ) contains parameters regarding the main path and sub paths in the PlayList. Details of PlayList( ) will be described below with reference to FIG. 18.

PlayListMark( ) contains mark information of the PlayList. Private data can also be inserted into PlayListExtensionData( ).

FIG. 8 shows the syntax of PlayListExtensionData( ).

Length indicates the number of bytes of PlayListExtensionData( ) immediately after this length field to the end of PlayListExtensionData( ).

Data_blocks_start_address indicates the first address of first data_block( ) in terms of the relative number of bytes from the beginning of the PlayListExtensionData( ).

Number_of_PL_ext_data_entries indicates the number of PlayListExtensionData entries contained in PlayListExtensionData( ). Two or more same IDs cannot exist in PlayListExtensionData( ).

ID1 and ID2 state information (such as identifiers) that can identify the types of information stated in data_block of PlayListExtensionData( ).

PL_ext_data_start_address indicates a data_block number at which the PlayListExtensionData is started. The first data of the PlayListExtensionData must be aligned with the beginning of data_block.

PL_ext_data_length indicates the size of the PlayListExtensionData in bytes.

Data_block is an area in which the PlayListExtensionData are stored. All data_blocks in PlayListExtensionData( ) must have the same size.

Data_block can state information indicating the display position and the size of the sub display screen 2 on which the secondary video is displayed, the sub display screen 2 being described with reference to FIG. 5. Data_block can state metadata indicating the setting of picture-in-picture (Picture-in-Picture) display.

FIG. 9 shows a first example of the syntax of pip_metadata (metadata indicating Picture-in-Picture display setting) stated in data_block.

Length indicates the number of bytes of pip_metadata( ) immediately after this length field to the end of pip_metadata( ).

A pip_metadata_type field indicates the type of pip_metadata. As shown n FIG. 10, for pip_metadata_type=0x01, a secondary video stream for which this pip_metadata( ) specifies picture-in-picture display is played back is a synchronous-type video stream, that is, is played back in synchronization with the timeline (playback timeline) of a PlayItem of a main path. Thus, the secondary video stream is always played back and output in synchronization with the primary stream. For pip_metadata_type=0x02, a secondary video stream for which this pip_metadata( ) specifies picture-in-picture display is an asynchronous-type video stream, that is, is played back in synchronization with the timeline of a SubPlayItem of a sub path but does not require synchronization with the timeline of a PlayItem of a main path. Thus, only when an operation input of the user issues an instruction for displaying the secondary stream, the secondary stream is played back and output.

That is, "synchronization with SubPlayItem" expressed by pip_metadata_type=0x02 means that the secondary video stream for which this pip_metadata( ) specifies picture-in-picture display is asynchronous with the timeline of the main path but is synchronous with the timeline of the sub path. That is, pip_metadata( ) for pip_metadata_type=0x02 indicates the display position and the size of the sub display screen 2 during the playback of the SubPlayItem, based on the time when the display of the secondary video is started in response to a user action (operation input).

Ref_to_PlayItem/SubPath_id indicates the value of PlayItem_id of a PlayItem that uses pip_metadata or the value of SubPath_id of a SubPlayItem that uses pip_metadata. That is, when the secondary video stream for which this pip_metadata( ) specifies picture-in-picture display is synchronous with the main path (i.e., when pip_metadata_type is 0x01), ref_to_PlayItem is used, and when the secondary video stream for which this pip_metadata( ) specifies picture-in-picture display is synchronous with the sub path (i.e., when pip_metadata_type is 0x02), ref_to_SubPath_id is used.

Pip_metadata_time_stamp represents a time stamp for a PlayItem that uses pip_metadata, and the video of the secondary video stream is displayed on the sub display screen 2 at the timing indicated by pip_metadata_time_stamp and at the display position and in the size which are specified by pip_metadata( ).

That is, pip_metadata_time_stamp needs to specify presentation time between In_time and Out_time of the PlayItem referenced by ref_to_PlayItem/SubPath_id. When the secondary video stream for which this pip_metadata( ) specifies picture-in-picture display is synchronous with the sub path (i.e., when pip_metadata_type is 0x02), ref_to_PlayItem is used, the video of the secondary video stream is displayed on the sub display screen 2 at a timing that is included in the timeline of the SubPlayItem and that is indicated by pip_metadata_time_stamp and at the display position and in the size which are specified by pip_metadata( ).

Pip_entry_video_PID indicates the value of a PID of the secondary video used for the picture-in-picture display.

Pip_horizotal_position indicates, on the primary-video frame (the main display screen 1 shown in FIG. 5), an X coordinate at the upper left corner of the sub display screen 2 on which the secondary video is displayed. Pip_vertical_position indicates, on the primary-video frame (the main display screen 1 shown in FIG. 5), a Y coordinate at the upper left corner of the sub display screen 2 on which the secondary video is displayed.

Needless to say, a method other than specifying the X and Y coordinates at the upper left corner of the sub display screen 2 by using pip_horizotal_position and pip_vertical_position may also be used to specify the display position of the sub display screen 2 on which the secondary video is displayed. Examples of such a method includes specifying the X and Y coordinates of the lower right corner of the sub display screen 2 and specifying any of a plurality of predetermined display positions.

A pip_scale field states information indicating the size of the sub display screen 2 on which the secondary video is displayed. For example, pip_scale states the size ratio of the secondary video to the primary video, the scale ratio of the secondary video size to its original size, or information indicating how many pixels is included in the sub display screen 2 in each of the vertical direction and horizontal direction.

FIG. 10 shows the value and the meaning of pip_metadata_type shown in FIG. 9.

Pip_metadata_type=0x00 is a value indicating that the meaning is not set for future expansion. For pip_metadata_type=0x01, this pip_metadata( ) is synchronous-type metadata, that is, is synchronous with the timeline of the PlayItem of the main path; therefore, the secondary stream is played back and output always in synchronization with the primary stream. For pip_metadata_type=0x02, this pip_metadata( ) is asynchronous-type metadata, that is, is synchronous with the timeline of the SubPlayItem of the sub path; therefore, the video of the secondary video stream is played back and output on the sub display screen 2, only when an operation input of the user issues an instruction for displaying the secondary stream. Except for the above-noted three values of pip_metadata_type, the meaning is not set for future extension.

FIG. 11 shows a second example of the syntax of pip_metadata stated in data_block. The second example is different from the case shown in FIG. 9. Descriptions for data fields having the same names and the same definitions as those in FIG. 9 are omitted below, as appropriate.

A number_of_pip_entries field indicates the number of picture-in-picture applications.

Synchronous_PIP_metadata_flag indicates with which path a picture-in-picture application (i.e., a secondary video stream) is synchronized. That is, when the value of Synchronous_PIP_metadata_flag is 0', this picture-in-picture application is synchronized with a sub path, and ref_to_SubPath_id is registered for ref_to_PlayItem/SubPath_id. In contrast, when the value of Synchronous_PIP_metadata_flag is 1', this picture-in-picture application is synchronized with a main path, and ref_to_PlayItem is registered for ref_to_PlayItem/SubPath_id.

That is, Synchronous_PIP_metadata_flag shown in FIG. 11 is information for defining a content that is substantially the same as that of pip_metadata_type (FIG. 10) in pip_metadata described with reference to FIG. 9.

A Number_of_pip_metadata_entries field indicates the total number of pieces of PinP metadata for the video stream of ref_to_PlayItem/ref_to_SubPath_id.

Pip_metadata_type indicates the type of picture-in-picture metadata, and can state, for example, not only information indicating the position and the size of the sub display screen 2 on which the secondary video stream is displayed but also, for example, information regarding color designation and the rotation of displayed video relative to the original video of the secondary video stream.

That is, pip_metadata_type shown in FIG. 11 is information having a definition that is different from that of pip_metadata_type in pip_metadata described with reference to FIG. 9.

FIG. 12 shows a third example of the syntax of pip_metadata stated in data_block. The third example is different from the cases shown in FIGS. 9 and 11.

A length field states information indicating the number of bytes of pip_metadata( ) immediately after this length field to the end of pip_metadata( ).

A number_of_metadata_block_entries field states information indicating the number of metadata block entries contained in pip_metadata( ).

Metadata_block_header[k]( ) states information including header information related to a metadata block.

A ref_to_PlayItem_id[k] field states information indicating the value of PlayItem_id of a PlayItem that uses pip_metadata.

A ref_to_secondary_video_stream_id[k] field states information indicating the value of the ID of the secondary video that uses pip_metadata, i.e., the value of secondary_video_stream_id defined in STN_table (described below with reference to FIG. 22) in a PlayItem referred to by ref_to_PlayItem_id.

A pip_timeline_type[k] field states information indicating the type of timeline referred to by pip_metadata_time_stamp. The value and the meaning of pip_timeline_type[k] are described below.

When a flag for is_luma_key is set to 1, luma keying is applied to the secondary video stream in accordance with the values of lower_limit luma_key and upper_limit luma_key.

The lower_limit luma_key field states information indicating the lower limit of the secondary-video luminance value for luma keying.

The upper_limit_luma_key field states information indicating the upper_limit of the secondary-video luminance value for luma keying.

The term "luma keying" herein means superimposing and combining an image, from which unwanted portions are clipped by using component differences in brightness (luminance value), with video. That is, when the flag for is_luma_key is set to 1, an image having a luminance value specified by the range of the luminance-value lower limit to the luminance-value upper_limit, which are defined by lower_limit_luma_key and upper_limit_luma_key, is set to be transparent. Thus, secondary video from which images in the range specified by the brightness information are removed is superimposed on and combined with primary video.

This arrangement allows minimal secondary video to be displayed, thus making it possible to prevent primary video from becoming difficult to be seen. In addition, it is possible to flexibly combine secondary video and primary video.

In this example, the description has been given of a case in which an image can be set transparent through the use of two thresholds, i.e., lower_limit_luma_key and upper_limit_luma_key. The present invention, however, is not limited to the arrangement. For example, one of the thresholds may be used to set only a portion having a luminance value less than or equal to upper_limit_luma_key or a luminance value greater than or equal to upper_limit_luma_key to be transparent.

A metadata_block data_start_address[k] field states information indicating the first address of first metadata_block_data[k]( ) in terms of the relative number of bytes from the first byte of pip_metadata( ). Also, metadata_block_data_start_address[k] entered in pip_metadata( ) must be registered with reference to an address value.

A padding_word is inserted into padding_word, in accordance with the value of metadata_block_data_start_address [k].

Metadata_block_data[k]( ) states information including data information of a metadata block.

A number_pip_metadata_entries[k] field states information indicating the total number of pieces of pip_metadata in metadata_block_data.

A pip_metadata_time_stamp[i] field states information including, for example, a 45 kHz timestamp indicating time at which pip_metadata is used. A minimum interval of two consecutive pip_metadata_time_stamps is one second. The meaning of pip_metadata_time_stamp corresponding to the value of pip_timeline_type is described below.

A pip_composition_metadata( ) field states information regarding the size and position of the primary-video frame.

Pip_horizotal_position[i] indicates, on the primary-video frame (the main display screen 1 shown in FIG. 5), an X coordinate at the upper left corner of the sub display screen 2 on which the secondary video is displayed. Pip_vertical_position[i] indicates, on the primary-video frame (the main display screen 1 shown in FIG. 5), a Y coordinate at the upper left corner of the sub display screen 2 on which the secondary video is displayed.

As shown in FIG. 13, a pip_scale[i] field states information for setting the scale ratio of the secondary video size to its original image size to 1, ½, ¼, 1.5, or a full screen (with which the secondary video is displayed on the entire main display screen 1 shown in FIG. 5).

Pip_composition_metadata( ) in pip_metadata_time_stamp[i] is valid in the interval from pip_metadata_time_stamp[i] to pip_metadata_time_stamp[i+1]. However, the interval in which last pip_compositoin_metadata is valid is from last pip_metadata_time_stamp to the sub-path presentation-end time indicated by ref_to_secondary_video_stream_id[k].

Next, the value and the meaning of pip_timeline_type will be described with reference to FIG. 14 and the meaning of pip_metadata_time_stamp corresponding to the value of pip_timeline_type will be described with reference to FIGS. 15 to 17.

Pip_timeline_type=0 is a value indicating that the meaning is not set for future expansion.

Pip_timeline_type=1 means that the picture-in-picture presentation path is a synchronous-type path. In this case, the type of sub path specified by ref_to_secondary_video_stream_id must be 5 or 7 (details of the sub-path type are described below with reference to FIG. 20).

Figure 15:
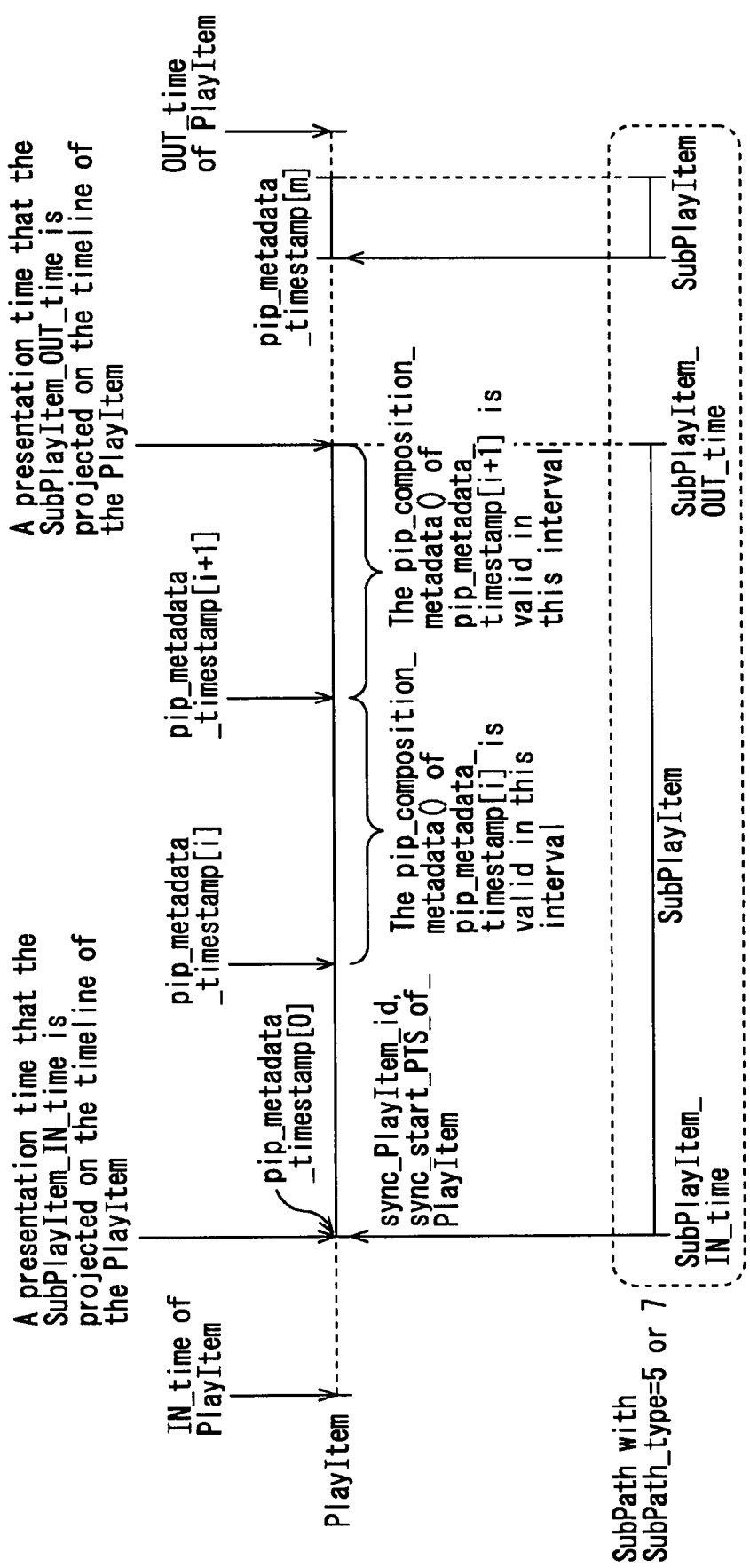
FIG. 15 illustrates the meaning of pip_metadata_time_stamp when pip_timeline_type shown in FIG. 12 is 1.

In this case, as shown in FIG. 15, pip_metadata_time_stamp refers to the timeline of a PlayItem specified by ref_to_PlayItem_id and indicates the playback segment of an associated SubPlayItem. That is, the playback segment of the SubPlayItem is projected on the timeline of a PlayItem referred to by ref_to_PlayItem_id[k]. Pip_metadata_time_stamp[0] indicates the beginning of the playback segment of SubPlayItem [0] in the sub path.

Pip_timeline_type=2 means that the picture-in-picture presentation path is an asynchronous-type path. In this case, the type of sub path specified by ref_to_secondary_video_stream_id must be 6. In this case, the sub path having SubPath_type=6 contains only one SubPlayItem.

Figure 16:
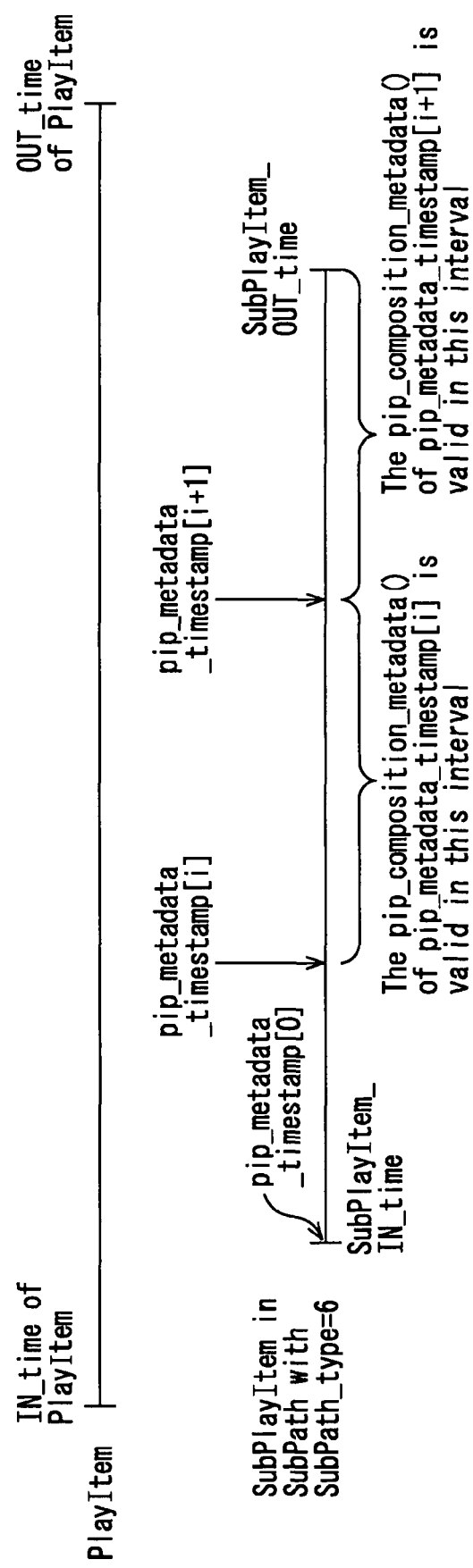
FIG. 16 illustrates the meaning of pip_metadata_time_stamp when pip_timeline_type shown in FIG. 12 is 2.

In this case, as shown in FIG. 16, pip_metadata_time_stamp refers to the timeline of the sub path and indicates the playback segment of a SubPlayItem of the sub path specified by ref_to_secondary_video_stream_id[k]. Pip_metadata_time_stamp[0] indicates the beginning of the playback segment of the SubPlayItem.

Pip_timeline_type=3 means that the picture-in-picture presentation path is an asynchronous-type path. In this case, the type of sub path specified by ref_to_secondary_video_stream_id must be 6.

Figure 17:
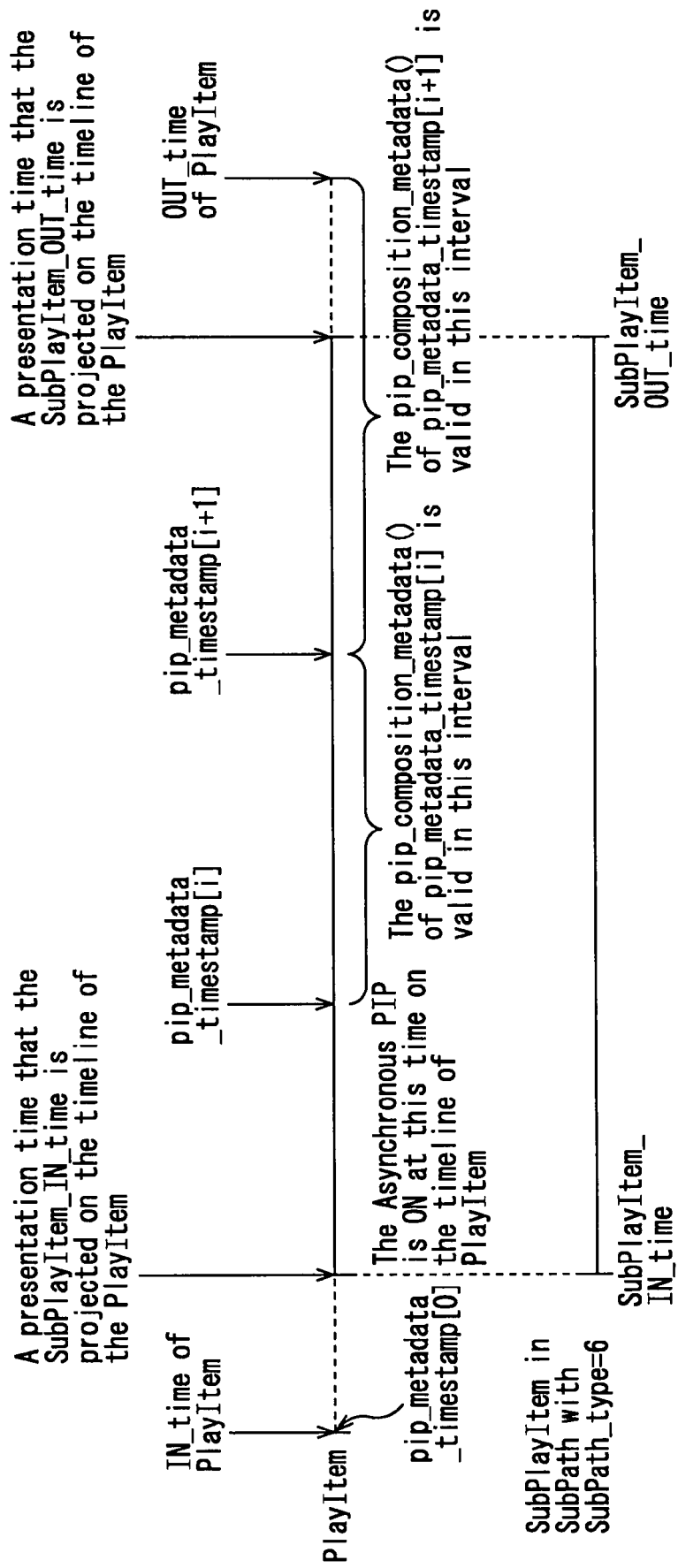
FIG. 17 illustrates the meaning of pip_metadata_time_stamp when pip_timeline_type shown in FIG. 12 is 3.

In this case, as shown in FIG. 17, pip_metadata_time_stamp refers to the timeline of a PlayItem specified by ref_to_PlayItem_id, and indicates the playback segment of the PlayItem specified by ref_to_PlayItem_id[k]. Pip_metadata_time_stamp[0] indicates the beginning of the playback segment of the PlayItem specified by ref_to_PlayItem_id[k].

FIG. 18 shows the syntax of PlayList( ).

A length field has a 32-bit unsigned integer indicating the number of bytes immediately after this length field to the end of PlayList( ). That is, the length field indicates the number of bytes from reserved_for_future_use to the end of the Play List. A 16-bit reserved_for_future_use field is prepared after the length field. Number_of_PlayItems is a 16-bit field indicating the number of PlayItems in the PlayList. For example, in the case of the example shown in FIG. 2, the number of PlayItems is three. The values of PlayItem_ids are assigned from 0 in the order in which PlayItems( ) appear in the PlayList. For example, as shown in FIGS. 2 and 4, PlayItem_ids=0, 1, and 2 are assigned.

Number_of_SubPaths is a 16-bit field indicating the number of sub paths (the number of entries) in the PlayList. For example, in the case of the example shown in FIG. 2, the number of sub paths is three. The values of SubPath_ids are assigned from 0 in the order in which SubPaths( ) appear in the PlayList. For example, as shown in FIG. 2 Subpath_ids 0, 1, and 2 are assigned. In the subsequent 'for' statement, PlayItems are referred to according to the number of PlayItems and sub paths are referred to according to the number of sub paths.

FIG. 19 shows the syntax of SubPath( ).

A length field has a 32-bit unsigned integer indicating the number of bytes immediately after this length field to the end of SubPath( ). That is, the length field indicates the number of bytes from reserved_for_future_use to the end of the Play List. After the length field, 16-bit reserved_for_future_use is prepared. SubPath_type is an 8-bit field indicating the type of sub-path application. SubPath_type is used to indicate a sub-path type, for example, audio, bitmap caption, or text caption. This SubPath_type is descried below with reference to FIG. 20. After SubPath_type, 15-bit reserved_for_future_use is prepared. Is_repeat_SubPath is a 1-bit field specifying the playback method of the sub path, and indicates whether the sub path is repeatedly played back or is played back only once during the playback of the main path. For example, is_repeat_SubPath is used when the playback timings of a main AV stream and a Clip specified by the sub path are different from each other (e.g., when the main path is used for a still-image slide show and the audio path of the sub path is used for BGM (background music) for the main path). After is_repeat_SubPath, 8-bit reserved_for_future_use is prepared. Number_of_SubPlayItems is an 8-bit field indicating the number of SubPlayItems (the number of entries) in one sub path. For example, for number_of_SubPlayItems, the number of SubPlayItems with SubPath_id=0 shown in FIG. 2 is one and the number of SubPlayItems with SubPath_id=1 is two. In the subsequent 'for' statement, the SubPlayItems are referred to according to the number of SubPlayItems.

FIG. 20 is a diagram illustrating an example of SubPath_types (sub path types). That is, sub path types are defined, for example, as shown in FIG. 20.

In the sub path types, the statement "Out-of-mux . . . type" indicates a sub path type (kind) in which a TS (transport stream), i.e., a Clip, that contains an ES (elementary stream) referred to by the sub path is different from a TS (a Clip) that contains a play item (one or more ESs) referred to by the main path, that is, indicates a sub path type (kind) in which an ES referred to by the sub path is not multiplexed with a TS (a Clip) that contains a play item referred to by the main path. Such a type will hereinafter be referred to as a "main-path non-multiplexed path".

In FIG. 20, SubPath_types=0 and 1 mean "reserved". SubPath_type=2 means the audio presentation path of the browsable slideshow (audio presentation path of the browsable slideshow). For example, SubPath_type=2 indicates that, in the playlist, an audio presentation path referred to by the sub path and a main path referred to by a play item are not synchronized with each other.

SubPath_type=3 means an interactive graphics presentation menu (interactive graphics presentation menu). For example, SubPath_type=3 indicates that, in the playlist, an interactive graphics menu referred to by the sub path and a main path referred to by a play item are not synchronized with each other.

SubPath_type=4 means a text subtitle presentation path (text caption presentation path). For example, SubPath_type=4 indicates that, in the playlist, a text-caption presentation path referred to by the sub path and a main path referred to by a play item are synchronized with each other.

In this case, when an ES referred to by a main path and an ES referred to by a sub path are not synchronized with each other as in the case of SubPath_types=2 and 3, the type (kind) of the sub path will hereinafter be referred to as an "asynchronous-type path". On the other hand, when an ES referred to by a main path and an ES referred to by a sub path are synchronized with each other as in the case of SubPath_type=4, the type (kind) of the sub path will hereinafter be referred to as a "synchronous-type path".

SubPath_type=5 means "Out-of-mux and AV synchronized type of one or more elementary streams path (primary audio/PG/IG/secondary audio path)" and "Out-of-mux and AV synchronized type of Picture-in-Picture presentation path which contains one or more elementary stream paths". That is, SubPath_type=5 represents a main-path TS non-multiplexed type and asynchronous type path, and represents one or more ES (primary audio/PG/IG/secondary audio) paths or a picture-in-picture presentation path.

The term "picture-in-picture presentation path" herein means, in the above-described picture-in-picture scheme, at least one (a sub path type) of a primary audio stream, a secondary stream path, a secondary audio stream, and a sub-title stream with respect to a predetermined primary video stream (a video stream referred to by the main path).

SubPath_type=6 means "Out-of-mux and AV non-Synchronized type of picture-in-picture presentation path which contains one or more elementary streams paths". That is, SubPath_type=6 means a main-path TS non-multiplexed type and asynchronous type path and a picture-in-picture presentation path (one or more ES paths).

SubPath_type=7 means "In-mux type and AV synchronized type of Picture-in-Picture presentation path which contains one or more elementary streams paths".

In this case, the statement "In-mux type" indicates a sub path type (kind) in a case in which a TS (a Clip) that contains an ES referred to by the sub path is different from a TS (a Clip) that contains a play item (one or more ESs) referred to by the main path, that is, indicates a sub path type (kind) in which an ES referred to by the sub path is not multiplexed with a TS (a Clip) that contains a play item referred to by the main path. Such a type will hereinafter be referred to as a "main-path multiplexed path".

That is, SubPath_type=7 means a main-path TS-multiplexed type and asynchronous-type path and a picture-in-picture presentation path, (one or more ES paths).

SubPath_types=8 to 255 mean "reserved".

FIG. 21 shows the syntax of SubPlayItem(i).

A length field has a 16-bit unsigned integer indicating the number of bytes immediately after this length field to the end of the SubPlayItem( ).

In FIG. 21, the fields are divided into a case in which a SubPlayItem refers to one Clip and a case in which a SubPlayItem refers to multiple Clips.

First, a case in which a SubPlayItem refers to one Clip will be described.

The SubPlayItem contains Clip_Information_file_name[0] for specifying a Clip. The SubPlayItem further contains Clip_codec_identifier[0] for specifying a clip codec system, reserved_for_future_use, is_multi_Clip_entries that servers as a flag indicating whether or not multiple clips are registered, and ref_to_STC_id[0] that serves as information regarding STC discontinuous points (system-time-based discontinuous points). When the flag of is_multi_Clip_entries is set, the syntax for the case in which the SubPlayItem refers to multiple Clips is referred to. The SubPlayItem further contains SubPlayItem_IN_time and SubPlayItem_OUT_time for specifying a sub-path playback segment in a Clip. The SubPlayItem further contains sync_PlayItem_id and sync_start_PTS_of_PlayItem for specifying time at which the playback of the sub path is to be started on the timeline of the main path. As described above, sync_PlayItem_id and sync_start_PTS_of_PlayItem are used for the case shown in FIGS. 3 and 4 (i.e., when the playback timing of the main AV stream and the playback timing of the file indicated by the sub path are the same), and are not used when the playback timing of the main AV stream and the playback timing of a file indicated by the sub path are different from each other (e.g., when a still image referred to by the main path and audio referred to by the sub path do not synchronize with each other, like BGM for a slide show including still images). The SubPlayItem_IN_time, SubPlayItem_OUT_time, sync_PlayItem_id, and sync_start_PTS_of_PlayItem are shared in the clip referred to by the SubPlayItem.

Next, a description will be given of a case in which the SubPlayItem refers to multiple Clips (a case of if (is_multi_Clip_entries==1b), i.e., a case in which multiple clips are registered). Specifically, a description will be given of a case in which the SubPlayItem refers to multiple Clips, as shown in FIG. 4.

Num_of_Clip_entries indicates the number of Clips, and specifies Clips, and the number of Clip_Information_file_names[SubClip_entry_ids] specifies Clips other than a Clip having Clip_Information_file_name[0]. That is, num_of_Clip_entries specifies Clips having Clip_Information_file_name[1], Clip_Information_file_name[2], and so on other than a Clip having Clip_Information_file_name[0]. The SubPlayItem also contains Clip_codec_identifier[SubClip_entry_id] for specifying a clip codec system, ref_to_STC_id[SubClip_entry_id] that is information regarding STC discontinuous points (system-time-based discontinuous points), and reserved_for_future_use.

SubPlayItem_IN_time, SubPlayItem_OUT_time, sync_PlayItem_id, and sync_start_PTS_of_PlayItem are shared by the multiple Clips. In the example shown in FIG. 4, SubPlayItem_IN_time, SubPlayItem_OUT_time, sync_PlayItem_id, and sync_start_PTS_of_PlayItem are shared by SubClip_entry_id=0 and SubClip_entry_id=1. Text-based subtitles for selected SubClip_entry_id are played back based on SubPlayItem_IN_time, SubPlayItem_OUT_time, sync_PlayItem_id, and sync_start_PTS_of_PlayItem.

The values of SubClip_ids are assigned from 1 in the order in which Clip_Information_file_names[SubClip_entry_ids] in the SubPlayItem appear. SubClip_entry_id of Clip_Information_file_name[0] is 0.

FIG. 22 shows the syntax of PlayItem( ).

A length field has a 16-bit unsigned integer indicating the number of bytes immediately after this length field to the end of PlayItem( ). Clip_Information_file_name[0] is a field for specifying a Clip referred to by the PlayItem. In the example shown in FIG. 3, a main AV stream is referred to by Clip_Information_file_name[0]. The PlayItem( ) also contains Clip_codec_identifier[0] for specifying a clip codec system, reserved_for_future_use, is_multi_angle, connection_condition, and ref_to_STC_id[0] that is information regarding STC discontinuous points (system-time-based discontinuous points). The PlayItem( ) further contains IN_time and OUT_time for specifying the playback segment of the PlayItem in the Clip. In the example shown in FIG. 3, IN_time and OUT_time represent the playback range of the main clip AV stream file. The PlayItem( ) further contains UO_mask_table( ), PlayItem_random_access_mode, and still_mode. A description for a case in which multiple is_multi_angles are contained is omitted herein, since such a case is not directly related to the present invention.

STN_table( ) in PlayItem( ) provides a scheme that allows the audio-switching or caption-switching operation performed by the user to select audio or captions from a Clip referred to by the PlayItem and Clips referred to by one or more sub paths, when a PlayItem of interest and one or more sub paths to be played back in association with the PlayItem are prepared. STN_table( ) also provides a scheme that allows the user to select mixing playback of two audio streams.

FIG. 23 shows a first example of the syntax of STN_table( ). STN_table( ) is set as attributes of a PlayItem.

A length field has a 16-bit unsigned integer indicating the number of bytes immediately after this length field to the end of STN_table( ). After the length field, 16-bit reserved_for_future_use is prepared. Number_of_video_stream_entries indicates the number of streams that are given video_stream_ids entered (registered) in STN_table( ). Video_stream_id is information for identifying a video stream, and video_stream_number is a video stream number used for video switching and seen by the user.

Number_of_audio_stream_entries indicates the number of streams of first audio streams that are given audio_stream_ids entered (registered) in STN_table( ). Audio_stream_id is information for identifying an audio stream, and audio_stream_number is an audio stream number used for audio switching and seen by the user. Number_of_audio_stream2_entries indicates the number of streams of second audio streams that are given audio_stream_id2s entered in STN_table( ). Audio_stream_id2 is information for identifying an audio stream, and audio_stream_number is an audio stream number used for audio switching and seen by the user. Specifically, audio streams indicated by number_of_audio_stream_entries entered in STN_table( ) are audio streams decoded by a first audio decoder 75-1 in the playback apparatus 20 shown in FIG. 35 and described below, and audio streams indicated by number_of_audio_stream2_entries entered in STN_table( ) are audio streams decoded by a second audio decoder 75-2 in the playback apparatus 20 shown in FIG. 35 and described below. In this manner, audio streams that are to be decoded by the two audio decoders, respectively, can be entered in STN_table( ) shown in FIG. 23 and FIGS. 33 and 34 explained below.

Hereinafter, audio streams indicated by number_of_audio_stream_entries and decoded by the first audio decoder 75-1 in the playback apparatus 20 shown in FIG. 35, i.e., primary audio streams, are called "audio stream #1", and audio streams indicated by number_of_audio_stream2_entries and decoded by the second audio decoder 75-2 in the playback apparatus 20 shown in FIG. 35, i.e., secondary audio streams, are called "audio stream #2". Audio stream #1 is assumed to be an audio stream that is given priority over audio stream #2.

Number_of_PG_txtST_stream_entries indicates the number of streams that are given PG_txtST_stream_ids entered in STN_table( ). In this case, a stream (PG: Presentation Graphics stream) and a text caption file (txtST), which are obtained by performing run-length coding on bitmap captions such as DVD sub pictures, are entered. PG_txtST_stream_id is information for identifying a caption stream, and PG_txtST_stream_number is a caption stream number (a text subtitle stream number) used for caption switching and seen by the user.

Number_of_IG_stream_entries indicates the number of streams that are given IG_stream_ids entered in STN_table( ). In this case, an interactive graphics stream is entered. IG_stream_id is information for identifying an interactive graphics stream, and IG_stream_number indicates a graphics stream number used for graphics switching and seen by the user.

The syntax of stream_entry( ) will now be described with reference to FIG. 24.

A length field has an 8-bit unsigned integer indicating the number of bytes immediately after this length field to the end of stream_entry( ). Type is an 8-bit field indicating the type of information required for uniquely identifying a stream that is given the above-described stream number.

For type=1, a 16-bit packet ID (PID) is specified in order to identify one of multiple elementary streams multiplexed in a Clip (main Clip) referred to by the PlayItem. This PID is indicated by ref_to_stream_PID_of_mainClip. That is, for type=1, specifying only a PID in a main clip AV stream file allows a stream to be determined.

For type=2, when the sub path refers to multiple Clips at the same time and multiple elementary streams are multiplexed in each Clip, SubPath_id, a Clip ID, and a packet ID (PID) of the sub path are specified in order to identify one of the multiple elementary streams in one Clip (sub Clip) referred to by the sub path. SubPath_id is indicated by ref_to_SubPath_id, the Clip id is indicated by ref_to_SubClip_entry_id, and the PID is indicated by ref_to_stream_PID_of_SubClip. Thus, type=2 is used when multiple Clips are referred to in the SubPlayItem and each Clip is referred to by multiple elementary streams.

In this manner, the types (two types, i.e., type=1 and type=2) are used. Thus, when one or more sub paths to be played back in association with a PlayItem are prepared, one elementary stream can be identified from a Clip referred to by the PlayItem and Clips referred to by one or more sub paths. Type=1 indicates a Clip (main Clip) referred to by a main path and type=2 indicates Clips (sub Clips) referred to by a sub path.

Referring back to FIG. 23, a description will be given of STN_table( ). In the 'for' loop of a video stream ID (video_stream_id), video_stream_id, which starts from 0, is sequentially given to a video elementary stream identified for each stream_entry( ). A video stream number (video_stream_number) may be used instead of the video stream ID (video_stream_id). In this case, video_stream_number is given from 1 and not 0. That is, video_stream_number is obtained by adding 1 to the value of video_stream_id. The video stream number is used for video switching and is seen by the user, and is thus defined from 1.

Similarly, in the 'for' loop of an audio stream ID (audio_stream_id), audio_stream_id, which starts from 0, is sequentially given to an audio elementary stream identified for each stream_entry( ). In the same manner as the video streams, an audio stream number (audio_stream_number) may be used instead of the audio stream ID (audio_stream_id). In this case, audio_stream_number is given from 1 and not 0. That is, audio_stream_number is obtained by adding 1 to the value of audio_stream_id. The audio stream number is used for audio switching and is seen by the user, and is thus defined from 1.

Similarly, in the 'for' loop of an audio stream ID2 (audio_stream_id2), audio_stream_id2, which starts from 0, is sequentially given to an audio elementary stream identified for each stream_entry( ). As in the case of the video streams, an audio stream number 2 (audio_stream_number2) may be used instead of the audio stream ID2 (audio_stream_id2). In this case, audio_stream_number2 is given from 1 and not 0. That is, audio_stream_number2 is obtained by adding 1 to the value of audio_stream_id2. The audio stream number 2 is used for audio switching and is seen by the user, and is thus defined from 1.

That is, in STN_table( ) shown in FIG. 23, audio streams specified by number_of_audio_stream_entries (audio stream #1) and audio streams specified by number_of_audio_stream2_entries (audio stream #2) are defined. In other words, it is possible to enter audio stream #1 and audio stream #2 by using STN_table( ), so that the user can select two audio streams that are to be played back in synchronization with each other.

Similarly, in the 'for' loop of a caption stream ID (PG_txtST_stream_id), PG_txtST_stream_id, which starts from 0, is sequentially given to one bitmap caption elementary stream or text caption identified for each stream_entry( ). As in the case of the video streams, a caption stream number (PG_txtST_stream_number) may be used instead of the caption stream ID (PG_txtST_stream_id). In this case, PG_txtST_stream_number is given from 1 and not 0. That is, PG_txtST_stream_number is obtained by adding 1 to the value of PG_txtST_stream_id. The caption stream number is a caption stream number (a text subtitle stream number) used for caption switching and seen by the user, and is thus defined from 1.

Similarly, in the 'for' loop of a graphics stream ID (IG_stream_id), IG_stream_id, which starts from 0, is sequentially given to an interactive graphics elementary stream identified for each stream_entry( ). In the same manner as the video streams, a graphics stream number (IG_stream_number) may be used instead of the graphics stream ID (IG_stream_id). In this case, IG_stream_number is given from 1 and not 0. That is, IG_stream_number is obtained by adding 1 to the value of IG_stream_id. The graphic stream number is used for graphics switching and is seen by the user, and is thus defined from 1.

Next, a description will be given of stream_attribute( ) in STN_table( ) shown in FIG. 23.

In the 'for' statements subsequent to reserved_for_future_use, video streams are referred to according to the number of video streams, audio streams are referred to according to the main path and sub paths which are set for audio streams by the disc manufacture, PG textST streams are referred to according to the number of PG textST streams, and IG streams are referred to according to the number of IG streams.

Stream_attirubute( ) in the 'for' loop of the video stream ID (video_stream_id) provides stream attribute information of one video elementary stream identified for each stream_entry( ). That is, this stream_attribute( ) states the stream attribute information of one video elementary stream identified for each stream_entry( ).

Similarly, stream_attribute( ) in the 'for' loop of the audio stream ID (audio_stream_id) provides stream attribute information of one audio elementary stream identified for each stream_entry( ). That is, this stream_attribute( ) states the stream attribute information of one audio elementary stream identified for each stream_entry( ). For example, since the number of audio elementary streams identified by type=1 or type=2 in stream_entry( ) shown in FIG. 24 is one, stream_attribute( ) provides the stream attribute information of the single audio elementary stream.

Similarly, stream_attribute( ) in the 'for' loop of the audio stream ID2 (audio_stream_id2) provides stream attribute information of one audio elementary stream identified for each stream_entry( ). That is, this stream_attibute( ) states the stream attribute information of one audio elementary stream identified for each stream_entry( ). For example, since the number of audio elementary streams identified by type=1 or type=2 in stream_entry( ) shown in FIG. 24 is one, stream_attribute( ) provides the stream attribute information of the single audio elementary stream.

Similarly, stream_attribute( ) in the 'for' loop of the caption stream ID (PG_txtST_stream_id) provides stream attribute information of one bitmap caption elementary stream or text caption elementary stream identified for each stream_entry( ). That is, this stream_attibute( ) states the stream attribute information of one bitmap caption elementary stream identified for each stream_entry( ).

Similarly, stream_attribute( ) in the 'for' loop of the graphics stream ID (IG_stream_id) provides stream attribute information of one interactive graphics elementary stream identified for each stream_entry( ). That is, this stream_attibute( ) states the stream attribute information of one interactive graphics elementary stream identified for each stream_entry( ).

The syntax of stream_attribute( ) will now be described with reference to FIG. 25.

A length field has an 16-bit unsigned integer indicating the number of bytes immediately after this length field to the end of stream_attribute( ).

As shown in FIG. 26, stream_coding_type indicates the coding type of an elementary stream. As the coding type of an elementary stream, MPEG-2 video stream, HDMV LPCM audio, Dolby AC-3 audio, dts audio, presentation graphics stream, interactive graphics stream, and text subtitle stream are stated.

As shown in FIG. 27, video_format indicates the video format of a video elementary stream. As the video format of a video elementary stream, 480i, 576i, 480p, 1080i, 720p, and 1080p are stated.

As shown in FIG. 28, frame_rate indicates the frame rate of a video elementary stream. As the frame rate of a video elementary stream, 24000/1001, 24, 25, 30000/1001, 50, and 60000/1001 are stated.

As shown in FIG. 29, aspect_ratio indicates the aspect ratio information of a video elementary stream. As the aspect ratio information of a video elementary stream, a 4:3 display aspect ratio and a 16:9 display aspect ratio are stated.

As shown in FIG. 30, audio_presentation_type indicates the presentation-type information of an audio elementary stream. As the presentation-type information of an audio elementary stream, single mono channel, dual mono channel, stereo (2-channel), and multi-channel are stated.

As shown in FIG. 31, sampling_frequency indicates the sampling frequency of an audio elementary stream. As the sampling frequency of an audio elementary stream, 48 kHz and 96 kHz are stated.

Audio_language_code indicates the language code (e.g., Japanese, Korean, or Chinese) of an audio elementary stream.

PG_language_code indicates the language code (e.g., Japanese, Korean, or Chinese) of a bitmap caption elementary stream.

IG_language_code indicates the language code (e.g., Japanese, Korean, or Chinese) of an interactive graphics elementary stream.

TextST_language_code indicates the language code (e.g., Japanese, Korean, or Chinese) of a text caption elementary stream.

As shown in FIG. 32, character_code indicates the character code of a text caption elementary stream. As the character code of a text caption elementary stream, Unicode V1.1 (ISO 10646-1), Shift JIS (Japanese), KSC 5601-1987 including KSC 5653 for Roman characters (Korean), GB 18030-2000 (Chinese), GB2312 (Chinese), and BIG5 (Chinese) are stated.

The syntax of stream_attribute( ) shown in FIG. 25 will be specifically described below with reference to FIGS. 25 and 26 to 32.

When coding type (stream_coding_type shown in FIG. 25) of an elementary stream is MPEG-2 video stream (FIG. 26), stream_attribute( ) contains the video format (FIG. 27), the frame rate (FIG. 28), and the aspect ratio information (FIG. 29) of the elementary stream.

When the coding type (stream_coding_type shown in FIG. 25) of an elementary stream is HDMV LPCM audio, Dolby AC-3 audio, or dts audio (FIG. 26), stream_attribute( ) contains the presentation type information (FIG. 30), the sampling frequency (FIG. 31), and the language code of the audio elementary stream.

When the coding type (stream_coding_type shown in FIG. 25) of an elementary stream is presentation graphics stream (FIG. 26), stream_attribute( ) contains the language code of the bitmap caption elementary stream.

When the coding type (stream_coding_type shown in FIG. 25) of an elementary stream is interactive graphics stream (FIG. 26), stream_attribute( ) contains the language code of the interactive graphics elementary stream.

When the coding type (stream_coding_type shown in FIG. 25) of an elementary stream is text subtitle stream (FIG. 26), stream_attribute( ) contains the character code (FIG. 32) and the language code of the text caption elementary stream.

The attribute information described above is not limited to those described above.

In this manner, when a PlayItem and one or more sub paths to be played back in association with the PlayItem are prepared, the attribute information of one elementary stream identified by stream_entry( ) can be known from a Clip referred to by the PlayItem and Clips referred to by the one or more sub paths, based on stream_attribute( ).

By checking the attribute information (stream_attribute( )), the playback apparatus can check whether or not it has a function for playing back the elementary stream. Further, by checking the attribute information, the playback apparatus can select an elementary stream corresponding to the initial information of language setting of the playback apparatus.

For example, it is assumed that the playback apparatus has only a function for playing back bitmap caption elementary streams and lacks a function for playing back text caption elementary streams. When the user issues a language-switching instruction to the playback apparatus, the playback apparatus sequentially selects only bitmap caption elementary streams from the 'for' loop of the caption stream ID (PG_txtST_stream_id) and plays back the selected bitmap caption elementary streams.

For example, it is assumed that the initial information of the language setting of the playback apparatus is Japanese. When the user issues an audio-switching instruction to the playback apparatus, the playback apparatus sequentially selects only audio elementary streams whose language code is Japanese from the 'for' loop of the audio stream ID (Audio_stream_id) and plays back the selected audio elementary streams.

For example, for playing back an AV stream (e.g., a movie) that is referred to by a main path and that is composed of a video stream and audio streams, when the user issues an audio-switching instruction to the playback apparatus to specify (select) audio stream #1 (audio output in a typical movie) and audio stream-#2 (comments of the director and performers) as audios to be played back, the playback apparatus mixes (superimposes) audio stream #1 and audio stream #2 and plays back the resulting audio stream together with the video stream.

As can be understand by referring to STN_table( ) shown in FIG. 23, both of audio stream #1 and audio stream #2 may be audio streams contained in a Clip referred to by a main path. Alternatively, one of audio stream #1 and audio stream #2 may be an audio stream contained in a Clip referred to by a main path, and the other audio stream may be an audio stream contained in a Clip referred to by a sub path. In this manner, two streams of audio streams superimposed on a main AV stream referred to by a main path can be selected, mixed, and played back.

In this manner, when a PlayItem and one or more sub paths to be played back in association with the PlayItem are prepared, STN_table( ) in PlayItem( ) provides a scheme that allows the audio-switching or caption-switching operation performed by the user to select audio or captions from a Clip referred to by the PlayItem and Clips referred to by one or more sub paths. Thus, an interactive operation can be performed on a stream and data file which are different from an AV stream that contains a main AV stream and that is to be played back.

Since the configuration in which multiple sub paths are used in one PlayList and SubPlayItems are referred to by the corresponding sub paths is employed, it is possible to achieve an AV stream with high expandability and high freedom. That is, in this configuration, a SubPlayItem can be subsequently added. For example, when a clip AV stream file referred to by a main path and a PlayList associated with the clip AV stream file exist and this PlayList is overwritten by a PlayList to which another sub path is added, it is possible to perform playback by referring to the clip AV stream file referred to by the main path and a clip AV stream file that is different from the clip AV stream file referred to by the main path. Thus, the arrangement can have extensibility.

In addition, STN_table( ) in PlayItem( ) provides a scheme in which audio stream #1 decoded by the first audio decoder 75-1 in the playback apparatus 20 shown in FIG. 35 and described below and audio stream #2 decoded by the second audio decoder 75-2 can be mixed and played back. STN_table( ) provides a scheme in which, for example, when PlayItem( ) and one or more sub paths to be played back in association therewith are prepared, an audio stream of a Clip referred to by the PlayItem, the audio stream being regarded as audio stream #1, and an audio stream of a Clip referred to by a sub path, the audio stream being regarded as audio stream #2, can be mixed and played back. STN_table( ) also provides a scheme in which, for example, two audio streams contained in a Clip (main Clip) referred to by a PlayItem, the two audio streams being regarded as audio stream #1 and audio stream 2, can be mixed and played back. With this arrangement, an audio stream (e.g., a director-comment stream) that is different from the audio stream of a playback main stream in which a main AV stream is recorded can be superimposed and played back. Two audio streams #1 and #2 superimposed on a main AV stream can also be superimposed (mixed) and played back.

Further, STN_table( ) can define a combination of a secondary video stream, primary audio stream, secondary audio stream, and subtitle stream which are to be simultaneously played back in combination with a primary video stream. FIGS. 33 and 34 show a second example of the syntax of STN_table( ).

FIGS. 33 and 34 show an example of the syntax of STN_table( ) when a combination of a secondary video stream, primary audio stream, secondary audio stream, and subtitle stream which are to be simultaneously played back in combination with a primary video stream is defined. In the figures, for portions that are the same as those in FIG. 23, redundant descriptions will be omitted.

In the example shown in FIGS. 33 and 34, a combination of a secondary video stream, primary audio stream, secondary audio stream, and subtitle stream which are to be simultaneously played back in combination with a primary video stream is defined as follows. That is, first, one or more secondary video streams that are to be simultaneously played back in combination with a primary video stream are defined. Subsequently, audio streams (a primary audio stream and a secondary audio stream) and a subtitle stream which are to be simultaneously played back are defined with respect to each of the one or more secondary video streams.

Specifically, in FIG. 33, number_of_video_stream2_entries indicates the number of streams that are given video_stream_id2s entered (registered) in STN_table( ). Video_stream_id2 is information for identifying a secondary video stream, and video_stream_number2 is a secondary video stream number used for video switching and seen by the user.

In FIG. 34, in the 'for' loop of a video stream ID2 (video_stream_id2), video_stream_id2, which starts from 0, is sequentially given to a video elementary stream (a video elementary stream data that serves as a secondary video stream) identified for each stream_entry( ).

In this case, number_of_Audio_combinations_for_video2 is given to video_stream_id2, and in the subsequent 'for' statement, audio_stream_ids and audio_stream_id2s are given according to the number of number_of_Audio_combinations_for_video2s. Number_of_Audio_combinations_for_video2 and the subsequent 'for' statement serve as information that defines a combination of audio streams that are to be played back simultaneously with the secondary video streams, i.e., a combination of a primary audio stream identified by audio_stream_id and a secondary audio stream identified by audio_stream_id2. The number of sets of audio streams that can be combined with the secondary video streams identified by video_stream_id2 (i.e., sets of primary audio streams and secondary audio streams) is expressed by number_of_Audio_combinations_for_video2. As a set of audio streams that can be combined with the secondary video streams identified by video_stream_id2, audio_stream_id that identifies the primary audio streams and audio_stream_id2 that identifies the secondary audio streams are defined in a "for" statement subsequent to number_of_Audio_combinations_for_video2.

Also, number_of_Subtitle_combinations_for_video2 is given to the same video_stream_id2, and in the subsequent 'for' statement, PG_textST_stream_ids are given according to the number of number_of_Subtitle_combinations_ for_ video2s. Number_of_Subtitle_combinations_for_video2 and the subsequent 'for' statement serve as information that defines a combination of subtitle streams to be played back simultaneously with the secondary video streams, i.e., a combination of subtitle streams identified by PG_textST_stream ID. The number of subtitle streams that can be combined with the secondary video streams identified by video_stream_id2 is expressed by number_of_Subtitle_combinations_for video2. Further, PG_textST_stream_id that identifies a subtitle stream that can be combined with the secondary video stream identified by video_stream_id2 is defined in a 'for' statement subsequent to number_of_Subtitle_combinations_for_video2.

As in the case described with reference to FIG. 23, numbers may be used instead of the IDs, for example, an audio stream number (audio_stream_number) may be used instead of audio_stream_id and an audio stream number 2 (audio_stream_number2) may be used instead of audio_stream_id2. The same is true for a video stream and a subtitle stream.

In FIGS. 33 and 34, a secondary video stream to be played back simultaneously with a primary video stream can be defined through the use of video_stream_id2, and a combination of a primary audio stream, a secondary audio stream, and a subtitle stream which are to be played back simultaneously with the secondary video stream can also be defined through the use of video_stream_id2, audio_stream_id, audio_stream_id2, and PG_textST_stream_id. That is, it is possible to define a combination of a secondary video stream, primary audio stream, secondary audio stream, and subtitle stream which are played back simultaneously with a primary video stream.

Thus, a contradictory combination is not defined as a combination of a secondary video stream, primary audio stream, secondary audio stream, and subtitle stream which are to be played back simultaneously with a primary video stream, so that the user can easily select a combination of streams that can be played back simultaneously with a primary video stream.

STN_table( ) in PlayItem( ) defines that, when this PlayItem and one or more sub paths to be played back in association with the PlayItem are prepared, Subpath_type of the sub path(s) is defined to be 5 to 7, i.e., a picture-in-picture presentation path or paths (one or more paths of a secondary video stream, a secondary audio stream, and a presentation graphics stream). With this arrangement, displaying a secondary video stream on a primary video stream that is played back and displayed as a main stream makes it possible to perform picture-in-picture display, as described with reference to FIG. 5.

The picture-in-picture display setting is stated in pip_metadata, as described with reference to FIG. 9, 11, or 12; therefore, the size and the display position of the sub display screen 2 described with reference to FIG. 5 can be arbitrarily set by the content producer or content provider, without depending on a playback apparatus. The picture-in-picture display setting is stated in pip_metadata described with reference to FIG. 9, 11, or 12, rather than in the data itself of a video stream (a secondary video stream) displayed in a picture-in-picture format. That is, when it is desired to change the size and/or the display position of the sub display screen 2 described with reference to FIG. 5, it is sufficient to modify the statement of pip_metadta, without having to modify a video stream (a secondary video stream) displayed in a picture-in-picture format.

The picture-in-picture display setting is stated in pip_metadata, as described with reference to FIG. 9, 11, or 12; therefore, the size of video displayed on the sub display screen 2 described with reference to FIG. 5 can be arbitrarily set by the content producer or content provider, without depending on the original image size of the secondary video stream.

A playback apparatus according to the present invention will be described next. FIG. 35 is a block diagram showing an example of the configuration of a playback apparatus 20 according to the present invention. This playback apparatus is the same as the playback apparatus 20 for playing back the above-described PlayList having a main path and sub path(s).

The playback apparatus 20 has a storage drive 31, a switch 32, an AV decoder unit 33, and a controller 34.

Figure 35:
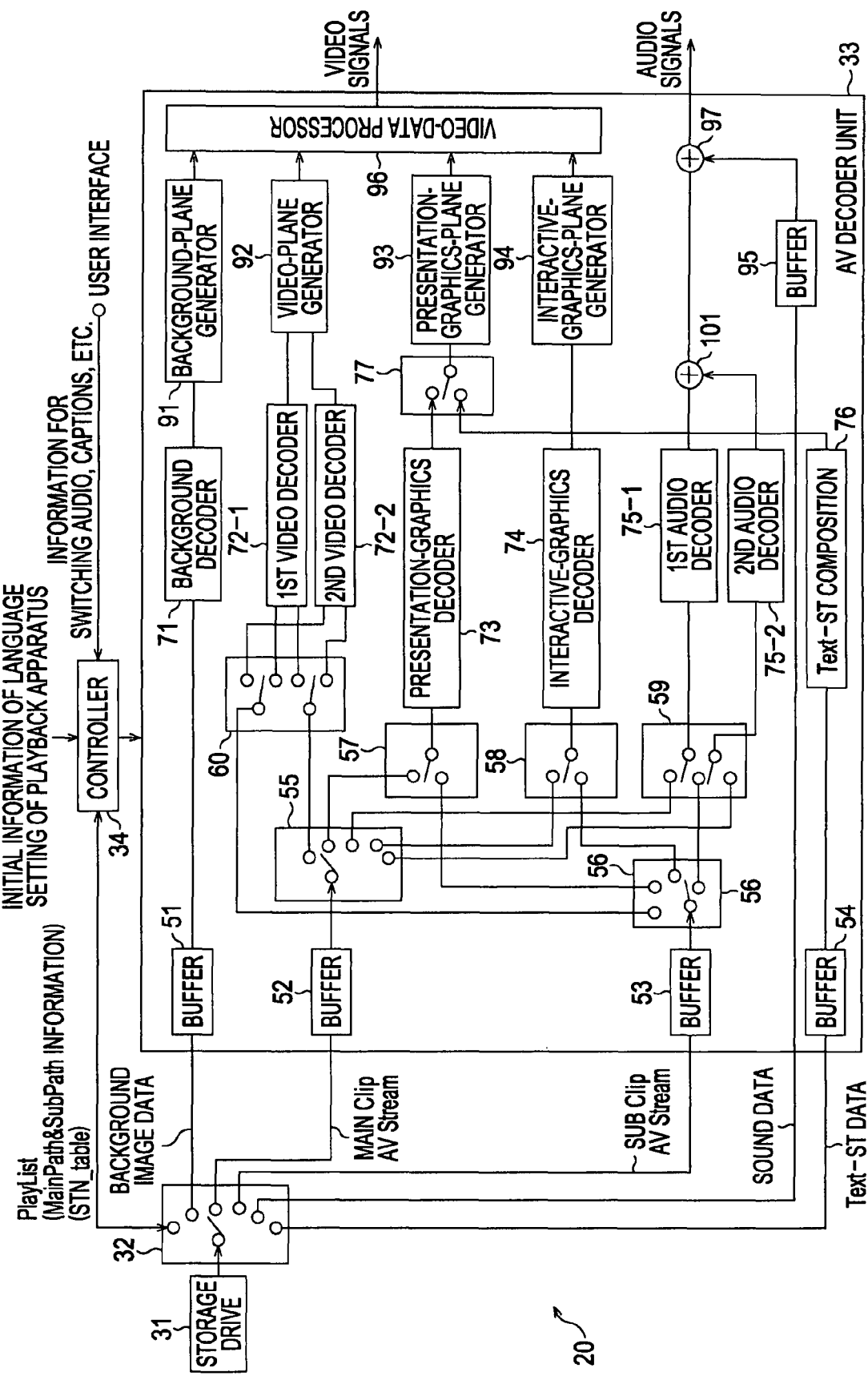
FIG. 35 is a block diagram showing an example of the configuration of a playback apparatus according to the present invention.

In the case of the example shown in FIG. 35, the controller 34 first reads a PlayList file via the storage drive 31, and based on the information of the PlayList file, the controller 34 reads an AV stream and AV data from a recording medium, such as an HDD, Blu-ray disc, or DVD, via the storage drive 31. Using a user interface, the user can issue an instruction for switching audio, captions, and so on to the controller 34. The initial information of language setting of the playback apparatus 20 is supplied from a storage unit, which is not shown, or the like to the controller 34.

The PlayList file contains STN_table( ) in addition to the information of a main path and sub path(s). The controller 34 reads, from the recording medium or the like via the storage drive 31, a main clip AV stream file (hereinafter referred to as a "main Clip") referred to by a PlayItem contained in the PlayList file, a sub clip AV stream file (hereinafter referred to as a "sub Clip") referred to by a SubPlayItem, and text subtitle data referred to by a SubPlayItem. The main Clip referred to by the PlayItem and the sub Clip referred to by the SubPlayItem may be stored in different recording media. For example, the main Clip may be recorded on a recording medium and a corresponding sub Clip may be supplied through a network, which is not shown, and be stored on an HDD. The controller 34 also performs control for selecting an elementary stream corresponding to the playback function of the apparatus (the playback apparatus 20) to perform playback, or performs control for selecting only an elementary stream corresponding to the initial information of language setting of the playback apparatus 20 to perform playback.

When the controller 34 refers to information (or an identifier) described in ID1/ID2 of PlayListExtensionData( ) in the PlayList file and detects that data_block of the PlayListExtensionData( ) states information (pip_metadata) regarding picture-in-picture display, it refers to pip_metadata described with reference to FIG. 9 or 11 to obtain the display setting of a secondary video to be displayed on the sub display screen 2 described with reference to FIG. 5. The controller 34 then controls combining the videos of the primary-video and the secondary-video streams, the combination being performed by a video-plane generator 92 in the AV decoder unit 33.

The AV decoder unit 33 includes buffers 51 to 54, PID filters 55 and 56, switches 57 to 59, a PID filter 60, a background decoder 71, a first video decoder 72-1, a second video decoder 72-2, a presentation-graphics decoder 73, an interactive-graphics decoder 74, the first audio decoder 75-1, the second audio decoder 75-2, a Text-ST composition 76, a switch 77, a background-plane generator 91, the video-plane generator 92, a presentation-graphics-plane generator 93, an interactive-graphics-plane generator 94, a buffer 95, a video-data processor 96, and mixing processors 97 and 98.

The first video decoder 72-1 decodes a primary video stream and the second video decoder 72-1 decodes a secondary video stream. The first audio decoder 75-1 decodes audio stream #1 (a primary audio stream) and the second audio decoder 75-2 decodes audio stream #2 (a secondary audio stream). Specifically, in STN_table( ) shown in FIG. 23 and FIGS. 33 and 34, the first video decoder 72-1 decodes a video stream specified by video_stream_id, the second video decoder 72-2 decodes a video stream specified by video_stream_id2, the first audio decoder 75-1 decodes an audio stream specified by audio_stream_id, and the second audio decoder 75-2 decodes an audio stream specified by audio_stream_id2.

As described above, the playback apparatus 20 has two video decoders (the first video decoder 72-1 and the second video decoder 72-2) to decode two video streams and has two audio decoders (the first audio decode 75-1 and the second audio decoder 75-2) to decode two audio streams. The first video decoder 72-1 and the second video decoder 72-2 will be called "video decoder 72" hereinbelow unless they have to be particularly distinguished from each other, and the first audio decode 75-1 and the second audio decoder 75-2 will be called "audio decoder 75" unless they have to be particularly distinguished from each other.

File data read by the controller 34 is demodulated by a demodulating and ECC-decoding unit, which is not shown, and the demodulated multiplexed stream is subjected to error correction. Under the control of the controller 34, the switch 32 selects the demodulated and error-corrected data for each stream type, and then supplies the selected data to the corresponding buffers 51 to 54. Specifically, under the control of the control 34, the switch 32 performs switching so as to supply background-image data to the buffer 51, supply main-Clip data to the buffer 52, supply sub-Clip data to the buffer 53, and supply Text-ST data to the buffer 54. The buffer 51 buffers the background-image data, the buffer 52 buffers the main-Clip data, the buffer 53 buffers the sub-Clip data, and the buffer 54 buffers the Text-ST data.

The main Clip is a stream (e.g., a transport stream) obtained by multiplexing video and at least one stream of video, audio, bitmap captions (a presentation graphics stream), and interactive graphics. The sub Clip is a stream obtained by multiplexing at least one stream of video, bitmap captions, interactive graphics, and audio. The data of the text subtitle data file (Text_ST) may or may not have the format of a multiplexed stream, such as a transport stream.

When the main Clip, sub Clip, and text subtitle data are read from the storage drive 31 (recording medium), the respective files may be alternately read in a time-shared manner. Alternatively, before the sub Clip and the text subtitle data are read from the main Clip, all files may be preloaded to the buffer (the buffer 53 or the buffer 54).

The playback apparatus 20 reads the data of those files from the recording medium via the storage drive 31 and plays back the video, bitmap captions, interactive graphics, and audio.

Specifically, stream data read from the buffer 52, which is a main-Clip read buffer, is output to the PID (packet ID) filter 55 at the subsequent stage at a predetermined timing. The PID filter 55 sorts the input main Clip in accordance with PIDs (packet IDs) and outputs the sorted streams to the corresponding elementary-stream decoders at the subsequent stage. That is, the PID filter 55 supplies a video stream to the PID filter 60 for supplying it to one of the first video decoder 72-1 and the second video decoder 72-2, supplies a presentation graphics stream to the switch 57 serving as a supply source for the presentation-graphics decoder 73, supplies an interactive graphics stream to the switch 58 serving as a supply source for the interactive-graphics decoder 74, and supplies an audio stream to the switch 59 serving as a supply source for one of the first audio decoder 75-1 and the second audio decoder 75-2.

The presentation graphics stream is, for example, bitmap caption data, and the text subtitle data is, for example, text caption data.

Stream data read from the buffer 53, which is a sub-Clip read buffer, is output to the PID (packet ID) filter 56 at the subsequent stage at a predetermined timing. The PID filter 56 sorts the input sub Clip in accordance with PIDs (packet IDs) and outputs the sorted streams to the corresponding elementary-stream decoders at the subsequent stage. That is, the PID filter 56 supplies the supplied video stream to the PID filter 60 for supplying it to one of the first video decoder 72-1 and the second video decoder 72-2, supplies a presentation graphics stream to the switch 57 serving as a supply source for the presentation-graphics decoder 73, supplies an interactive graphics stream to the switch 58 serving as a supply source for the interactive-graphics decoder 74, and supplies an audio stream to the switch 59 serving as a supply source for one of the first audio decoder 75-1 and the second audio decoder 75-2.

Data read from the buffer 51, which buffers background image data, is supplied to the background decoder 71 at a predetermined timing. The background decoder 71 decodes the background image data and supplies the decoded background image data to the background-plane generator 91.

The switch 57 selects one of the presentation graphics stream, contained in the main Clip and supplied from the PID filter 55, and the presentation graphics stream, contained in the sub Clip, and supplies the selected presentation graphics stream to the presentation-graphics decoder 73 at the subsequent stage. The presentation-graphics decoder 73 decodes the presentation graphics stream and supplies the data of the decoded presentation graphics stream to the switch 77, which serves as a supply source for the presentation-graphics-plane generator 93.

The switch 58 selects one of the interactive graphics stream, contained in the main Clip and supplied from the PID filter 55, and the interactive graphics stream, contained in the sub Clip, and supplies the selected interactive graphics stream to the interactive-graphics decoder 74 at the subsequent stage. That is, the interactive graphics stream simultaneously supplied to the interactive-graphics decoder 74 is a stream separated from either the main Clip or the sub Clip. The interactive-graphics decoder 74 decodes the interactive graphics stream and supplies data of the decoded interactive graphics stream to the interactive-graphics-plane generator 94.

In addition, the switch 59 selects one of the audio stream, contained in the main Clip and supplied from the PID filter 55, and the audio stream, contained in the sub Clip, and supplies the selected audio stream to the first audio decoder 75-1 or the second audio decoder 75-2 at the subsequent stage. In this case, the audio stream simultaneously input to the first audio decoder 75-1 is a stream separated from either the main Clip or the sub Clip. Similarly, the audio stream simultaneously input to the second audio decoder 75-2 is a stream separated from either the main Clip or the sub Clip. For example, when audio stream #1 and audio stream #2 are contained in the main Clip, the PID filter 55 filters audio stream #1 and audio stream #2 based on the PIDs of the audio streams and supplies the resulting audio stream to the switch 59.

For example, the switch 59 selects a connection so as to supply audio stream #1, supplied from the PID filter 55, to the first audio decoder 75-1 and to supply audio stream #2, supplied from the PID filter 55, to the second audio decoder 75-2.

The PID filter 60 receives the video stream contained in the main Clip and supplied from the PID filter 55 or the video stream contained in the sub Clip and supplied from the PID filter 56. Under the control of the controller 34, the PID filter 60 determines whether the received video stream is a primary video stream or a secondary video stream, and supplies the primary video stream to the first video decoder and supplies the secondary video stream to the second video decoder 72-2.

The video stream sorted by the PID filter 60 is supplied to the first video decoder 72-1 or the second video decoder 72-2 at the subsequent stage. The first video decoder 72-1 or the second video decoder 72-2 decodes the supplied video stream and outputs the decoded video data to the video-plane generator 92.

When the video-plane generator 92 receives the video data from the first video decoder 72-1 and the second video decoder 72-2, the video-plane generator 92 combines the supplied video data under the control of the controller 34 that refers to pip_metadata. The video-plane generator 92 then generates a video plane including a main display screen 1 and a sub display screen 2, as described with reference to FIG. 5, and supplies the video plane to the video-data processor 96. When the video data from only the first video decoder 72-1 is supplied to the video-plane generator 92, the video-plane generator 92 generates a video plane by using the supplied video data and supplies the generated video plane to the video-data processor 96. Combining two pieces of video data is also called, for example, "mixing" or "superimposing".

The first audio decoder 75-1 decodes the audio stream and supplies the data of the decoded audio stream to the mixing processor 101. The second audio decoder 75-2 decodes the audio stream and supplies the data of the decoded audio stream to the mixing processor 101.

In this case, when audio stream #1 and audio stream #2 are superimposed for playback (when two audio streams are selected by the user as audio streams to be played back), audio stream #1 decoded by the first audio decoder 75-1 and audio stream #2 decoded by the second audio decoder 75-2 are supplied to the mixing processor 101.

The mixing processor 101 mixes (superimposes) the audio data from the first audio decoder 75-1 and the audio data from the second audio decoder 75-2 and outputs the resulting data to the mixing processor 97 at the subsequent stage. In the present embodiment, the mixing (superimposition) of the audio data output from the first audio decoder 75-1 and the audio data output from the second audio decoder 75-2 is also called "combination". The term "combination" also refers to "mixing two pieces of audio data".

The sound data selected by the switch 32 is supplied to the buffer 95 and is buffered thereby. The buffer 95 supplies the sound data to the mixing processor 97 at a predetermined timing. In this case, the sound data is sound effect data resulting from menu selection or the like. The mixing processor 97 mixes (superimposes or combines) the audio data mixed by the mixing processor 101 (i.e., the audio data resulting from the mixing of the audio data output from the first audio decoder 75-1 and the audio data output from the second audio decoder 75-2) and the sound data supplied from the buffer 95, and outputs the resulting data as audio signals.

Data read from the buffer 54, which is a text-subtitle read buffer, is output to the text subtitle composition (decoder) 76 at the subsequent stage at a predetermined timing. The text subtitle composition 76 decodes the Text-ST data and supplies the decoded data to the switch 77.

The switch 77 selects one of the presentation graphics streams decoded by the presentation-graphics decoder 73 and the Text-ST (text subtitle data), and supplies the selected data to the presentation-graphics-plane generator 93. That is, a caption image simultaneously supplied to the presentation-graphics-plane generator 93 is output from either the presentation-graphics decoder 73 or the text subtitle (Text-ST) composition 76. The presentation graphics stream simultaneously input to the presentation-graphics decoder 73 is a stream separated from either the main Clip or the sub Clip (i.e., is selected by the switch 57). Thus, the caption image simultaneously output to the presentation-graphics-plane generator 93 is the decoded output of the presentation graphics streams from the main Clip, the presentation graphics stream from the sub Clip, or the text subtitle data.

Based on the background image data supplied from the background decoder 71, the background-plane generator 91 generates a background plane, which serves as, for example, a wallpaper image when a video image is displayed in a reduced size, and supplies the generated background plane to the video-data processor 96.

Based on the data (the presentation graphics stream or text subtitle data) selected by the switch 77 and supplied, the presentation-graphics-plane generator 93 generates a presentation graphics plane, which serves as, for example, a rendering image, and supplies the generated presentation graphics plane to the video-data processor 96. Based on the interactive graphics stream data supplied from the interactive-graphics decoder 74, the interactive-graphics-plane generator 94 generates an interactive graphics plane and supplies the generated interactive graphics plane to the video-data processor 96.

The video-data processor 96 combines the background plane from the background-plane generator 91, the video plane from the video-plane generator 92, the presentation graphics plane from the presentation-graphics-plane generator 93, and the interactive graphics plane from the interactive-graphics-plane generator 94, and outputs the combined plane as video signals. The mixing processor 97 mixes (combines or superimposes) the audio data from the mixing processor 101 (i.e., the audio data resulting from the mixing of the audio data decoded by the first audio decoder 75-1 and the audio data decoded by the second audio decoder 75-2) and the sound data supplied from the buffer 95, and outputs the resulting data as audio signals.

The switches 57 to 59 and the switch 77 perform switching based on a user selection via the user interface or on a file containing data of interest. For example, when only the sub clip AV stream file contains an audio stream, the switch 59 switches the connection to the sub-side.

Figure 36:
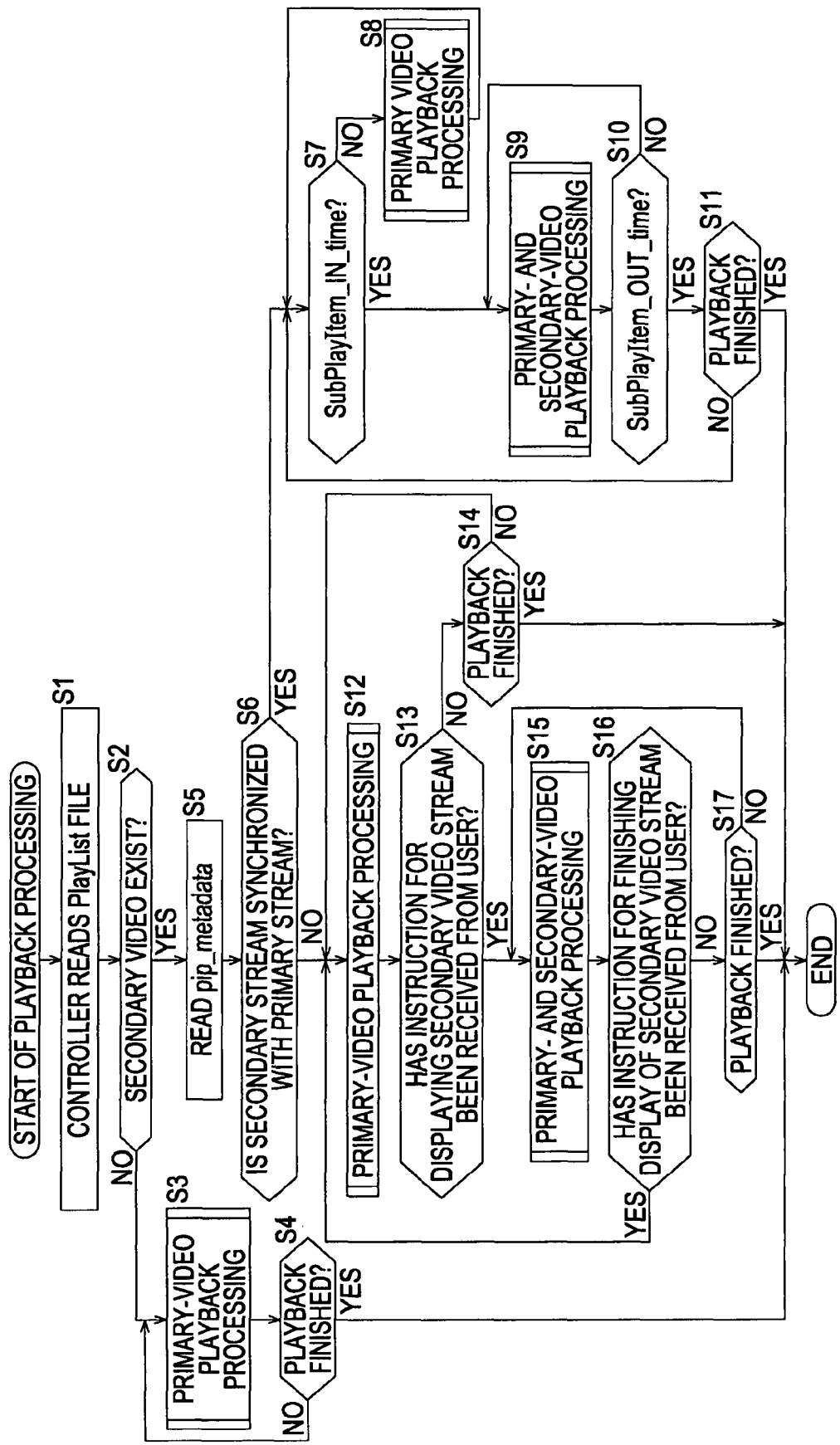
FIG. 36 is a flowchart illustrating playback processing performed by the playback apparatus shown in FIG. 35.

Next, the playback processing performed by the playback apparatus 20 shown in FIG. 35 will be described with reference to the flowchart shown in FIG. 36. This processing is started when the user issues an instruction for playing back a predetermined AV stream via the user interface.

In step S1, the controller 34 reads a PlayList file, recorded on a recording medium or an HDD (hard disk drive), which is not shown, via the storage drive 31. For example, the PlayList file (xxxxx.mpls) described above with reference to FIG. 7 is read.

In step S2, the controller 34 determines whether or not a secondary video exists in a stream to be played back, based on the read PlayList file.

Specifically, out of PlayItems in the read PlayList file, the controller 34 executes the secondary video loop (the 'for' loop of video_strea_id2) in STN_table( ) described above with reference to FIGS. 33 and 34, to thereby determine whether or not a secondary video exists in the stream to be played back.

Figure 37:
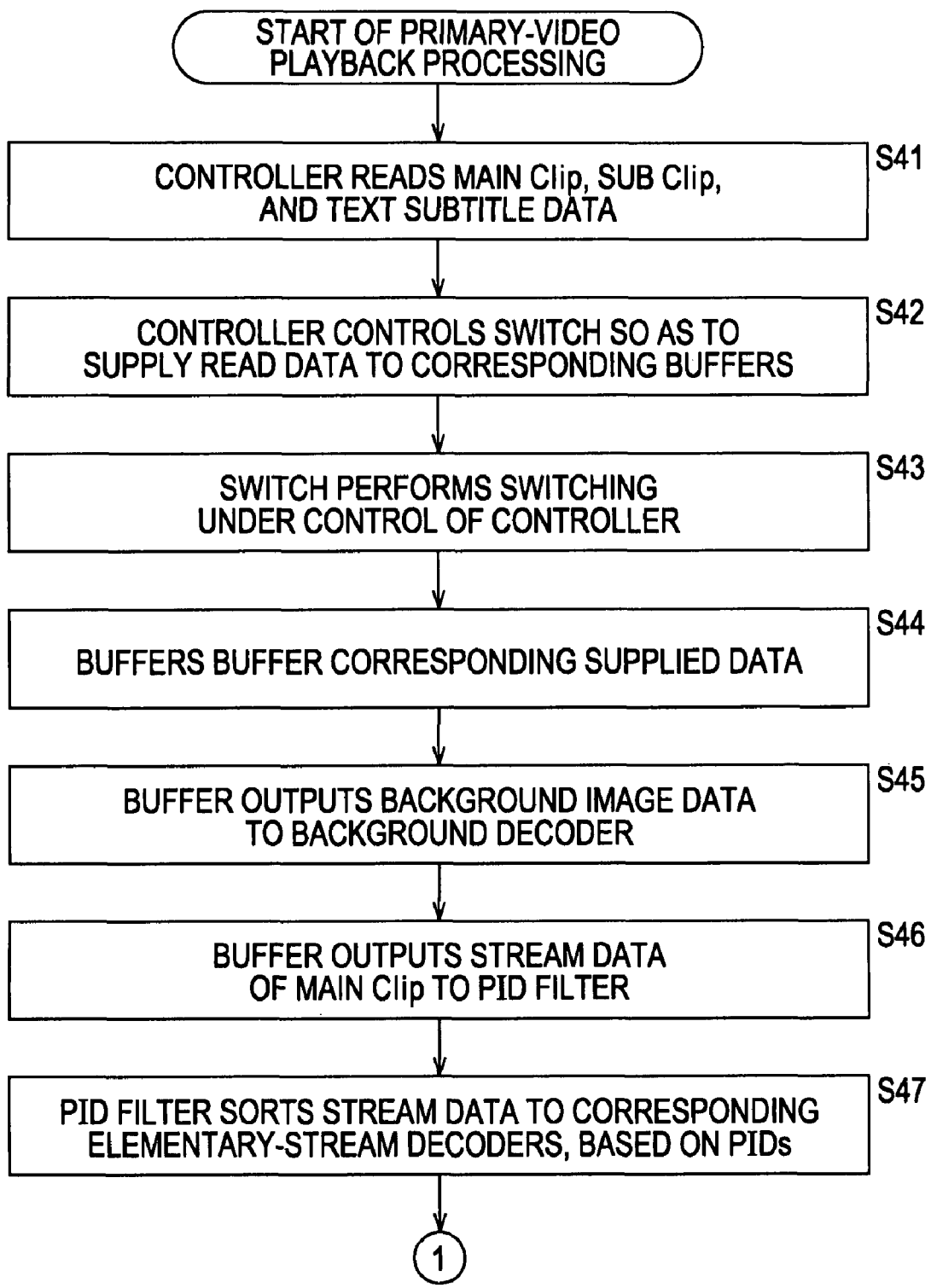
FIG. 37 is a flowchart illustrating primary-video playback processing.
Figure 38:
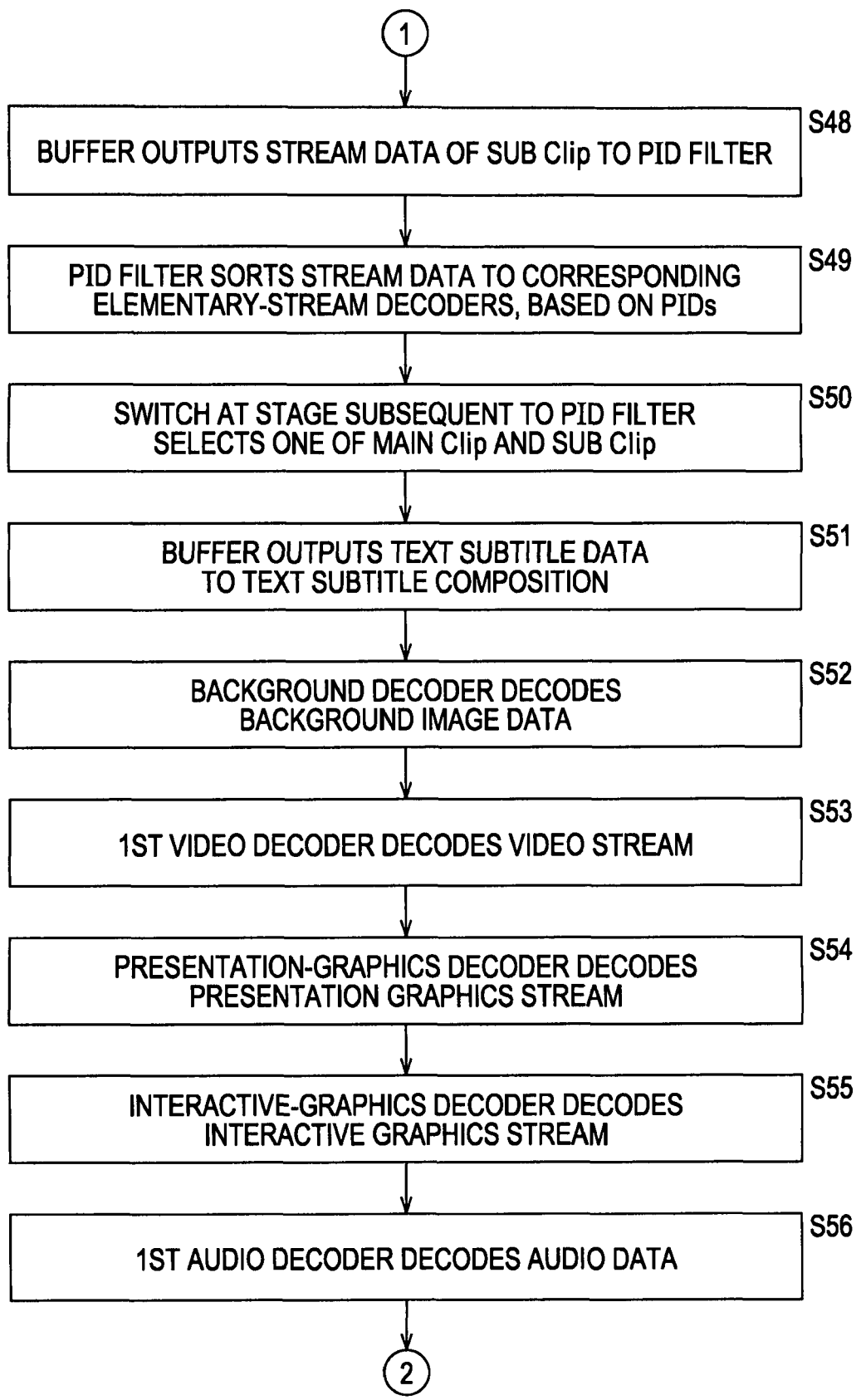
FIG. 38 is a flowchart illustrating the primary-video playback processing.
Figure 39:
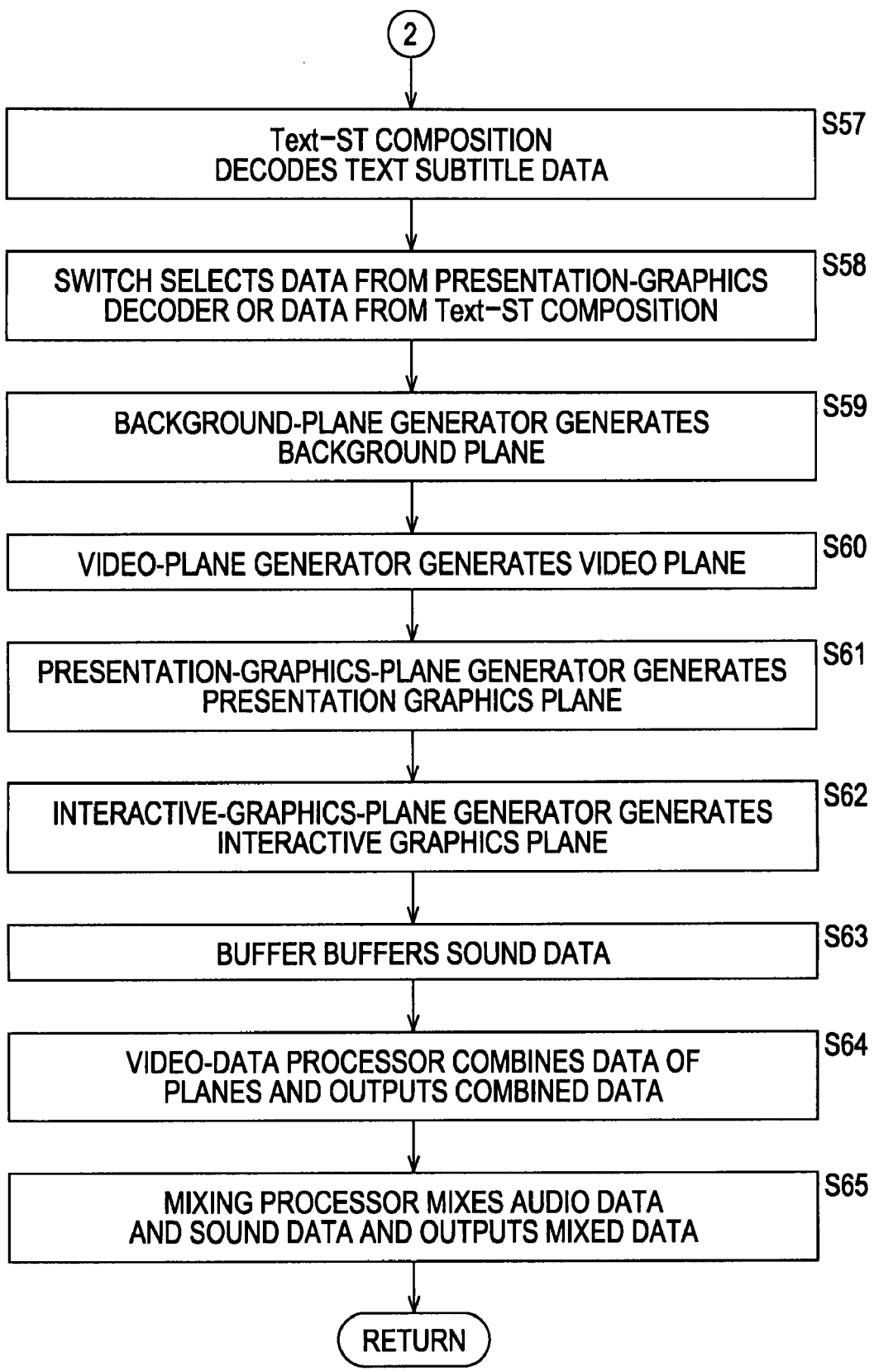
FIG. 39 is a flowchart illustrating the primary-video playback processing.

When it is determined in step S2 that a secondary video does not exist, primary-video playback processing, which is described below with reference to FIGS. 37 to 39, is executed in step S3.

In step S4, the controller 34 determines whether or not the playback of the stream corresponding to the read PlayList file is finished. When it is determined in step S4 that the playback of the stream is not finished, the process returns to step S3, and the subsequent processing is repeated. When it is determined that the playback of the stream is finished, the processing ends.

When it is determined in step S2 that a secondary video exists, the controller 34 reads pip_metadata in step S5. Only pip_metadata associated with the PlayItem may be stored in a memory after a determination as to whether or not a secondary video is contained is made in the manner described above. Alternatively, pip_metadata may also be simultaneously read when the PlayList file is read in step S1, since pip_metadata is part of the PlayList, as described above with reference to FIGS. 7 to 9.

Specifically, based on, for example, present PlayItem_id and secondary_video_stream_id determined from STN_table( ), the controller 34 identifies pip_metadata of interest and reads the identified pip_metadata from the PlayList file.

In step S6, based on the statement of the read pip_metadata, the controller 34 determines whether or not the secondary stream is synchronized with the primary stream (i.e., is synchronized with the timeline of the PlayItem of the main path).

Specifically, for example, when pip_metadata has the data structure described above with reference to FIG. 9, the controller 34 can determine whether or not the secondary stream is synchronized with the primary stream, based on the value of pip_metadata_type described above with reference to FIG. 10. When pip_metadata has the data structure described above with reference to FIG. 11, the controller 34 can determine whether or not the secondary stream is synchronized with the primary stream by referring to Synchronous_PIP_metadata_flag.

For example, when pip_metadata has the data structure described above with reference to FIG. 12, the controller 34 can determine whether or not the secondary stream is synchronized with the primary stream, based on Subpath_type.

When pip_metadata has the data structure described above with reference to FIG. 9 or 11, a determination as to whether or not the secondary stream is synchronized with the primary stream can be made based on Subpath_type, other than pip_metadata, as in the pip_metadata data structure shown in FIG. 12. That is, the controller 34 can determine whether or not the secondary stream is synchronized with the primary stream, based on Subpath_type.

When it is determined in step S6 that the secondary stream is synchronized with the primary stream, the process proceeds to step S7. Then, as described above with reference to FIG. 17, the controller 37 determines whether or not the display time of the primary stream is SubPlayItem_IN_time indicating the beginning of the playback segment of the secondary stream.

When it is determined in step S7 that the display time of the primary stream is not SubPlayItem_IN_time, primary-video playback processing, which is described below with reference to FIGS. 37 to 39, is executed in step S8.

Figure 40:
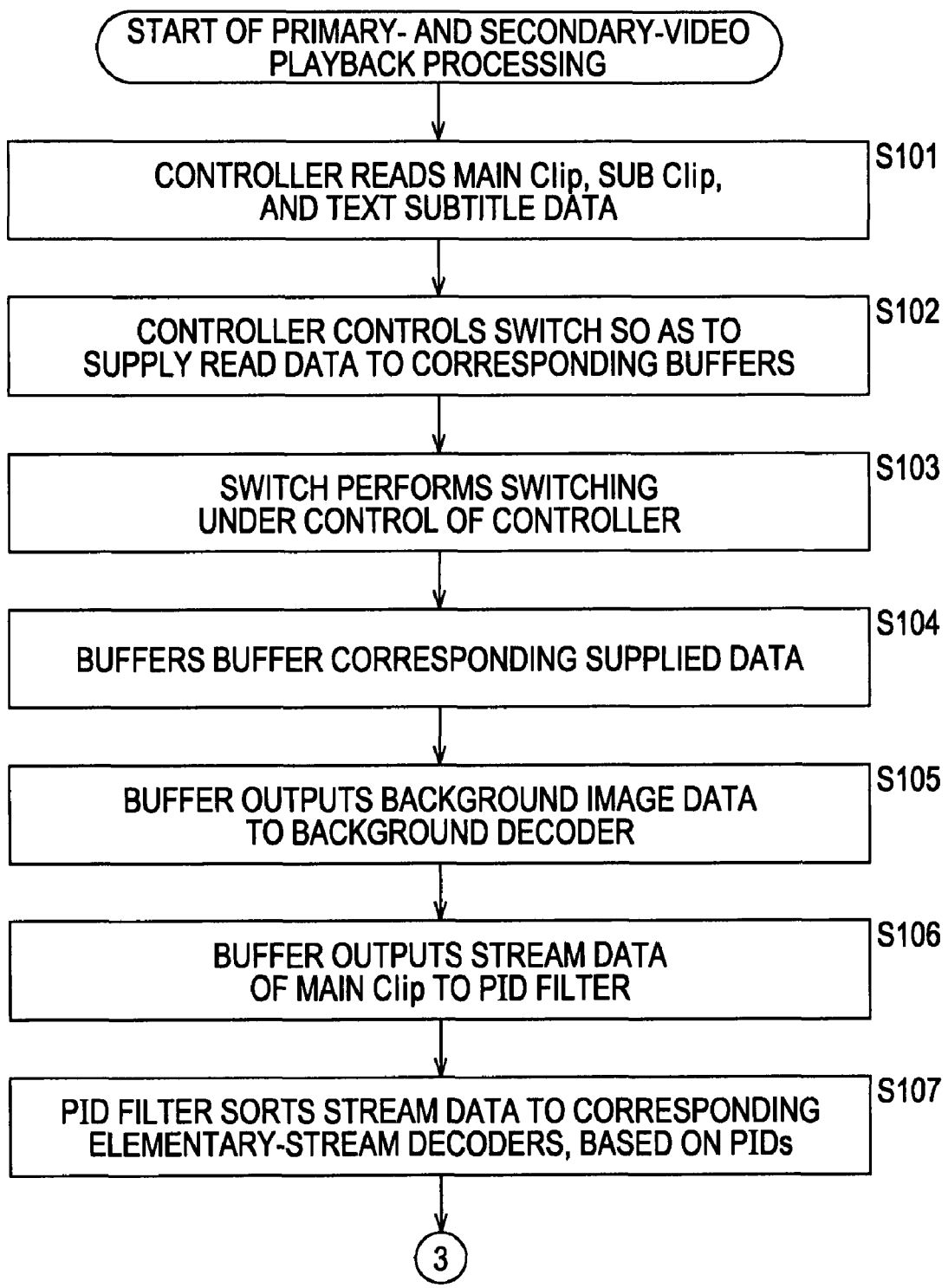
FIG. 40 is a flowchart illustrating primary-video and secondary-video playback processing.
Figure 41:
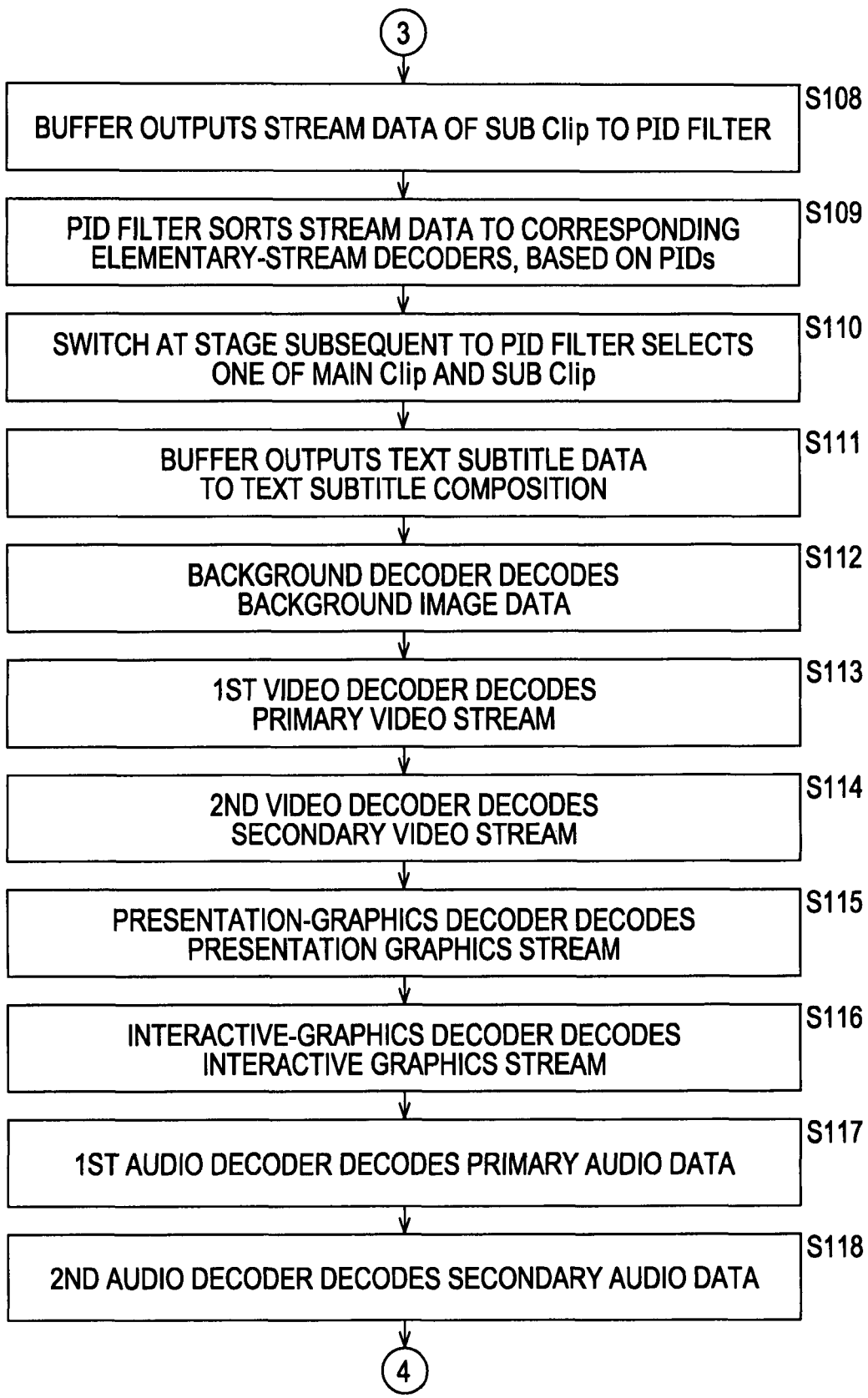
FIG. 41 is a flowchart illustrating the primary- and secondary-video playback processing.
Figure 42:
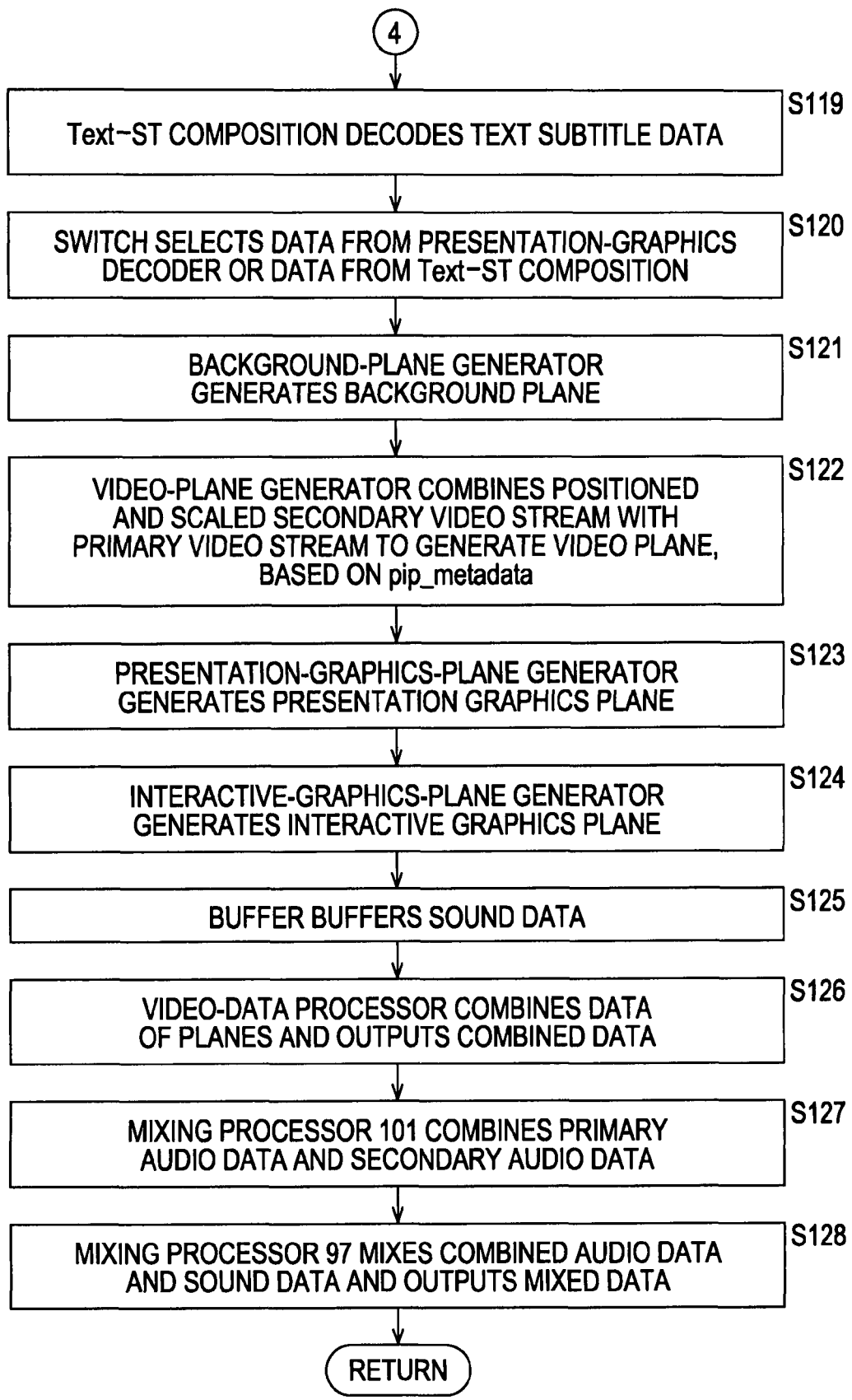
FIG. 42 is a flowchart illustrating the primary- and secondary-video playback processing.

On the other hand, when it is determined in step S7 that the display time of the primary stream is SubPlayItem_IN_time, primary- and secondary-video playback processing, which is described below with reference to FIGS. 40 to 42, is executed in step S9.

In step S10, the controller 34 determines whether or not the display time of the primary stream is SubPlayItem_OUT_time indicating the end of the playback segment of the secondary stream. When it is determined in step S10 that the display time is not SubPlayItem_Out_time, the process returns to step S9 and the subsequent processing is repeated. When it is determined that the display time is SubPlayItem_OUT_time, in step S11, the controller 34 determines whether or not the stream corresponding to the read PlayList file is finished.

When it is determined in step S11 that the playback of the stream is not finished, the process returns to step S7 and the subsequent processing is repeated. When it is determined that the playback of the stream is finished, the processing ends.

On the other hand, when it is determined in step S6 that the secondary stream is not synchronized with the primary stream (i.e., is synchronized with the timeline of a SubPlayItem of the sub path), primary-video playback processing, which is described below with reference to FIGS. 37 to 39, is executed in step S12, since only the primary video stream is displayed until the user issues an instruction for displaying the secondary video stream.

In step S13, the controller 34 determines whether or not an instruction for displaying the secondary video stream has been received from the user.

When it is determined in step S13 that an instruction for displaying the secondary stream has not been received, in step S14, the controller 34 determines whether or not the playback of the stream corresponding to the read PlayList file is finished. When it is determined in step S14 that the playback of the stream is not finished, the process returns to step S12 and the subsequent processing is repeated. When it is determined that the playback of the stream is finished, the processing ends.

On the other hand, when it is determined in step S13 that an instruction for displaying the secondary video stream has been received, primary- and secondary-video playback processing, which is described below with reference to FIGS. 40 to 42, is executed in step S15.

In step S16, the controller 34 determines whether or not an instruction for finishing the display of the secondary video stream has been received from the user. When it is determined in step S16 that an instruction for finishing the display of the secondary stream has been received, the process returns to step S12 and the subsequent processing is repeated.

When it is determined in step S16 that an instruction for finishing the display of the secondary video stream is not received, in step S17, the controller 34 determines whether or not the playback of the stream corresponding to the read PlayList file is finished. When it is determined in step S17 that the playback of the stream is not finished, the process returns to step S15 and the subsequent processing is repeated. When it is determined that the playback of the stream is finished, the processing ends.

In this processing, a determination is made as to whether or not a secondary stream exists for the playback of a stream corresponding a read PlayList file, and when a secondary stream exists, a determination is made as to whether or not the secondary stream is to be displayed while being always superimposed on a primary stream (a main path), based on whether or not the secondary stream is synchronized with the primary stream. When the secondary stream is not synchronized with the primary stream (the main path), a determination is made as to whether or not the secondary stream is to be superimposed on the primary stream, based on whether or not an instruction for displaying the secondary stream is issued from the user or an instruction for finishing the display of the secondary stream is issued from the user.

Next, the primary-video playback processing executed in step S3, S8, or S12 shown in FIG. 36 will be described with reference to the flowcharts shown in FIGS. 37 to 39.

In step S41, the controller 34 reads the main Clip, sub Clip, and text subtitle data (Text_ST data). Specifically, the controller 34 reads the main Clip, based on a PlayItem, which is described above with reference to FIG. 22 and is contained in the PlayList described above with reference to FIG. 18. The controller 34 also reads the sub Clip and text subtitle data, based on SubPlayItems, which are described with reference to FIG. 21 and are referred to by the sub path(s) contained in the PlayList.

In step S42, the controller 34 controls the switch 32 so as to supply the read data (the main Clip, sub Clip, and text subtitle data) to the corresponding buffers 51 to 54. Specifically, the control 34 switches the switch 32 so as to supply background image data to the buffer 51, supply the data of the main Clip to the buffer 52, supply the data of the sub Clip to the buffer 53, and supply the Text-ST data to the buffer 54.

In step S43, under the control of the controller 34, the switch 32 performs switching. As a result, the background image data is supplied to the buffer 51, the data of the main Clip is supplied to the buffer 52, the data of the sub Clip is supplied to the buffer 53, and the text subtitle data is supplied to the buffer 54.

In step S44, the buffers 51 to 54 buffer the corresponding supplied data. Specifically, the buffer 51 buffers the background-image data, the buffer 52 buffers the data of the main Clip, the buffer 53 buffers the data of the sub Clip, and the buffer 54 buffers the Text-ST data.

In step S45, the buffer 51 outputs the background image data to the background decoder 71.

In step S46, the buffer 52 outputs the stream data of the main Clip to the PID filter 55.

In step S47, the PID filter 55 sorts the stream data to the corresponding elementary-stream decoders, based on PIDs given to TS packets contained in the main clip AV stream file. Specifically, the PID filter 55 supplies a video stream to the first video decoder 72-1 via the PID filter 60, supplies a presentation graphics stream to the switch 57 serving as a supply source for the presentation-graphics decoder 73, supplies an interactive graphics stream to the switch 58 serving as a supply source for the interactive-graphics decoder 74, and supplies an audio stream to the switch 59 serving as a supply source for the first audio decoder 75-1. That is, the video stream, the presentation graphics stream, the interactive graphics stream, and the audio stream are given different PIDs from each other.

In step S48, the buffer 53 outputs the stream data of the sub Clip to the PID filter 56.

In step S49, the PID filter 56 sorts the stream data to the corresponding elementary-stream decoders, based on PIDs. Specifically, the PID filter 56 supplies the supplied video stream to the first video decoder 72-1 via the PID filter 60, supplies a presentation graphics stream to the switch 57 serving as a supply source for the presentation-graphics decoder 73, supplies an interactive graphics stream to the switch 58 serving as a supply source for the interactive-graphics decoder 74, and supplies an audio stream to the switch 59 serving as a supply source for the first audio decoder 75-1 and the second audio decoder 75-2.

In step S50, under the control of the controller 34 via the user interface, the switches 57 to 59 and the PID filter 60 at the stages subsequent to the PID filter 55 and the PID filter 56 select one of the main Clip and the sub Clip. Specifically, the switch 57 selects the main-Clip presentation graphics stream supplied from the PID filter 55 or the sub-Clip presentation graphics stream, and supplies the selected presentation graphics stream to the presentation-graphics decoder 73 at the subsequent stage. The switch 58 selects the main-Clip interactive graphics stream supplied from the PID filter 55 or the sub-Clip interactive graphics stream, and supplies the selected interactive graphics stream to the interactive-graphics decoder 74 at the subsequent stage. Further, the switch 59 selects the main-Clip audio stream supplied from the PID filter 55 or the sub-Clip audio stream supplied from the PID filter 56 (audio stream #1 in this case, since audio has not been switched), and supplies the selected audio stream to the first audio decoder 75-1 at the subsequent stage. When the user issues an audio-switching instruction, the switch 59 supplies the main-Clip audio stream to the second audio decoder 75-2 or supplies the sub-Clip audio stream to the first audio decoder 75-1 or the second audio decoder 75-2. In this case, since playback processing before audio switching is performed has already been described, the description thereof will be omitted.

In step S51, the buffer 54 outputs the text subtitle data to the text subtitle composition 76.

In step S52, the background decoder 71 decodes the background image data and outputs the decoded background image data to the background-plane generator 91.

In step S53, the first video decoder 72-1 decodes the video stream (i.e., the supplied primary video stream) and outputs the decoded video stream to the video-plane generator 92.

In step S54, the presentation-graphics decoder 73 decodes the presentation graphics stream selected by the switch 57 and supplied, and outputs the decoded presentation graphics stream to the switch 77 at the subsequent stage.

In step S55, the interactive-graphics decoder 74 decodes the interactive graphics stream selected by the switch 58 and supplied, and outputs the decoded interactive graphics stream to the interactive-graphics-plane generator 94 at the subsequent stage.

In step S56, the first audio decoder 75-1 decodes the audio stream (audio stream #1) selected by the switch 59 and supplied, and outputs the decoded audio stream to the mixing processor 101 at the subsequent stage. In playback processing when the user has not issued an instruction for audio switching, no audio data is output from the second audio decoder 75-2. Thus, the mixing processor 101 directly supplies audio data, output from the first audio decoder 75-1, to the mixing processor 97 at the subsequent stage.

In step S57, the Text-ST composition 76 decodes the text subtitle data and outputs the decoded text caption data to the switch 77 at the subsequent stage.

In step S58, the switch 77 selects the data from the presentation-graphics decoder 73 or the data from the Text-ST composition 76. Specifically, the switch 77 selects one of the presentation graphics stream decoded by the presentation-graphics decoder 73 and the Text-ST (text subtitle data), and supplies the selected data to the presentation-graphics-plane generator 93.

In step S59, the background-plane generator 91 generates a background plane, based on the background image data supplied from the background decoder 71.

In step S60, the video-plane generator 92 generates a video plane, based on the video data supplied from the first video decoder 72-1.

In step S61, the presentation-graphics-plane generator 93 generates a presentation graphics plane, based on the data from the presentation-graphics decoder 73 or the data from the Text-ST composition 76, the data being selected by the switch 77 and supplied in the processing in step S58.

In step S62, the interactive-graphics-plane generator 94 generates an interactive graphics plane, based on the data of the interactive graphics stream supplied from the interactive-graphics decoder 74.

In step S63, the buffer 95 buffers the sound data selected and supplied in the processing in step S43, and supplies the buffered data to the mixing processor 97 at a predetermined timing.

In step S64, the video-data processor 96 combines the data of the individual planes and outputs the combined data. Specifically, the video-data processor 96 combines the data from the background-plane generator 91, the data from the video-plane generator 92, the data from the presentation-graphics-plane generator 93, and the data from the interactive-graphics-plane generator 94, and outputs the combined data as video data.

In step S65, the mixing processor 97 mixes (combines) the audio data (the audio data output from the mixing processor 101) and the sound data, and outputs the mixed data. The process then returns to step S3 shown in FIG. 36 and proceeds to step S4, returns to step S8 shown in FIG. 36 and proceeds to step S7, or returns to step S12 shown in FIG. 30 and proceeds to step S13.

In the processing described with reference to FIGS. 37 to 39, the main Clip, sub Clip, and text subtitle data are referred to by the main path and sub paths contained in the PlayList and are played back. In this case, video displayed is only video of the primary video stream, and the sub display screen 2 described with reference to FIG. 5 is not displayed. In this configuration, the main path and sub paths are provided in the PlayList, and a Clip that is different from the clip AV stream file specified by the main path can be specified by the sub path. Thus, the data of the sub Clip, which is a Clip that is different from the main Clip specified by the PlayItem of the main path, and the data of the man Clip can be played back together (at the same time).

In FIGS. 37 to 39, the processing in steps S45 and S46 may be executed in reverse order or may be executed in parallel. The processing in steps S47 and S49 may also be executed in reverse order or may be executed in parallel. Further, the processing in steps S52 to S57 may also be executed in reverse order or may be executed in parallel. The processing in steps S59 to S62 may also be executed in reverse order or may be executed in parallel. The processing in steps S64 and S65 may also be executed in reverse order or may be executed in parallel. That is, in FIG. 35, the processing of the buffers 51 to 54, which are vertically in the same hierarchy, may be executed in parallel and may be executed in any order, the processing of the switches 57 to 59 may be executed in parallel and may be executed in any order, the processing of the decoders 71 to 76 may be executed in parallel and may be executed in any order, the processing of the plane generators 91 to 94 may be executed in parallel and may be executed in any order, and the processing of the video processor 96 and the mixing processor 97 may be executed in parallel and may be executed in any order.

Next, the primary- and secondary-video playback processing executed in step S9 or S15 shown in FIG. 36 will be described with reference to the flowcharts shown in FIGS. 40 to 42.

Processing that is essentially the same as that in steps S41 to S46 described above with reference to FIGS. 37 and 38 is executed in steps S101 to S106.

That is, the controller 34 reads the main Clip, sub Clip, and text subtitle data (Text-ST data) and controls the switch 32 so as to supply the read data (the main Clip, sub Clip, and text subtitle data) to the corresponding buffers 51 to 54. Under the control of the controller 34, the switch 32 supplies the background image data to the buffer 51, supplies the data of the main Clip to the buffer 52, supplies the data of the sub Clip to the buffer 53, and supplies the text subtitle data to the buffer 54, so that the supplied data are buffered in the corresponding buffers 51 to 54. The buffer 51 outputs the background image data to the background decoder 71. The buffer 52 outputs the stream data of the main Clip to the PID filter 55.

In step S107, the PID filter 55 sorts the stream data to the corresponding elementary-stream decoders, based on PIDs given to TS packets contained in the main-clip AV stream file. Specifically, the PID filter 55 supplies a video stream to the PID filter 60, supplies a presentation graphics stream to the switch 57 serving as a supply source for the presentation-graphics decoder 73, supplies an interactive graphics stream to the switch 58 serving as a supply source for the interactive-graphics decoder 74, and supplies an audio stream to the switch 59 serving as a supply source for the first audio decoder 75-1. That is, the video stream, the presentation graphics stream, the interactive graphics stream, and the audio stream are given different PIDs from each other. Under the control of the controller 34, the PID filter 60 supplies the primary video stream to the first video decoder 72-1 and supplies the secondary video stream to the second video decoder 72-2.

In step S108, the buffer 53 outputs the stream data of the sub Clip to the PID filter 56.

In step S109, the PID filter 56 sorts the stream data to the corresponding elementary-stream decoders, based on PIDs. Specifically, the PID filter 56 supplies the supplied video stream to the PID filter 60, supplies a presentation graphics stream to the switch 57 serving as a supply source for the presentation-graphics decoder 73, supplies an interactive graphics stream to the switch 58 serving as a supply source for the interactive-graphics decoder 74, and supplies an audio stream to the switch 59 serving as a supply source for the first audio decoder 75-1 and the second audio decoder 75-2. Under the control of the controller 34, the PID filter 60 supplies the primary video stream to the first video decoder 72-1 and supplies the secondary video stream to the second video decoder 72-2.

Processing that is essentially the same as that in steps S50 to S52 described above with reference to FIGS. 37 and 38 is executed in steps S110 to S112.

That is, under the control of the controller 34, the switches 57 to 59 and the PID filter 60 select one of the main Clip and the sub Clip. The buffer 54 outputs the text subtitle data to the text subtitle composition 76. The background decoder 71 decodes the background image data and outputs the decoded background image data to the background-plane generator 91.

In step S113, the first video decoder 72-1 decodes the supplied primary video stream and outputs the decoded primary video stream to the video plane generator 92.

In step S114, the second video decoder 72-2 decodes the supplied secondary video stream and outputs the decoded secondary video stream to the video-plane generator 92.

In step S115, the presentation-graphics decoder 73 decodes the presentation graphics stream selected by the switch 57 and supplied, and outputs the decoded presentation graphics stream to the switch 77 at the subsequent stage.

In step S116, the interactive-graphics decoder 74 decodes the interactive graphics stream selected by the switch 58 and supplied, and outputs the decoded interactive graphics stream to the interactive-graphics-plane generator 94 at the subsequent stage.

In step S117, the first audio decoder 75-1 decodes the primary audio stream selected by the switch 59 and supplied, and outputs the decoded primary audio stream to the mixing processor 101 at the subsequent stage.

In step S118, the second audio decoder 75-2 decodes the secondary audio stream selected by the switch 59 and supplied, and outputs the decoded secondary audio stream to the mixing processor 101 at the subsequent stage.

In step S119, of the primary or secondary data, the Text-ST composition 76 decodes the text subtitle data to be displayed and outputs the decoded text subtitle data to the switch 77 at the subsequent stage.

In step S120, the switch 77 selects the data from the presentation-graphics decoder 73 or the data from the Text-ST composition 76. Specifically, the switch 77 selects one of the presentation graphics stream decoded by the presentation-graphics decoder 73 and the Text-ST (text subtitle data), and supplies the selected data to the presentation-graphics-plane generator 93.

In step S121, the background-plane generator 91 generates a background plane, based on the background image data supplied from the background decoder 71.

In step S122, under the control of the controller 34 that refers to pip_metadata, the video-plane generator 92 combines the video data supplied from the first video decoder 72-1 and the video data supplied from the second video decoder 72-2 to generate a video plane including a main display screen 1 and a sub display screen 2, as described with reference to FIG. 5, and supplies the generated video plane to the video-data processor 96.

Specifically, under the control of the controller 34 that refers to pip_metadata described using, for example, FIG. 9, 11, or 12, the video-plane generator 92 combines the positioned and scaled secondary video stream with the primary video stream to generate a video plane including a main display screen 1 and a sub display screen 2, as described with reference to FIG. 5, and supplies the generated video plane to the video-data processor 96.

Details of the positioning and scaling will now be described with reference to FIG. 43.

As shown in pip_metadata described above with reference to FIG. 9, 11, or 12, pip_horizotal_position indicates, for example, on the main display screen 1 shown in FIG. 5, an X coordinate at the upper left corner of the sub display screen 2 on which the secondary video is displayed, and pip_vertical_position indicates, for example, on the main display screen 1 shown in FIG. 5, a Y coordinate at the upper left corner of the sub display screen 2 on which the secondary video is displayed. Also, pip_scale indicates information regarding the size of the sub display screen 2 on which the secondary video is displayed.

Figure 43:
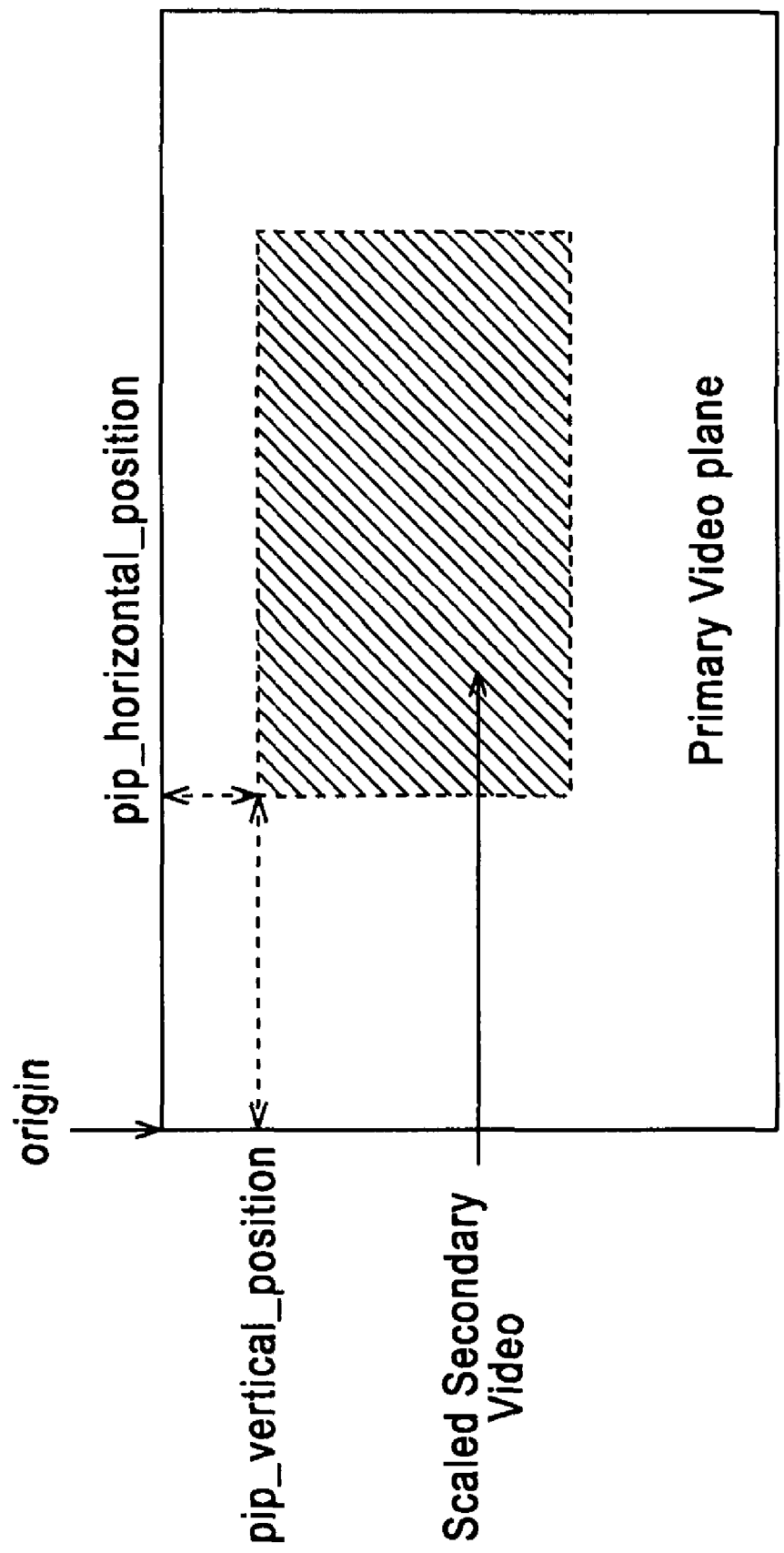
FIG. 43 is a view illustrating positioning and scaling.

That is, as shown in FIG. 43, a scaled secondary video (scaled secondary video) is adjusted on a primary video plane (primary video plane) to have a predetermined size, based on pip_scale, and is positioned so that the left upper corner of the scaled secondary video comes at a position indicated by pip_horizotal_position in the X axis direction and pip_vertical_position in the Y axis direction relative to the upper left corner of the primary video plane.

In this case, for "is_luma_key=1" in pip_metadata described with reference to FIG. 12, the video-plane generator 92 performs luma_keying combination on the primary video stream and the secondary video stream to generate a video plane, and supplies the generated video plane to the video-data processor 96.

The "luma keying combination" herein is a scheme for superimposing and combining an image, from which unwanted portions are clipped by using component differences in brightness (luminance value), with video, as described in pip_metadata shown in FIG. 12. Next, details of the luma_keying combination will be described with reference to FIGS. 44 and 45.

FIG. 44 is a view showing a primary video (primary video) and a secondary video (secondary video) before the luma_keying combination.

When the luma_keying combination is performed on the primary video at the right side in the figure and the secondary video at the left side, a secondary-video luminance value included in a range of a luminance-value lower limit indicated by lower_limit_luma_key to a luminance-value upper_limit indicated by upper_limit_luma_key, as described using pip_metadata shown in FIG. 12, is made to have a value for transparency, and the resulting secondary video is combined with the primary video.

That is, a secondary video from which a range of the luminance-value lower limit defined by lower_limit_luma_key and the luminance-value upper_limit defined by upper_limit_luma_key is removed is superimposed on and combined with the primary video. Specifically, as shown in FIG. 44, a hatched area other than a parallelogram and a circle in the left-side secondary video has a luminance value in the range of the luminance-value lower value and upper value, and is thus transparent. The left-side secondary video processed in such a manner is superimposed on and combined with the right-side primary video.

Figure 45:
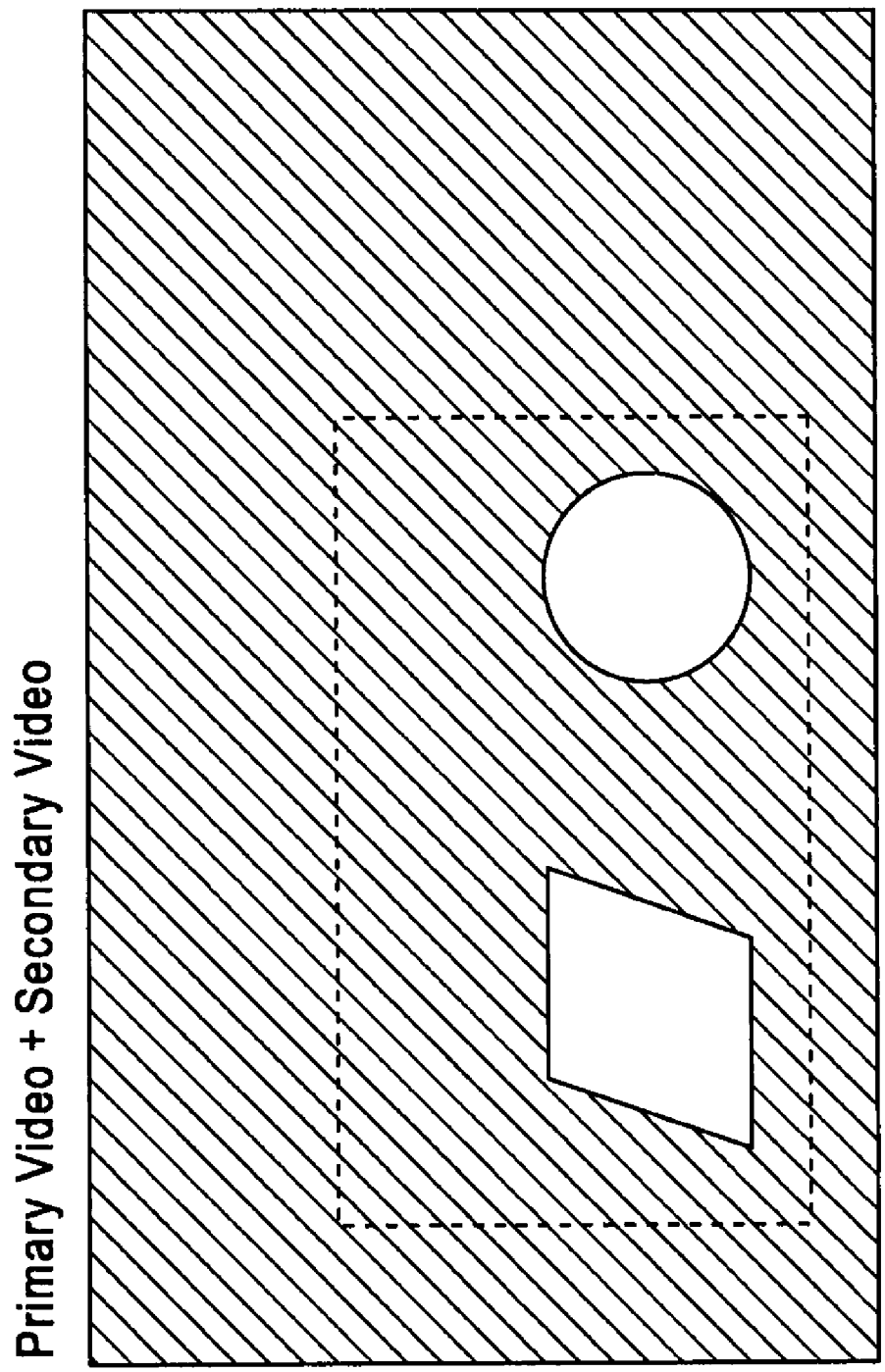
FIG. 45 is a view illustrating the luma_keying combination.

FIG. 45 is a view showing the primary video and the secondary video after the luma_keying combination.

In the primary video and secondary video after the luma_keying combination, the area other than the parallelogram and the circle in the secondary video is transparent, as shown in FIG. 45. Thus, of the area of the secondary video, only the parallelogram and circle areas are combined with the primary video.

Although the area of the secondary video is expressed by a dotted line for ease of illustration in FIG. 45, the dotted line is not displayed in practice.

Referring back to the flowchart shown in FIG. 42, in step S123, the presentation-graphics-plane generator 93 generates a presentation graphics plane, based on the data from the presentation-graphics decoder 73 or the data from the Text-ST composition 76, the data being selected by the switch 77 and supplied in the processing in step S58.

In step S124, the interactive-graphics-plane generator 94 generates an interactive graphics plane, based on the data of the interactive graphics stream supplied from the interactive-graphics decoder 74.

In step S125, the buffer 95 buffers the sound data selected and supplied in the processing in step S43, and supplies the buffered data to the mixing processor 97 at a predetermined timing.

In step S126, the video-data processor 96 combines the data of the individual planes and outputs the combined data. Specifically, the video-data processor 96 combines the data from the background-plane generator 91, the data from the video-plane generator 92, the data from the presentation-graphics-plane generator 93, and the data from the interactive-graphics-plane generator 94, and outputs the combined data as video data.

In step S127, the mixing processor 101 combines the primary audio data output from the first audio decoder 75-1 and the secondary audio data output from the second audio decoder 75-2, and supplies the combined data to the mixing processor 97.

In step S128, the mixing processor 97 mixes (combines) the audio data, combined by the mixing processor 101 and output therefrom, and the sound data, and outputs the resulting data. The process then returns to step S9 shown in FIG. 36 and proceeds to step S10 or returns to step S15 shown in FIG. 36 and proceeds to step S16.

In the processing described with reference to FIGS. 40 to 42, the main Clip, sub Clip, and text subtitle data are referred to by the main path and sub paths contained in the PlayList and are played back. In this configuration, the main path and sub path(s) are provided in the PlayList, and a Clip that is different from a clip AV stream file specified by the main path can be specified by the sub path. Thus, the display image of a secondary video stream can be superimposed on the display image of a primary video stream.

In this case, the size and the display position of the display image of the secondary video stream can be set. Thus, compared to a case in which the display position and the display size of the sub display screen are pre-set so as to depend on a playback apparatus, the secondary video stream can be displayed at a position and in a size which do not obstruct the display of the primary video stream, depending on content or display timing. Alternatively, in accordance with the contents of the secondary video stream, for example, for important contents, the secondary video stream can be displayed at a distinct position and in a large size, or for non-important contents, the secondary video stream can be displayed in a small size at an edge of the main display screen 1.

The size and the display position of the display image of the secondary video stream can be appropriately defined by the content producer or content distributor.

In FIGS. 40 to 42, the processing in steps S105 and S106 may be executed in reverse order or may be executed in parallel. The processing in steps S107 and S109 may also be executed in reverse order or may be executed in parallel. Further, the processing in steps S112 to S119 may be executed in reverse order or may be executed in parallel. The processing in steps S121 to S124 may also be executed in reverse order or may be executed in parallel. Further, the processing in step S126 and the processing in S127 and S128 may also be executed in reverse order or may be executed in parallel. That is, in FIG. 35, the processing of the buffers 51 to 54, which are vertically in the same hierarchy, may be executed in parallel and may be executed in any order, the processing of the switches 57 to 59 may be executed in parallel and may be executed in any order, the processing of the decoders 71 to 76 may be executed in parallel and may be executed in any order, the processing of the plane generators 91 to 94 may be executed in parallel and may be executed in any order, and the processing of the video processor 96 and the mixing processor 97 may be executed in parallel and may be executed in any order.

The above-described processing can be summarized as follows.

The playback apparatus 20 obtains a PlayList, which serves as playback control information that includes the information of a main path, which is a main playback path indicating the position of a main clip AV stream file containing at least one stream, and the information of a sub path, which is a playback path of a sub clip AV stream file to be played back by a playback path that is different from the playback path of the main clip AV stream file. The playback apparatus 20 receives selected streams to be played back, based on STN_table( ) for selecting streams that are contained in the PlayList and that are to be played back. STN_table( ) contains information for selecting a predetermined stream type (e.g., a primary video stream) of a main clip AV stream file and for selecting another stream file to be played back in conjunction with or out of synchronization with the playback timing of the predetermined type of stream. Thus, based on STN_table( ), it is possible to receive selected streams to be played back.

When Subpath_type of PlayList is In-Mux, a main path and a sub path can refer to the same Clip, and a sub path can further be added. This can provide a stream with expandability. Since the configuration in which multiple files can be referred to by one sub path is employed (e.g., FIG. 4), the user can perform selection from multiple different streams.

In addition, STN_table( ) shown in FIG. 23 and FIGS. 33 and 34 is provided in a PlayItem of a main path as a table that defines auxiliary data (e.g., an audio stream) multiplexed (contained) in an AV stream file referred to by the main path and auxiliary data referred to by a sub path. This makes it possible to achieve a stream with high expandability. Also, entering information in STN_table( ) allows a sub path to be easily expanded.

Further, stream_attribute( ), which is stream attribute information and is shown in FIG. 25, is provided in STN_table( ); therefore, the playback apparatus 20 side can determine whether or not a selected stream can be played back. In addition, referring to stream_attribute( ) makes it possible to select and play back only a stream that can be played back.

In addition, STN_table( ) (FIG. 23 and FIGS. 33 and 34) is adapted to define two stream files having the same type (in this case, a primary video stream file and a secondary video stream file, or a primary audio stream file and a secondary audio stream file). Additionally, the playback apparatus 20 shown in FIG. 35 is provided with two video decoders (the first video decoder 72-1 and the second video decoder 72-2) and two audio decoders (the first audio decoder 75-1 and the second audio decoder 75-2). Further, the video-plane generator 92 is provided to combine (mix) primary video data and secondary video data which are decoded by two video decoders, and the mixing processor 101 is provided to combine audio data decoded by two audio decoders. With this arrangement, two streams having the same type can be combined and played back at the same time.

That is, as shown in FIG. 5, the playback apparatus according to the present invention can perform the so-called "PinP (picture-in-picture) display" in which a primary video stream is displayed on a main screen and a secondary stream is combined therewith and displayed as an auxiliary screen within the main screen.

In this case, the size and the display position of the display image of the secondary video stream during picture-in-picture display can be set using pip_metadata. With this arrangement, compared to a case in which the display position and the display size of the sub display screen are pre-set so as to depend on a playback apparatus, the secondary video stream can be displayed at a position and in a size which do not obstruct the display of the primary video stream, depending on content or display timing. Alternatively, in accordance with the contents of the secondary video stream, for example, for important contents, the secondary video stream can be displayed at a distinct position and in a large size, or for non-important contents, the secondary video stream can be displayed in a small size at an edge of the main display screen 1.

The size and the display position of the display image of the secondary video stream can be appropriately defined by the content producer or content distributor.

Also, pip_metadata can state information indicating the setting of the picture-in-picture display, other than the size and the display position of the display image of the secondary video stream. Pip_metadata can state not only information indicating the position and the size of the sub display screen 2 on which the secondary video stream is displayed but also information regarding, for example, color designation and the rotation of displayed video relative to the original video of the secondary video stream.

In this case, display-related information, such as the size and the display position of the display image of the secondary video stream is not contained in the secondary video stream, and is described in a playlist for controlling the playback of the secondary video stream. That is, when it is desired to change only the display format of the secondary stream without making changes to the secondary video stream (e.g., when it is desired to change only the display position and/or the display size of the secondary video stream), it is sufficient to update only the statement of pip_metadata in the playlist without making changes to the setting of the playback apparatus or the secondary video stream.

Additionally, for first content and second content, the same secondary video stream can be easily displayed by different display methods (e.g., the same secondary video stream can be displayed in a large size for the first content and in a small size for the second content). That is, for each of the first content and the second content, information indicating a desired display format may be stated in pip_metadata in the playlist without modifying the data of the secondary video stream. With this arrangement, for the first content and the second content, the same secondary video stream can be displayed in different display methods desired by the content producer or content distributor.

Also, since display-related information, such as the size and the display position of the display image of the secondary video stream, is stated in the playlist containing detailed playback control information such as time information, the display of the secondary video can be set in detail.

As shown in FIG. 20, a sub path contains SubPath_type that indicates sub-path types (a kind, such as audio or text caption, and a type indicating whether or not the sub path is synchronized with a main path), Clip_Information_file_name that is shown in FIG. 21 and that indicates the name of a sub Clip referred to by the sub path, SubPlayItem_IN_time that is shown in FIG. 21 and that indicates the IN-point of a Clip referred to by the sub path and, and SubPlayItem_OUT_time that is shown in FIG. 21 and that indicates the OUT-point of the Clip. Thus, it is possible to correctly identify data referred to by the sub path.

Data read by the storage drive 31 shown in FIG. 35 may be data recorded on a recording medium, such as a DVD (digital versatile disc), may be data recorded on a hard disk, may be data downloaded through a network, which is not shown, or may be data resulting from a combination thereof. For example, playback may be performed based on a PlayList and a sub Clip downloaded and recorded on a hard disk and a main clip AV stream file recorded on a DVD. Also, for example, when a PlayList and a main Clip which use, as a sub Clip, a clip AV stream file recorded on a DVD are recorded on a hard disk, the main Clip and the sub Clip may be read from the hard disk and the DVD, respectively, for playback, based on the PlayList recorded on the hard disk.

The configuration may be designed so that the position and/or the size of the secondary video can be changed by the function of the playback apparatus 20 (player). In such a case, the size and so on intended by an author cannot be obtained in some cases. On the other hand, as in the present invention, the size, the position, and so on may be controlled through the use of the PlayList, which is control information. With this arrangement, for example, even when it is desired to change the position and so on of the secondary video after obtaining a ROM disc, it is possible to change the position and so on as intended by the author by only obtaining the playlist having a relatively small size without making changes to an actual Clip.

Next, with reference to FIGS. 46 and 47, a method for manufacturing a recording medium 21 on which data that can be played back by the playback apparatus 20 is recorded will be described in conjunction with an example in which the recording medium 21 is a disc recording medium.

Figure 46:
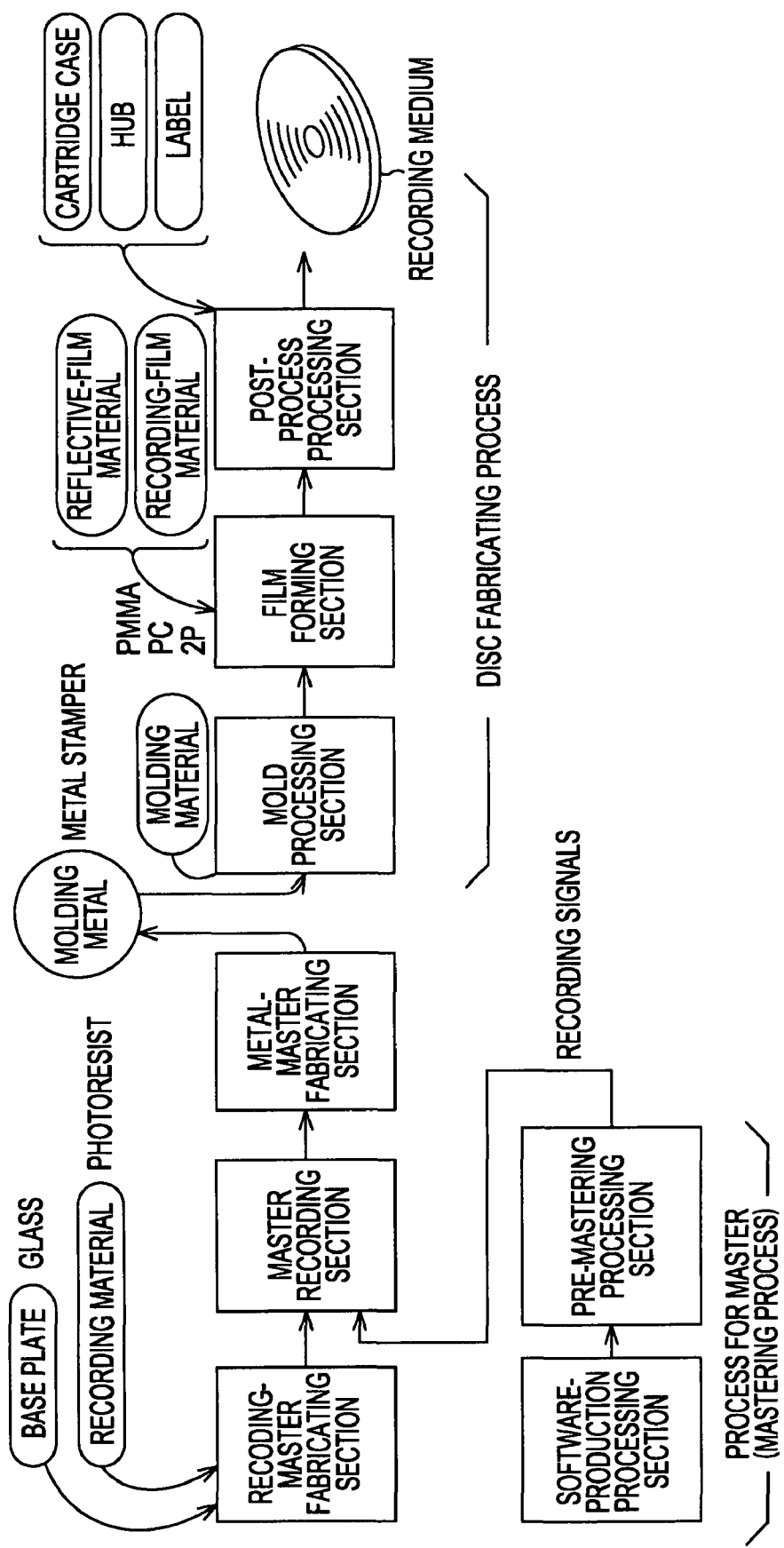
FIG. 46 is a diagram illustrating the manufacture of a recording medium on which data that can be played back by the playback apparatus is recorded.

That is, as shown in FIG. 46, a base plate made of glass or the like is prepared, and recording material, such as photoresist, is applied to the base plate, thereby fabricating a recording master.

Figure 47:
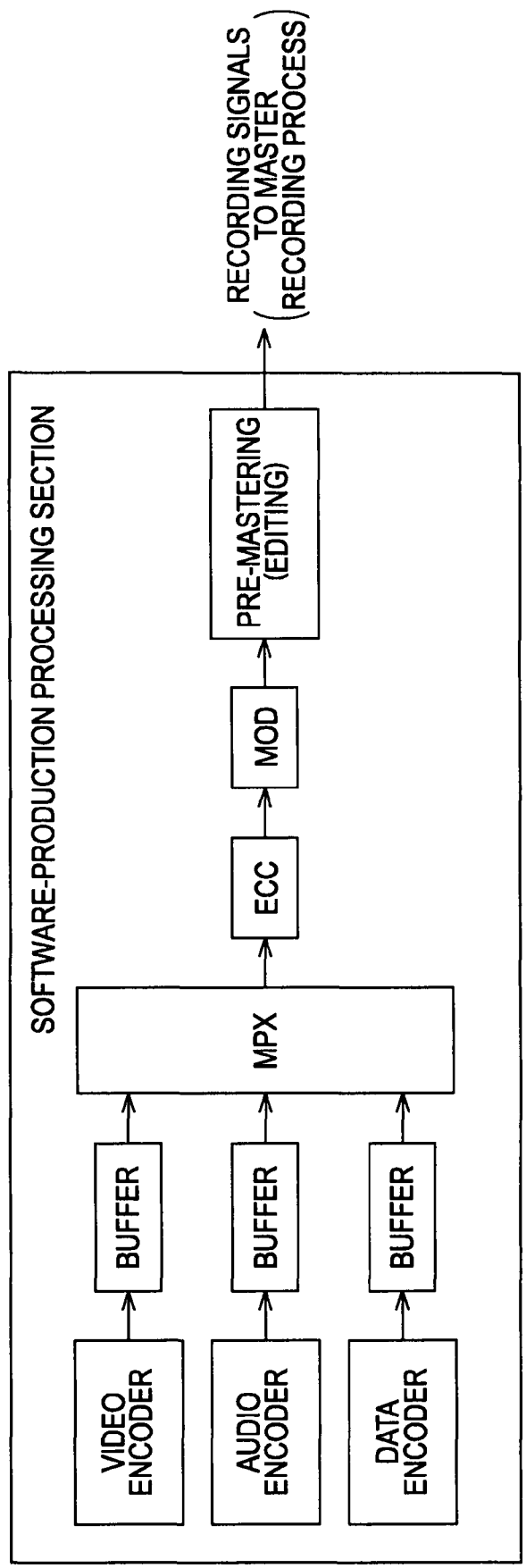
FIG. 47 is a diagram illustrating the manufacture of the recording medium on which data that can be played back by the playback apparatus is recorded.

Thereafter, as shown in FIG. 47, at a software-production processing section, video data that was encoded by an encoding device (a video encoder) and that has a format that can be played back by the playback apparatus 20 is temporarily stored in a buffer, and audio data encoded by an audio encoder is temporarily stored in a buffer. In addition, non-stream data (e.g., indexes, a PlayList or PlayLists, and PlayItems) decoded by a data encoder is temporarily stored in a buffer. The video data, the audio data, and the non-stream data which are stored in the respective buffers are multiplexed with synchronization signals by a multiplexer (MPX), and an error correction code is added to the multiplexed data by an error checking and correcting circuit (ECC). The resulting data is subjected to predetermined modulation by a modulation circuit (MOD), and is temporarily recorded on, for example, a magnetic tape in accordance with a predetermined format. Thus, software that can be played back by the playback apparatus 20 and that is to be recorded on the recording medium 21 is produced.

The software is edited (pre-mastered), as needed, and signals having a format to be recorded on the optical disc are generated. As shown in FIG. 46, a laser beam is modulated in accordance with the recording signals, and the modulated laser beam is shined on the photoresist on the master. As a result, the photoresist on the master is exposed in response to the recording signals.

Thereafter, this master is developed, so that pits appear on the master. The master prepared in this manner is subjected to processing, such as electroforming, to fabricate a metal master to which the pits on the glass master were transferred. Based on the metal master, a metal stamper is further fabricated, which serves as a molding die.

For example, a material, such as MMA (acrylic) or PC (polycarbonate), is injected into the molding die and is solidified. Alternatively, a 2P (ultraviolet curable resin) is applied to the metal stamper, is then illuminated with ultraviolet, and is solidified. This allows the pits on the metal stamper to be transferred to a resin replica.

A reflective film is formed on the replica, created as described above, by vapor deposition, sputtering, or the like. Alternatively, a reflective film is formed on the fabricated replica by spin coating.

Thereafter, the inner circumference and the outer circumference of the disc are processed, and the resulting disc is subject to a necessary process, such as laminating two discs together. In addition, a label and a hub are attached to the resulting disc, and the disc is inserted into a cartridge. This completes the recording medium 21 on which data that can be played back by the playback apparatus 20 is recorded.

The above-described series of processing can be executed by hardware and can also be executed by software. In this case, the above-described processing is executed by a personal computer 500 as shown in FIG. 48.

Figure 48:
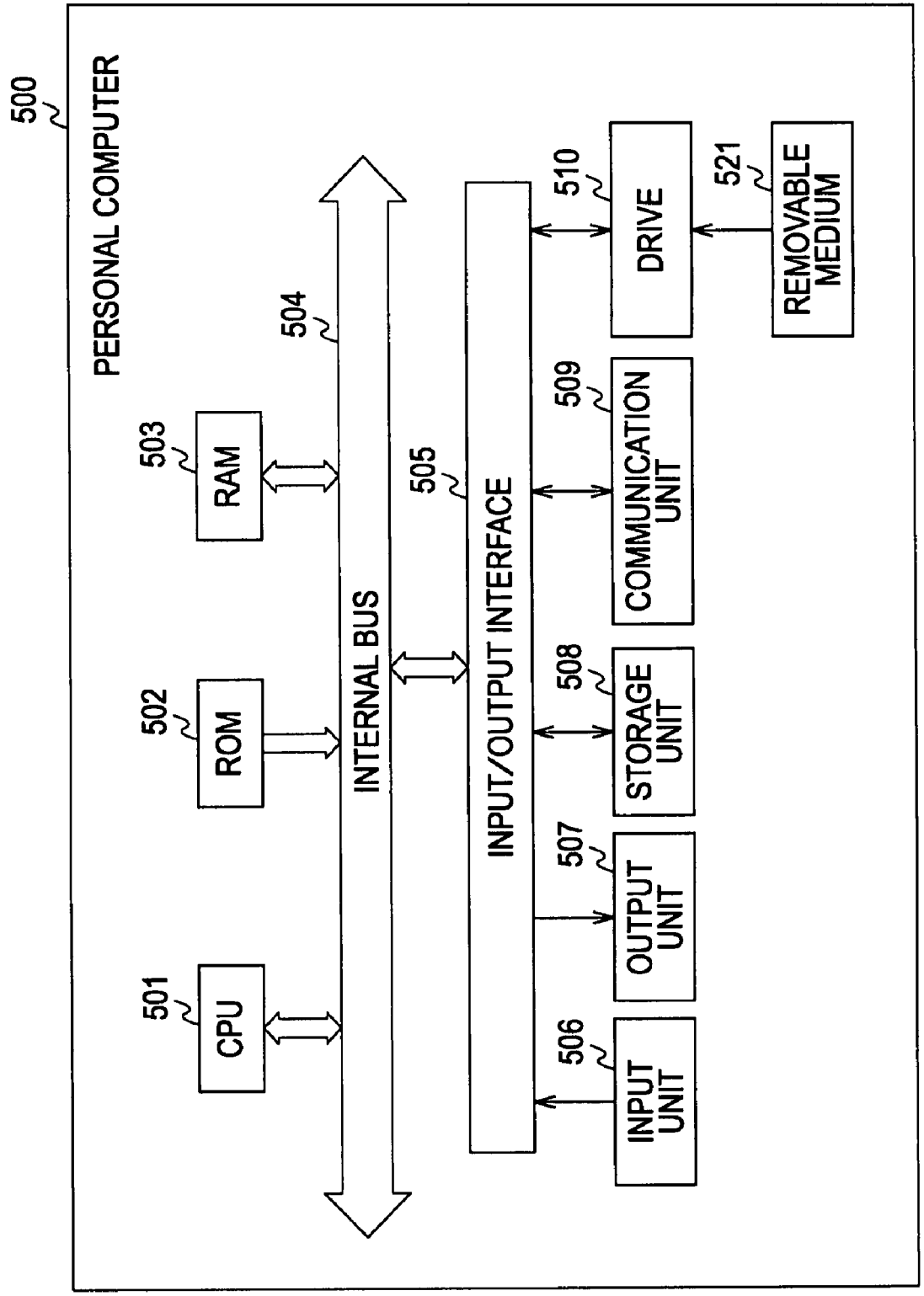
FIG. 48 is a diagram showing the configuration of a personal computer.

In FIG. 48, a CPU (central processing unit) 501 executes various types of processing in accordance with a program stored in a ROM (read only memory) 502 or a program loaded from a storage unit 508 into a RAM (random access memory) 503. As needed, the RAM 503 also stores, for example, data required for the CPU 501 to execute various types of processing.

The CPU 501, the ROM 502, and the RAM 503 are interconnected through an internal bus 504. An input/output interface 505 is also connected to the internal bus 504.

An input unit 506 including a keyboard and a mouse, an output unit 507 including a display and a speaker, the storage unit 508 including a hard disk, and a communication unit 509 including a modem or a terminal adapter are connected to the input/output interface 505. Examples of the display include a CRT (cathode ray tube) display and an LCD (liquid crystal display). The communication unit 509 performs communication processing through various networks including a telephone line and a CATV network.

A drive 510 is also connected to the input/output interface 505, as needed, and, for example, a removable medium 521, such as a magnetic disk, an optical disc, a magneto-optical disk, or a semiconductor memory, is attached to the drive 510, as appropriate. A computer program read from the removable medium 521 is installed on the storage unit 508, as needed.

When the series of processing is to be executed by software, a program included in the software is installed through the network or from a program storage medium.

This program storage medium may not only be a package medium that is distributed separately from the computer to supply a program to a user and that includes the removable medium 521 on which the program is recorded, but also be a hard disk or the like that is supplied to the user while being incorporated in the main body of the apparatus and that includes the ROM 502 or the storage unit 508 on which the program is recorded.

Embodiments of the present invention are not limited to the one described above, and various changes can be made thereto without departing from the scope of the substance of the present invention.

The invention claimed is:

1. A playback apparatus comprising:
   obtaining means for obtaining playback control information that comprises first information including a main playback path indicating a position on a timeline of a main stream file containing at least one stream and second information including a sub playback path of a sub stream file that is different from the main stream file;
   reading means for reading the main stream file and the sub stream file which are to be played back, based on the playback control information obtained by the obtaining means; and
   video combining means for combining video of the main stream file and video of the sub stream file, the main stream file and the sub stream file being read by the reading means, based on the playback control information obtained by the obtaining means,
   wherein the playback control information includes information related to display states of the video of the sub stream file, the video of the sub stream file being to be combined with the video of the main stream file, and
   the video combining means combines the video of the main stream file and the video of the sub stream file, based on the display-state-related information included in the playback control information, wherein the display-state related information includes information related to a post-combination rotation angle of the video of the sub stream file relative to original video, the video of the sub stream file being to be combined with the video of the main stream file.

2. A playback apparatus comprising:
   obtaining means for obtaining playback control information that comprises first information including a main playback path indicating a position on a timeline of a main stream file containing at least one stream and second information including a sub playback path of a sub stream file that is different from the main stream file;
   reading means for reading the main stream file and the sub stream file which are to be played back, based on the playback control information obtained by the obtaining means; and
   video combining means for combining video of the main stream file and video of the sub stream file, the main stream file and the sub stream file being read by the reading means, based on the playback control information obtained by the obtaining means,
   wherein the playback control information includes information related to display states of the video of the sub stream file, the video of the sub stream file being to be combined with the video of the main stream file, and
   the video combining means combines the video of the main stream file and the video of the sub stream file, based on the display-state-related information included in the playback control information, wherein the display-state-related information includes information related to processing for combining the video of the main stream file and the video of the sub stream file, the processing being executed based on information indicating a brightness of the video of the sub stream file, the video of the sub stream file being to be combined with the video of the main stream file.

3. The playback apparatus according to claim 2, wherein the information indicating the brightness of the video of the sub stream file is at least one threshold for information indicating a brightness for transparency processing, and the transparency processing is performed on a video portion where the brightness of the video of the sub stream file is greater than or equal to the threshold or less than or equal to the threshold.

4. A method of manufacturing a playback apparatus comprising:
   providing an obtaining means for obtaining playback control information that comprises first information including a main playback path indicating a position on a timeline of a main stream file containing at least one stream and second information including a sub playback path of a sub stream file that is different from the main stream file;
   forming a reading means for reading the main stream file and the sub stream file which are to be played back, based on the playback control information obtained by the obtaining means; and
   forming a video combining means for combining video of the main stream file and video of the sub stream file, the main stream file and the sub stream file being read by the reading means, based on the playback control information obtained by the obtaining means,
   wherein the playback control information includes information related to display states of the video of the sub stream file, the video of the sub stream file being to be combined with the video of the main stream file, and
   the video combining means combines the video of the main stream file and the video of the sub stream file, based on the display-state-related information included in the playback control information, wherein the display-state related information includes information related to a post-combination rotation angle of the video of the sub stream file relative to original video, the video of the sub stream file being to be combined with the video of the main stream file.

5. A method of manufacturing a playback apparatus comprising:

providing an obtaining means for obtaining playback control information that comprises first information including a main playback path indicating a position on a timeline of a main stream file containing at least one stream and second information including a sub playback path of a sub stream file that is different from the main stream file;

forming a reading means for reading the main stream file and the sub stream file which are to be played back, based on the playback control information obtained by the obtaining means; and providing a video combining means for combining video of the main stream file and video of the sub stream file, the main stream file and the sub stream file being read by the reading means, based on the playback control information obtained by the obtaining means, wherein the playback control information includes information related to display states of the video of the sub stream file, the video of the sub stream file being to be combined with the video of the main stream file, and the video combining means combines the video of the main stream file and the video of the sub stream file, based on the display-state-related information included in the playback control information, wherein the display-state-related information includes information related to processing for combining the video of the main stream file and the video of the sub stream file, the processing being executed based on information indicating a brightness of the video of the sub stream file, the video of the sub stream file being to be combined with the video of the main stream file.

6. The method of manufacturing a playback apparatus according to claim 5, wherein the information indicating the brightness of the video of the sub stream file is at least one threshold for information indicating a brightness for transparency processing, and the transparency processing is performed on a video portion where the brightness of the video of the sub stream file is greater than or equal to the threshold or less than or equal to the threshold.

7. The method of recording data according to claim 5, wherein the information indicating the brightness of the video of the sub stream file is at least one threshold for information indicating a brightness for transparency processing, and the transparency processing is performed on a video portion where the brightness of the video of the sub stream file is greater than or equal to the threshold or less than or equal to the threshold.

* * * * *